(12) United States Patent
Ha et al.

(10) Patent No.: US 11,843,759 B2
(45) Date of Patent: *Dec. 12, 2023

(54) SYSTEMS AND METHOD FOR VIRTUAL REALITY VIDEO CONVERSION AND STREAMING

(71) Applicant: AlcaCruz Inc., San Mateo, CA (US)

(72) Inventors: SangYoo Ha, San Mateo, CA (US); SungBae Kim, Santa Clara, CA (US)

(73) Assignee: AlcaCruz Inc., Dover, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,756

(22) Filed: Aug. 31, 2022

(65) Prior Publication Data

US 2022/0408073 A1 Dec. 22, 2022

Related U.S. Application Data

(60) Continuation of application No. 17/158,654, filed on Jan. 26, 2021, now Pat. No. 11,470,301, which is a
(Continued)

(51) Int. Cl.
*H04N 13/194* (2018.01)
*H04N 13/111* (2018.01)
(Continued)

(52) U.S. Cl.
CPC .......... *H04N 13/194* (2018.05); *G06F 3/147* (2013.01); *G06T 1/20* (2013.01); *G06T 19/006* (2013.01);
(Continued)

(58) Field of Classification Search
CPC ......... G06F 3/147; G06T 1/20; G06T 19/006; G09G 2310/04; G09G 2340/045;
(Continued)

(56) References Cited

U.S. PATENT DOCUMENTS 5,185,667 A 2/1993 Zimmermann
5,880,734 A 3/1999 Light
(Continued)

FOREIGN PATENT DOCUMENTS

CN 1732690 A 2/2006
CN 101000461 A 7/2007
(Continued)

OTHER PUBLICATIONS

US 10,715,786 B2, 07/2020, Ha et al. (withdrawn)
(Continued)

*Primary Examiner* — Farzana Hossain
(74) *Attorney, Agent, or Firm* — Schwegman, Lundberg & Woessner, P.A.

(57) ABSTRACT

A video server is configured to convert frame data of a spherical image to frame data of a equirectangular image such that a first area corresponding to a field of view received from a client device is a middle area of the equirectangular image. The video server is further configured to scale the first area at a first resolution, scale a second area of the equirectangular image adjacent to the first area at a second resolution smaller than the first resolution, scale a third area of the equirectangular image that is adjacent to the first area and is not adjacent to the second area, at a third resolution smaller than the first resolution, and rearrange the scaled first area, second area and third area such that the scaled second area and the scaled third area are adjacent to each other, to generate reformatted equirectangular image frame data to be encoded.

20 Claims, 31 Drawing Sheets

Related U.S. Application Data continuation of application No. 16/689,520, filed on Nov. 20, 2019, now Pat. No. 10,939,087, which is a continuation of application No. 15/877,799, filed on Jan. 23, 2018, now abandoned, which is a division of application No. 15/268,111, filed on Sep. 16, 2016, now Pat. No. 9,912,717.

(60) Provisional application No. 62/297,394, filed on Feb. 19, 2016.

(51) Int. Cl.

| | | |
|---|---|---|
| H04N 13/161 | (2018.01) | |
| G06F 3/147 | (2006.01) | |
| G09G 5/36 | (2006.01) | |
| G09G 5/391 | (2006.01) | |
| H04N 21/00 | (2011.01) | |
| H04N 19/85 | (2014.01) | |
| H04L 65/70 | (2022.01) | |
| H04L 65/75 | (2022.01) | |
| H04L 67/01 | (2022.01) | |
| H04N 23/698 | (2023.01) | |
| G06T 19/00 | (2011.01) | |
| G06T 1/20 | (2006.01) | |
| H04N 19/61 | (2014.01) | |
| G09G 5/14 | (2006.01) | |

(52) U.S. Cl.
CPC ............ *G09G 5/363* (2013.01); *G09G 5/391* (2013.01); *H04L 65/70* (2022.05); *H04L 65/75* (2022.05); *H04L 65/762* (2022.05); *H04L 67/01* (2022.05); *H04N 13/111* (2018.05); *H04N 13/161* (2018.05); *H04N 19/85* (2014.11); *H04N 21/00* (2013.01); *H04N 23/698* (2023.01); *G09G 5/14* (2013.01); *G09G 2310/04* (2013.01); *G09G 2340/045* (2013.01); *G09G 2350/00* (2013.01); *G09G 2354/00* (2013.01); *G09G 2360/121* (2013.01); *G09G 2360/18* (2013.01); *G09G 2370/022* (2013.01); *H04N 19/61* (2014.11)

(58) Field of Classification Search
CPC ........... G09G 2350/00; G09G 2354/00; G09G 2360/121; G09G 2360/18; G09G 2370/022; G09G 5/14; G09G 5/363; G09G 5/391; H04L 65/70; H04L 65/75; H04L 65/762; H04L 67/01; H04N 13/194; H04N 13/111; H04N 13/161; H04N 19/85; H04N 21/00; H04N 23/698; H04N 19/61

See application file for complete search history.

(56) References Cited

U.S. PATENT DOCUMENTS

| | | | |
|---|---|---|---|
| 6,043,837 | A | 3/2000 | Driscoll, Jr. et al. |
| 7,908,462 | B2 | 3/2011 | Sung |
| 8,747,116 | B2 | 6/2014 | Zboray et al. |
| 8,851,896 | B2 | 10/2014 | Wallace et al. |
| 9,912,717 | B2 | 3/2018 | Ha et al. |
| 10,334,224 | B2 | 6/2019 | Ha et al. |
| 10,904,511 | B2 | 1/2021 | Ha et al. |
| 10,939,087 | B2 | 3/2021 | Ha et al. |
| 11,050,996 | B2 | 6/2021 | Ha et al. |
| 11,375,172 | B2 | 6/2022 | Ha et al. |
| 11,470,301 | B2 | 10/2022 | Ha et al. |
| 2005/0007483 | A1 | 1/2005 | Zimmermann et al. |
| 2006/0055807 | A1 | 3/2006 | Pemer |
| 2011/0296318 | A1 | 12/2011 | Takayama et al. |
| 2012/0062444 | A1 | 3/2012 | Cok et al. |
| 2012/0092348 | A1 | 4/2012 | Mccutchen |
| 2012/0212491 | A1 | 8/2012 | Hager |
| 2013/0141523 | A1 | 6/2013 | Banta et al. |
| 2014/0184475 | A1 | 7/2014 | Tantos et al. |
| 2014/0341291 | A1 | 11/2014 | Schwarz et al. |
| 2016/0006933 | A1 | 1/2016 | Zimmerman et al. |
| 2016/0012855 | A1 | 1/2016 | Krishnan |
| 2016/0112489 | A1 | 4/2016 | Adams et al. |
| 2016/0142697 | A1 | 5/2016 | Budagavi et al. |
| 2016/0205341 | A1 | 7/2016 | Hollander et al. |
| 2016/0260196 | A1 | 9/2016 | Roimela et al. |
| 2017/0013283 | A1 | 1/2017 | Zhang et al. |
| 2017/0142480 | A1 | 5/2017 | Gupta et al. |
| 2017/0147830 | A1 | 5/2017 | Park et al. |
| 2017/0244775 | A1 | 8/2017 | Ha et al. |
| 2017/0244951 | A1 | 8/2017 | Ha et al. |
| 2018/0152690 | A1 | 5/2018 | Ha et al. |
| 2019/0253693 | A1 | 8/2019 | Ha et al. |
| 2020/0092532 | A1 | 3/2020 | Ha et al. |
| 2020/0267370 | A1 | 8/2020 | Ha et al. |
| 2021/0195164 | A1 | 6/2021 | Ha et al. |
| 2021/0281815 | A1 | 9/2021 | Ha et al. |
| 2022/0264069 | A1 | 8/2022 | Ha et al. |

FOREIGN PATENT DOCUMENTS

| | | |
|---|---|---|
| CN | 101002479 A | 7/2007 |
| CN | 101828390 A | 9/2010 |
| CN | 202257030 U | 5/2012 |
| CN | 104365095 A | 2/2015 |
| EP | 1162830 A2 | 12/2001 |
| EP | 1162830 A3 | 8/2003 |
| EP | 2204992 A1 | 7/2010 |
| EP | 2645713 A1 | 10/2013 |
| JP | H10191355 A | 7/1998 |
| JP | 2003101989 A | 4/2003 |
| JP | 2005341093 A | 12/2005 |
| JP | 2016015705 A | 1/2016 |
| JP | 6663043 B2 | 2/2020 |
| WO | WO-0060869 A1 | 10/2000 |
| WO | WO-2013068548 A2 | 5/2013 |
| WO | WO-2016010668 A1 | 1/2016 |

OTHER PUBLICATIONS

"U.S. Appl. No. 15/094,336, Final Office Action dated Mar. 28, 2017", 18 pgs.
"U.S. Appl. No. 15/094,336, Final Office Action dated Aug. 10, 2018", 15 pgs.
"U.S. Appl. No. 15/094,336, Non Final Office Action dated Aug. 12, 2016", 14 pgs.
"U.S. Appl. No. 15/094,336, Non Final Office Action dated Dec. 18, 2017", 23 pgs.
"U.S. Appl. No. 15/094,336, Notice of Allowance dated Feb. 14, 2019", 5 pgs.
"U.S. Appl. No. 15/094,336, Response filed Jun. 28, 2017 to Final Office Action dated Mar. 28, 2017", 15 pgs.
"U.S. Appl. No. 15/094,336, Response filed Nov. 11, 2016 to Non Final Office Action dated Aug. 12, 2016", 11 pgs.
"U.S. Appl. No. 15/094,336, Response filed Nov. 7, 2018 to Final Office Action dated Aug. 10, 2018", 15 pgs.
"U.S. Appl. No. 15/268,111, Examiner Interview Summary dated Mar. 30, 2017", 3 pgs.
"U.S. Appl. No. 15/268,111, Final Office Action dated Aug. 3, 2017", 11 pgs.
"U.S. Appl. No. 15/268,111, Non Final Office Action dated Feb. 17, 2017", 11 pgs.
"U.S. Appl. No. 15/268,111, Notice of Allowance dated Oct. 18, 2017", 9 pgs.
"U.S. Appl. No. 15/268,111, Response filed May 12, 2017 to Non Final Office Action dated Feb. 17, 2017", 17 pgs.
"U.S. Appl. No. 15/268,111, Response filed Oct. 3, 2017 to Final Office Action dated Aug. 3, 2017", 21 pgs.
"U.S. Appl. No. 15/268,111, Response filed Dec. 19, 2016 to Restriction Requirement dated Nov. 22, 2016", 2 pgs.

(56) References Cited

OTHER PUBLICATIONS

"U.S. Appl. No. 15/268,111, Restriction Requirement dated Nov. 22, 2016", 7 pgs.
"U.S. Appl. No. 15/877,799, Non Final Office Action dated Apr. 29, 2019", 9 pgs.
"U.S. Appl. No. 15/877,799, Notice of Non-Compliant Amendment dated Oct. 2, 2019", 5 pgs.
"U.S. Appl. No. 15/877,799, Response filed Jul. 29, 2019 to Non-Final Office Action dated Apr. 29, 2019", 13 pgs.
"U.S. Appl. No. 16/391,486, Corrected Notice of Allowability dated Dec. 31, 2020", 2 pgs.
"U.S. Appl. No. 16/391,486, Notice of Allowance dated Mar. 11, 2020", 5 pgs.
"U.S. Appl. No. 16/391,486, Notice of Allowance dated Aug. 21, 2020", 5 pgs.
"U.S. Appl. No. 16/391,486, Notice of Allowance dated Nov. 16, 2020", 5 pgs.
"U.S. Appl. No. 16/689,520, Corrected Notice of Allowability dated Dec. 17, 2020", 2 pgs.
"U.S. Appl. No. 16/689,520, Non Final Office Action dated Sep. 21, 2020", 11 pgs.
"U.S. Appl. No. 16/689,520, Notice of Allowance dated Nov. 12, 2020", 9 pgs.
"U.S. Appl. No. 16/689,520, Response filed Oct. 29, 2020 to Non Final Office Action dated Sep. 21, 2020", 9 pgs.
"U.S. Appl. No. 16/868,974, Corrected Notice of Allowability dated May 27, 2021", 2 pgs.
"U.S. Appl. No. 16/868,974, Notice of Allowance dated Feb. 19, 2021", 8 pgs.
"U.S. Appl. No. 17/158,654, Final Office Action dated Mar. 4, 2022", 8 pgs.
"U.S. Appl. No. 17/158,654, Non Final Office Action dated Oct. 5, 2021", 15 pgs.
"U.S. Appl. No. 17/158,654, Notice of Allowance dated Jun. 10, 2022", 5 pgs.
"U.S. Appl. No. 17/158,654, Preliminary Amendment filed Mar. 16, 2021", 8 pgs.
"U.S. Appl. No. 17/158,654, Response filed Jan. 31, 2022 to Non Final Office Action dated Oct. 5, 2021", 11 pgs.
"U.S. Appl. No. 17/158,654, Response filed May 26, 2022 to Final Office Action dated Mar. 4, 2022", 10 pgs.
"U.S. Appl. No. 17/315,995, Corrected Notice of Allowability dated Jun. 1, 2022", 2 pgs.
"U.S. Appl. No. 17/315,995, Notice of Allowance dated Feb. 14, 2022", 9 pgs.
"Chinese Application Serial No. 201780013448.9, Office Action dated Apr. 2, 2020", W/English Translation, 17 pgs.
"Chinese Application Serial No. 201780013448.9, Office Action dated Oct. 12, 2020", w/ English Translation, 9 pgs.
"Chinese Application Serial No. 201780013448.9, Response filed Jul. 27, 2020 to Office Action dated Apr. 2, 2020", w/ English claims, 23 pgs.
"Chinese Application Serial No. 201780071089.2, Office Action dated Aug. 18, 2021", w/ English Translation, 12 pgs.
"Chinese Application Serial No. 201780071089.2, Response filed Dec. 29, 2021 to Office Action dated Aug. 18, 2021", w/ English claims, 22 pgs.
"Chinese Application Serial No. 20178007189.2, Response filed Jul. 29, 2021 to Office Action dated May 24, 2021", w/ English translation, 32 pgs.
"Cuda tool kit documentation", v7.5, [Online] Retrieved from the Internet : <http://docs.nvidia.com/cuda/#axzz40TlGVdNL>, (Sep. 1, 2015).
"CUDA Toolkit Documentation v7.5", Installation Guides, [Online] Retrieved on Feb. 18, 2016 from the Internet: <URL: http://docs.nvidia.com/cuda/>, (Sep. 2015).
"European Application Serial No. 17753515.0, Communication pursuant to Article 94(3) dated Aug. 5, 2020", 12 pgs.
"European Application Serial No. 17753515.0, Extended European Search Report dated Apr. 29, 2019", 27 pgs.
"European Application Serial No. 17753515.0, Invitation pursuant to Article 94(3) and Rule 71(1) EPC dated Jul. 5, 2020", 4 pgs.
"European Application Serial No. 17753515.0, Partial Supplementary European Search Report dated Jan. 3, 2019", 16 pgs.
"European Application Serial No. 17753515.0, Response filed Nov. 15, 2019 to Extended European Search Report dated Apr. 29, 2019", 31 pgs.
"Indian Application Serial No. 201827035270, Office Action dated Mar. 17, 2021", w/ English translation, 70 pgs.
"Indian Application Serial No. 201827035270, Office Action dated Mar. 17, 2021", w/ English claims, 407 pages.
"International Application Serial No. PCT/KR2017/001790, International Search Report dated May 23, 2017", w/English Translation, 5 pgs.
"International Application Serial No. PCT/KR2017/001790, Written Opinion dated May 23, 2017", w/English Translation, 24 pgs.
"Japanese Application Serial No. 2018-562485, Notification of Reasons for Rejection dated Sep. 24, 2019", W/English Translation, 10 pgs.
"Japanese Application Serial No. 2018-562485, Response filed Dec. 23, 2019 to Notification of Reasons for Rejection dated Sep. 24, 2019", w/ English machine translation, 10 pgs.
"Japanese Application Serial No. 2020-022170, Notification of Reasons for Refusal dated Jun. 1, 2021", w/English Translation, 6 pgs.
"Korean Application Serial No. 10-2018-7023908, Notice of Preliminary Rejection dated Jan. 6, 2020", W/ English Translation, 19 pgs.
"Korean Application Serial No. 10-2018-7023908, Response filed Mar. 5, 2020 to Notice of Preliminary Rejection dated Jan. 6, 2020", w/ Machine English translation, 62 pgs.
"Korean Application Serial No. 10-2019-7013504, Office Action dated Mar. 19, 2020", w/ Machine English Translation, 14 pgs.
"Korean Application Serial No. 10-2019-7013504, Response filed May 12, 2020 to Office Action dated Mar. 19, 2020", w/ Machine English Translation, 60 pgs.
"Korean Application Serial No. 10-2019-7013504, Voluntary Amendment filed Sep. 10, 2020", w/ Machine Translation, 4 pgs.
"Korean Application Serial No. 10-2020-7025921, Notice of Preliminary Rejection dated Feb. 5, 2021", w/ English Translation, 8 pgs.
"Korean Application Serial No. 10-2020-7027413, Notice of Preliminary Rejection dated Oct. 12, 2020", w/ English Translation, 8 pgs.
"Korean Application Serial No. 10-2021-7013537, Notice of Preliminary Rejection dated May 20, 2021", w/English Translation, 7 pgs.
"Korean Application Serial No. 10-2021-7038744, Notice of Preliminary Rejection dated Mar. 28, 2022", w/ English Translation, 9 pgs.
"Korean Application Serial No. 10-2022-7003157, Notice of Preliminary Rejection dated May 2, 2022", w/ English translation, 7 pgs.
"Nvidia video decoder (NVCUVID) interface", Programming Guide DA-05614-001_v8.0, (Nov. 2015), 1-8.
"Nvidia Video Encoder (NVENC) Interface", Programming Guide PG-06155-011_v06, (Oct. 2015), 5-22.
"Panoramic video processing by the omnidirectional camera Ladybug 2", image laboratory, vol. 16 w/English Translation, (Dec. 1, 2005), 24 pgs.
Bourke, et al., "Spherical Projections (Stereographic and Cylindrical)", in Transformations and Projections; Spherical Projections, (Dec. 1999), 1-40.
Jain, "Introduction to H.264 Video Standard", Presentation Transcript, [Online] Retrieved from the Internet: <URL: http:l/slideplayer.com/slide/3819249>, (2015), 33 pgs.
Paul, Bourke, "Spherical Projections (Stereographic and Cylindrical)", Transformations and Projections, (Dec. 1999), 40 pgs.
Yu, et al., "Texture Mapping", California State University, San Bernardino: CSE 520 Advanced Computer Graphics, via internet, (2010), 2 pgs.
"U.S. Appl. No. 17/729,225, Non Final Office Action dated Sep. 16, 2022", 14 pgs.

(56) References Cited

OTHER PUBLICATIONS

U.S. Appl. No. 15/094,336 U.S. Pat. No. 10,334,224, filed Apr. 8, 2016, Systems and Method for GPU Based Virtual Reality Video Streaming Server.

U.S. Appl. No. 16/391,486 U.S. Pat. No. 10,904,511, filed Apr. 23, 2019, Systems and Method for GPU Based Virtual Reality Video Streaming Server.

U.S. Appl. No. 16/868,974 U.S. Pat. No. 11,050,996, filed May 7, 2020, Systems and Method for GPU Based Virtual Reality Video Streaming Server.

U.S. Appl. No. 17/315,995 U.S. Pat. No. 11,375,172, filed May 10, 2021, Systems and Method for GPU Based Virtual Reality Video Streaming Server.

U.S. Appl. No. 17/729,225, filed Apr. 26, 2022, Systems and Method for GPU Based Virtual Reality Video Streaming Server.

U.S. Appl. No. 15/268,111 U.S. Pat. No. 9,912,717, filed Sep. 16, 2016, Systems and Method for Virtual Reality Video Conversion and Streaming.

U.S. Appl. No. 15/877,799, filed Jan. 23, 2018, Systems and Method for Virtual Reality Video Conversion and Streaming.

U.S. Appl. No. 16/689,520 U.S. Pat. No. 10,939,087, filed Nov. 20, 2019, Systems and Method for Virtual Reality Video Conversion and Streaming.

U.S. Appl. No. 17/158,654, filed Jan. 26, 2021, Systems and Method for Virtual Reality Video Conversion and Streaming.

"U.S. Appl. No. 17/729,225, Response filed Dec. 2, 2022 to Non Final Office Action dated Sep. 16, 2022", 12 pgs.

"U.S. Appl. No. 17/729,225, Final Office Action dated Mar. 15, 2023", 15 pgs.

"Chinese Application Serial No. 202110538787.7, Office Action dated Dec. 1, 2022", w/ English Translation, 10 pgs.

"Chinese Application Serial No. 202110538787.7, Response filed Apr. 14, 2023 to Office Action dated Dec. 1, 2022", w/ English claims, 12 pgs.

"Chinese Application Serial No. 202110538794.7, Office Action dated Jan. 11, 2023", w/ English Translation, 13 pgs.

"Japanese Application Serial No. 2022-032850, Notification of Reasons for Refusal dated May 9, 2023", w/ English Translation, 6 pgs.

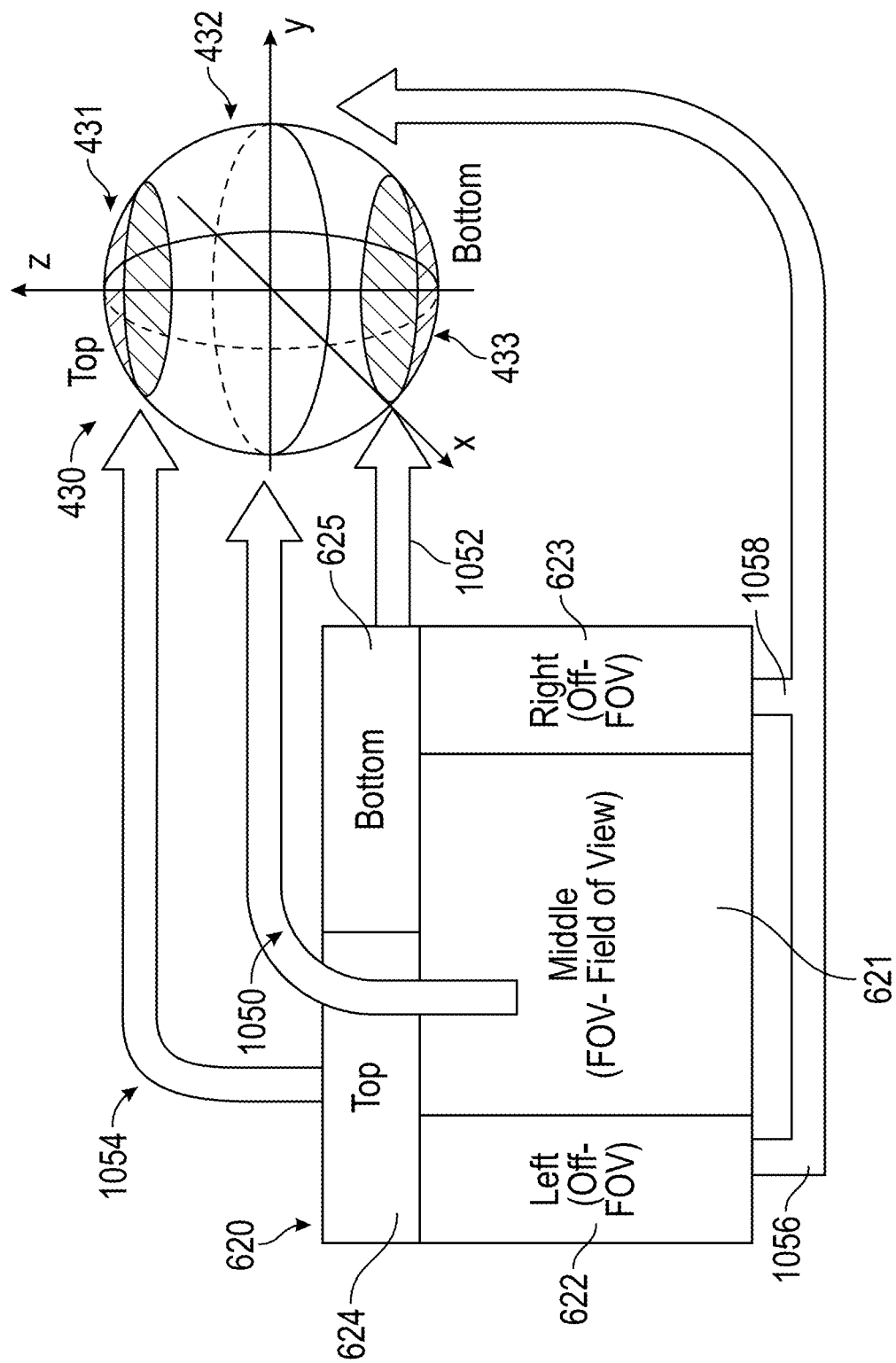

SYSTEMS AND METHOD FOR VIRTUAL REALITY VIDEO CONVERSION AND STREAMING

CROSS-REFERENCE TO RELATED APPLICATION

This application is a continuation of U.S. patent application Ser. No. 17/158,654, filed Jan. 26, 2021, which is a continuation of U.S. patent application Ser. No. 16/689,520, filed Nov. 20, 2019, which is a continuation of U.S. patent application Ser. No. 15/877,799, filed Jan. 23, 2018, which is a divisional of U.S. patent application Ser. No. 15/268,111, filed Sep. 16, 2016 which claims benefit of priority from U.S. Provisional Application No. 62/297,394, filed Feb. 19, 2016, the entire contents of all of which are incorporated herein by reference.

TECHNICAL FIELD

The present disclosure relates to systems and methods for virtual reality video conversion and streaming and more particularly to systems and methods for downscaling, reformatting, and encoding virtual reality (VR) video data.

BACKGROUND

Virtual Reality (VR) video contents usually have significantly high resolution in order to provide 360 degree view video data. For example, the 360 degree video data may include Ultra High Definition (UHD) video data having 2K (2560×1440) or 4K (3840×1920 or 3840×2160) or higher resolution with 30-60 frames per second (FPS).

VR video streaming can be implemented by transferring the whole frame data (for example, data in a compressed media format, e.g., H.264/AAC) and rendering a spherical image frame at client devices (e.g., smartphone or a head mount display). Improvements in such data transferring and rendering method remain desired.

SUMMARY

In one aspect, a system for virtual reality (VR) video streaming is presented including a first processor, a first memory, a graphics processing unit (GPU), a second memory including a plurality of frame buffers, and a video server implemented by at least one of the first processor or the GPU. A system for processing a virtual reality video is presented including a first processor, a communication server implemented by the first processor, a video server implemented by the first processor, and a streaming server implemented by the first processor. The communication server may be configured to cause the first processor to receive, from a client device via a first connection, first information relating to a first field of view (FOV). The video server may be configured to cause the first processor to convert frame data of a first spherical image to frame data of a first equirectangular image such that a first area corresponding to the first FOV is a middle area of the first equirectangular image, scale the first area of the first equirectangular image corresponding to the first FOV at a first resolution, scale a second area of the first equirectangular image adjacent to the first area at a second resolution smaller than the first resolution, scale a third area of the first equirectangular image that is adjacent to the first area and is not adjacent to the second area, at a third resolution smaller than the first resolution, rearrange the scaled first area, scaled second area and scaled third area such that the scaled second area and the scaled third area are adjacent to each other, to generate reformatted first equirectangular image frame data, and encode the reformatted first equirectangular image frame data to generate encoded first equirectangular image frame data. The streaming server may be configured to cause the first processor to stream the encoded first equirectangular image frame data to the client device via a second connection.

In another aspect, a method of processing a virtual reality video is presented that includes receiving by a processor of a communication server, from a client device via a first connection, first information relating to a first field of view (FOV). The method may further include converting by a processor of a video server, frame data of a first spherical image to frame data of a first equirectangular image such that a first area corresponding to the first FOV is a middle area of the first equirectangular image. The method may further include scaling by the processor of the video server, the first area of the first equirectangular image at a first resolution. The method may further include scaling a second area of the first equirectangular image adjacent to the first area at a second resolution smaller than the first resolution. The method may further include scaling a third area of the first equirectangular image that is adjacent to the first area and is not adjacent to the second area, at a third resolution smaller than the first resolution. The method may further include rearranging the scaled first area, scaled second area and scaled third area such that the scaled second area and the scaled third area are adjacent to each other, to generate reformatted first equirectangular image frame data. The method may further include encoding by the processor of the video server, the reformatted first equirectangular image frame data to form encoded first equirectangular image frame data. The method may further include streaming by a processor of a streaming server, the encoded first equirectangular image frame data to the client device via a second connection.

In one aspect, a system is presented including a processor, a memory, a video server implemented by the processor, a communication server implemented by the processor, and a streaming server implemented by the processor. The video server may be configured to cause the processor to create a plurality of files corresponding to a plurality of view angles and store the plurality of files in the memory, each of the plurality of files including a plurality of group of pictures (GOPs) forming a video stream with an identical field of view (FOV) from an identical view angle. The communication server may be configured to cause the processor to receive, from a client device via a first connection, first information relating to a first view angle. In response to the communication server receiving the first information, the streaming server may be configured to cause the processor to read, among the plurality of files, a first file including a first video stream corresponding to a view angle closest to the received first view angle, and stream, from the first file, the first video stream to the client device via a second connection. The communication server may be further configured to cause the processor to receive, from the client device, second information relating to a second view angle while the streaming server streams the first video stream. In response to the communication server receiving the second information, the streaming server may be configured to cause the processor to switch from the first file to a second file including a second video stream corresponding to a view angle closest to the second view angle, read the second file, and stream, from the second file, the second video stream to the client device via the second connection.

BRIEF DESCRIPTION OF THE DRAWINGS

The above and related objects, features, and advantages of the present disclosure will be more fully understood by reference to the following detailed description, when taken in conjunction with the following figures, wherein:

FIGS. 10A, 10B and 10C are block diagrams of an example video processing and rendering method in an example VR client device, according to some implementations;

DETAILED DESCRIPTION

The "communication sever," "video server," and the "streaming server" can be included in physically different servers, or can be included in different functional portions of the same physical server.

Figure 4A:
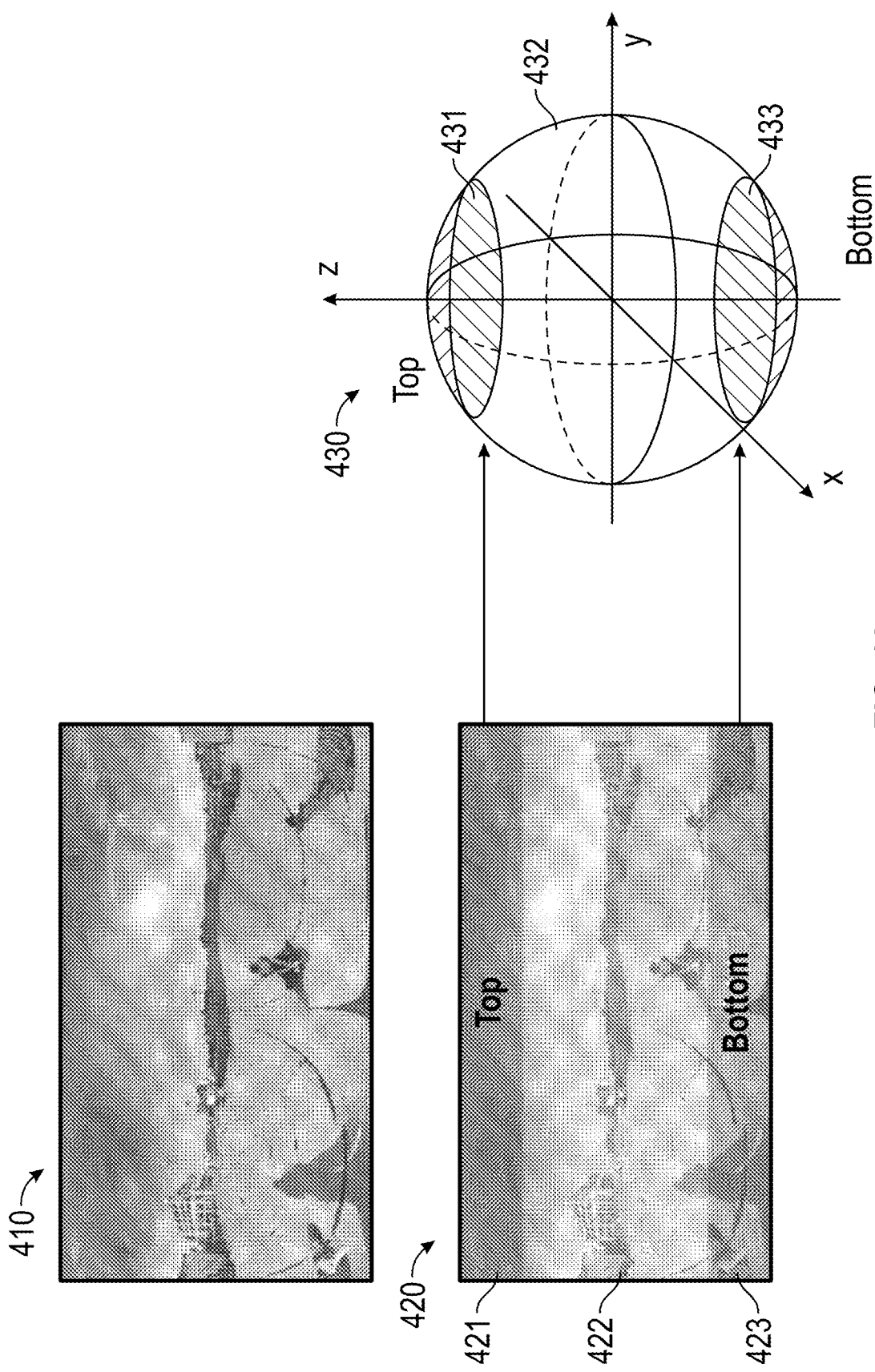
FIG. 4A shows an example mapping between an equirectangular frame image and a spherical frame image.
Figure 4B:
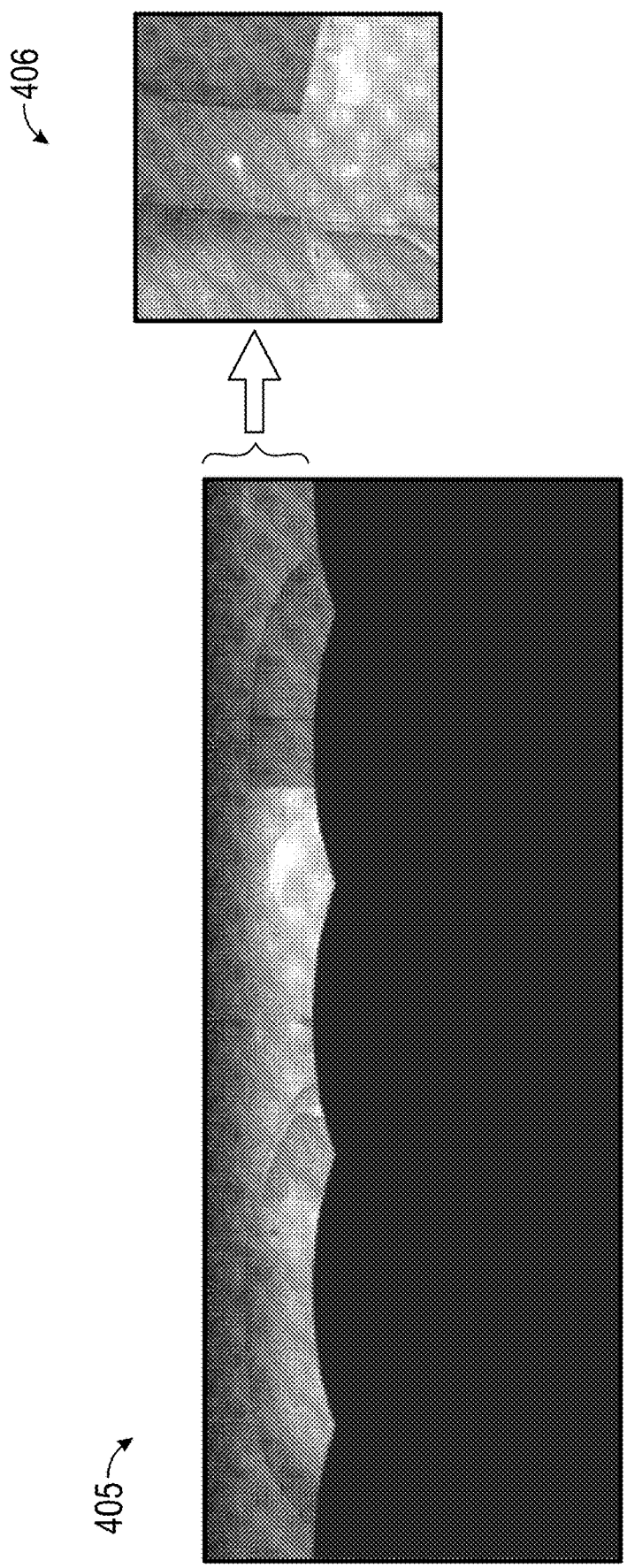
FIG. 4B shows an example equirectangular frame image and its corresponding spherical frame image.

Presented are systems and methods for virtual reality video conversion and streaming and more particularly to systems and methods for downscaling, reformatting, and encoding virtual reality (VR) video data. High quality VR video/audio content (e.g., 360 degree view video data) is enormously large in data size due to its high resolution—2K(2560×1440), 4K (3840×2160 or 3840×1920), etc. VR video streaming can be implemented by simply transferring the whole video data (e.g., in compressed media format, H.264/AAC) and rendering a spherical image at client devices (e.g., smartphones and head mount displays). For example, referring to FIG. 4A, VR video streaming can be implemented by transferring the whole data of an equirectangular frame image 410 to a client device. The client device can then render a corresponding spherical frame image 430 by mapping a top area 421, a middle area 422 and a bottom area 423 of the equirectangular frame image 410 to a top part 431, a middle part 432 and a bottom part 433 of the spherical frame image 430, respectively. In this case, 360 VR video is constructed in such a way that top and bottom areas of the equirectangular frame image takes significant portion (e.g., 50%) of the whole area while representing only small circular parts in the rendered spherical frame image at the screen (see the top part 431 and bottom part 433 of the spherical frame image 430). FIG. 4B shows an example equirectangular frame image and its corresponding spherical frame image, in which a top area of the equirectangular frame image (e.g., 405 in the left picture of FIG. 4B) takes significant portion of the whole area while representing only a small circular top part in the rendered spherical frame image (e.g., 406 in the right picture of FIG. 4B). Moreover, viewers of VR video usually focus much more on a middle are (e.g., −45° to 45° in vertical degrees (or altitude)). Therefore, a reduced resolution in top and bottom areas of an equirectangular frame image in such data transferring and rendering method remain desired.

In some implementation, a resolution of 1:1 quality matching with an original source (e.g., a 4K (3840×2160) source) is maintained anywhere in a main surrounding area (e.g., a middle area) of a frame while downscaling other areas (e.g., top and bottom areas) of the frame. In some implementation, a server receives from a client device, first information relating to a first field of view (FOV) or a view angle of a viewer. For example, referring to FIG. 6A, a view angle (e.g., α° in FIG. 6A) can be defined as an azimuth angle from a reference vector or direction (e.g., the direction of 0° in FIG. 6A) representing a direction of the viewer's line of sight (LOS). In some implementations, a field of view (FOV) can be defined as a range between two azimuth angles (e.g., the range between 3α° and (n−1) α° in FIG. 6A) in which the viewer sees with a client device. An off-field-of-view (off-FOV) can be defined as an azimuth angle range in which the viewer cannot see with the client device (e.g., an azimuth angle range other than the FOV range; see FIG. 6A). In some implementations, a field of view (FOV) can be defined as a range between two vertical or altitude angles (e.g., a range between −45° and +45° in altitude) in which the viewer sees with a client device. Similarly, an off-field-of-view (off-FOV) can be defined as a vertical or altitude angle range in which the viewer cannot see with the client device (e.g., a vertical or altitude angle range other than the vertical or altitude angle FOV range). In some implementation, the server converts frame data of a first spherical image to frame data of a first equirectangular image such that a first area corresponding to the first FOV is a middle area of the first equirectangular image. In some implementation, the server scales the first area (e.g., a middle area) of the first equirectangular image at a first resolution (e.g., the same resolution as an original source video). In some implementations, the server scales (or downscales) a second area (e.g., a top area) of the first equirectangular image adjacent to the first area at a second resolution smaller than the first resolution. In some implementations, the server also scales (or downscales) a third area (e.g., a bottom area) of the first equirectangular image that is adjacent to the first area (e.g., the middle area) and is not adjacent to the second area (e.g., the top area), at a third resolution smaller than the first resolution. In some implementations, the server downscales an off-FOV area of the first equirectangular image (e.g., an area in the off-FOV region; see FIG. 6A) at a fourth resolution smaller than the first resolution. In some implementations, the off-FOV area can be either a left-side area or a right-side area from the middle FOV area of the first equirectangular image. With this downscaling method, a reduced resolution in a top area or a bottom area or a left-side area or a right-side area of equirectangular images can be implemented, thereby saving a large amount of data transfer size.

In some implementations, the scaled first area (e.g., the middle or FOV area), scaled second area (e.g., the downscaled top area) and scaled third area (e.g., the downscaled bottom area) such that the scaled second area and the scaled third area are adjacent to each other, to generate reformatted first equirectangular image frame data. In some implementations, the server encodes the reformatted first equirectangular image frame data to form encoded first equirectangular image frame data. In some implementations, the server streams the encoded first equirectangular image frame data to the client device. With this reformatting method, after downscaling is performed, the reformatted equirectangular image frame data can remain in an equirectangular format and can be transferred to a client device in the equirectangular format, thereby simplifying the decoding and rendering processes in the client device.

Figure 1:
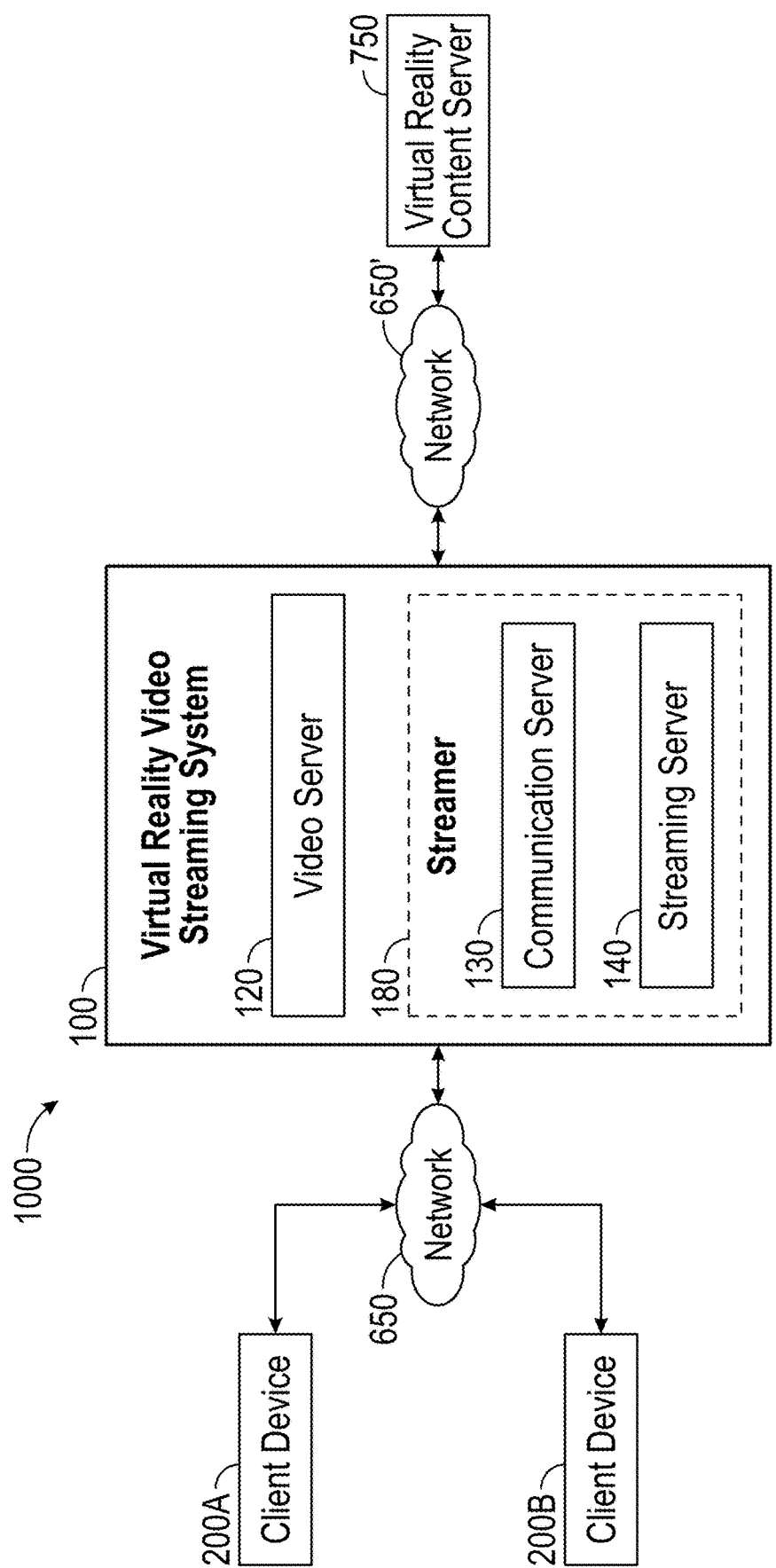
FIG. 1 is a block diagram of a network environment with client devices and a VR video streaming system according to some implementations.

FIG. 1 is a block diagram of an example network environment 1000 with a VR video streaming system 100 and client devices 200A and 200B, and a V R content server 750. In broad overview, the illustrated network environment includes a network 650 of interconnected network nodes (e.g., client devices and VR video systems) and a network 650' of interconnected network nodes (e.g., VR video systems and VR content servers). In some implementations, the network 650 is the same network as the network 650'. Referring to FIG. 1 in more detail, the network 650 or 650' is a network facilitating interactions between participant devices. An illustrative example network 650 or 650' is the Internet; however, in other implementations, the network 650 may be another network, such as a local network within a data center, a network fabric, or any other local area or wide area network. The network 650 or 650' may be composed of multiple connected sub-networks or autonomous networks. The network 650 or 650' can be a local-area network (LAN), such as a company intranet, a metropolitan area network (MAN), a wide area network (WAN), an inter-network such as the Internet, or a peer-to-peer network, e.g., an ad hoc WiFi peer-to-peer network. Any type and/or form of data network and/or communication network can be used for the network 650 or 650'. It can be public, private, or a combination of public and private networks. In general, the network 650 or 650' is used to convey information between computing devices, e.g., client devices 200A and 200B, the VR video streaming system 100, and the VR content server 750.

Figure 2:
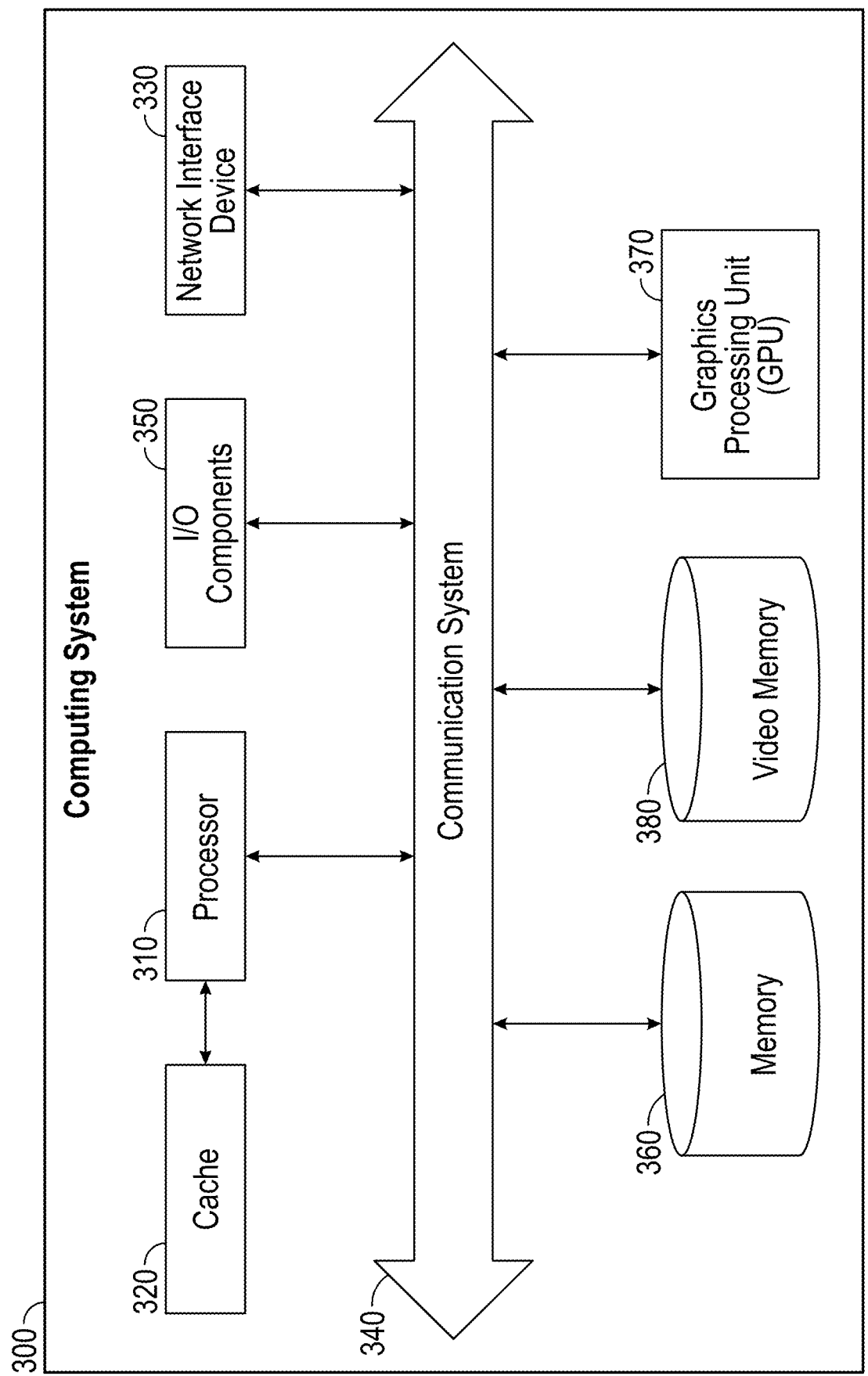
FIG. 2 is a block diagram of an example computing system.

Referring to FIG. 1, the VR video streaming system 100 includes a video server 120 and a streamer 180. In some implementations, the video server 120 stores VR video data locally (e.g., as video files) or receive streaming video data from the VR content server 750. In some implementations, the streamer 180 includes a communication server 130 and a streaming server 140. In some implementations, the communication server 130 communicates information relating to services of the streaming systems 100 (e.g., user login, VR video contents selection, low-latency video streaming, FOV related information, etc.) with each of the client devices 200A and 200B. In some implementations, the streaming server 140 streams VR video frame data to each client device. In some implementations, the VR video streaming system 100 has configuration similar to that of a computing system 300 as shown in FIG. 2. The computing system 300 is described in more detail below, in reference to FIG. 2. The elements shown in the computing system 300 illustrated in FIG. 2 do not all need to be present in some implementations of the VR video streaming system 100 illustrated in FIG. 1. In some implementations, each of the video server 120 and the streamer 180 (and the streaming server 140 therein) has configuration similar to that of a computing system 300 as shown in FIG. 2, so that the video server 120, the streamer 180 and the client devices 200A and 200B can communicate with each other via a network similar to the network 650. With this configuration, the video processing by the video server 120 and the streaming service provided by the streamer 180 can be performed separately (e.g., in separate physical servers). In some implementations, the streamer 180 can be included in the client devices 200A and 200B so that the client devices can serve their own video streams via communication with the video server 120.

Referring again to FIG. 1, each of the client devices 200A and 200B can receive video streaming data from the VR video streaming system 100, e.g., more particularly, from the streaming server 140 of the streamer 180. In some implementations, each client device is a virtual reality client device having a display (e.g., head mounted displays (HMDs), optical HMDs), input devices (e.g., cameras, headsets), and sensors (e.g., motion sensor devices, position/orientation sensors, motion simulators, gesture tracking systems, etc.). In some implementations, each of the client devices 200A and 200B can also communicate with the communication server 130 to exchange information relating to services of the VR video streaming system 100. For example, each client device can provide the communication server 130 with the current field of view (FOV) of a user in the form of view angle data indicating azimuth angles and pitch angles. In some implementations, the client devices 200A and 200B have configuration similar to that of a computing system 300 as shown in FIG. 2. The computing system 300 is described in more detail below, in reference to FIG. 2. The elements shown in the computing system 300 illustrated in FIG. 2 do not all need to be present in some implementations of the client devices 200A and 200B illustrated in FIG. 1.

FIG. 2 is a block diagram of an example computing system 300. The example computing system 300 is suitable for use in implementing the computerized components described herein, in accordance with an illustrative implementation. In broad overview, the computing system 300 includes at least one processor 310 for performing actions in accordance with instructions and one or more memory devices 360 or 320 for storing instructions and data. The computing system 300 also includes at least one graphics processing unit (GPU) 370 and a video memory 380, as will be described in the following sections.

Referring to FIG. 2, the illustrated example computing system 300 includes one or more processors 310 in communication, via a communication system 340 (e.g., bus), with memory 360, at least one network interface controller 330 with network interface port for connection to a network (not shown), and other components, e.g., input/output ("I/O") components 350. Generally, the processor(s) 310 will execute instructions (or computer programs) received from memory. The processor(s) 310 illustrated incorporate, or are directly connected to, cache memory 320. In some instances, instructions are read from memory 360 into cache memory 320 and executed by the processor(s) 310 from cache memory 320.

In more detail, the processor(s) 310 may be any logic circuitry that processes instructions, e.g., instructions fetched from the memory 360 or cache 320. In many implementations, the processor(s) 310 are microprocessor units or special purpose processors. The computing device 300 may be based on any processor, or set of processors, capable of operating as described herein. The processor(s) 310 may be single core or multi-core processor(s). The processor(s) 310 may be multiple distinct processors.

The memory 360 may be any device suitable for storing computer readable data. The memory 360 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 300 may have any number of memory devices 360.

The cache memory 320 is generally a form of computer memory placed in close proximity to the processor(s) 310 for fast read times. In some implementations, the cache memory 320 is part of, or on the same chip as, the processor(s) 310. In some implementations, there are multiple levels of cache 320, e.g., L2 and L3 cache layers.

The network interface controller 330 manages data exchanges via the network interface 335 (sometimes referred to as network interface ports). The network interface controller 330 handles the physical and data link layers of the OSI model for network communication. In some implementations, some of the network interface controller's tasks are handled by one or more of the processor(s) 310. In some implementations, the network interface controller 330 is part of a processor 310. In some implementations, a computing system 300 has multiple network interfaces 335 controlled by a single controller 330. In some implementations, a computing system 300 has multiple network interface controllers 330. In some implementations, each network interface 335 is a connection point for a physical network link (e.g., a cat-5 Ethernet link). In some implementations, the network interface controller 330 supports wireless network connections and an interface port 335 is a wireless (e.g., radio) receiver/transmitter (e.g., for any of the IEEE 802.11 protocols, near field communication "NFC", Bluetooth, ANT, or any other wireless protocol). In some implementations, the network interface controller 330 implements one or more network protocols such as Ethernet. Generally, a computing device 300 exchanges data with other computing devices via physical or wireless links through a network interface 335. The network interface 335 may link directly to another device or to another device via an intermediary device, e.g., a network device such as a hub, a bridge, a switch, or a router, connecting the computing device 300 to a data network such as the Internet.

The computing system 300 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 300 may include an interface (e.g., a universal serial bus (USB) interface) for connecting input devices, output devices, or additional memory devices (e.g., portable flash drive or external media drive). In some implementations, a computing device 300 includes an additional device such as a co-processor, e.g., a math co-processor can assist the processor 310 with high precision or complex calculations.

The GPU 370 may be a graphics accelerator chip, processor, application specific integrated circuit, analog circuit, digital circuit, accelerator card, or combinations thereof. In one implementations, the GPU 370 may be a personal computer graphics accelerator card or components, such as manufactured by nVidia, ATI, or Matrox. The GPU 370 provides hardware devices for accelerating volume rendering processes, such as using application programming interfaces (APIs) for three-dimensional texture mapping. For example, such APIs include OpenGL and DirectX, but other APIs may be used independent of or with the GPU 370. Exemplary APIs for nVidia GPUs are described in a web document entitled "CUDA Toolkit Documentation v. 7.5," available at http://docs.nvidia.com/cuda/#axzz40TIGVdNL, which is incorporated herein by reference for details as to how to configure GPUs to accomplish the functions as set forth in this patent application. In some implementations, based on an API or an application controlling the API, the GPU 370 is operable for transformations, projections, and mapping for computer graphics (e.g., spherical projections and coordinate system translations).

The video memory 380 is a video random access memory (VRAM), a random access memory, a random access memory (RAM) drive or RAM disk, or other memory device for storing data or video information. In one implementations, the video memory 380 is a video random access memory of the GPU 370. A driver for the GPU 370 or a memory driver controls storage of data by the video memory 380. The video memory 380 is responsive to the driver to store, transfer, and retrieve data. The video memory 380 is operable to store subsets or bricks of data.

Figure 3:
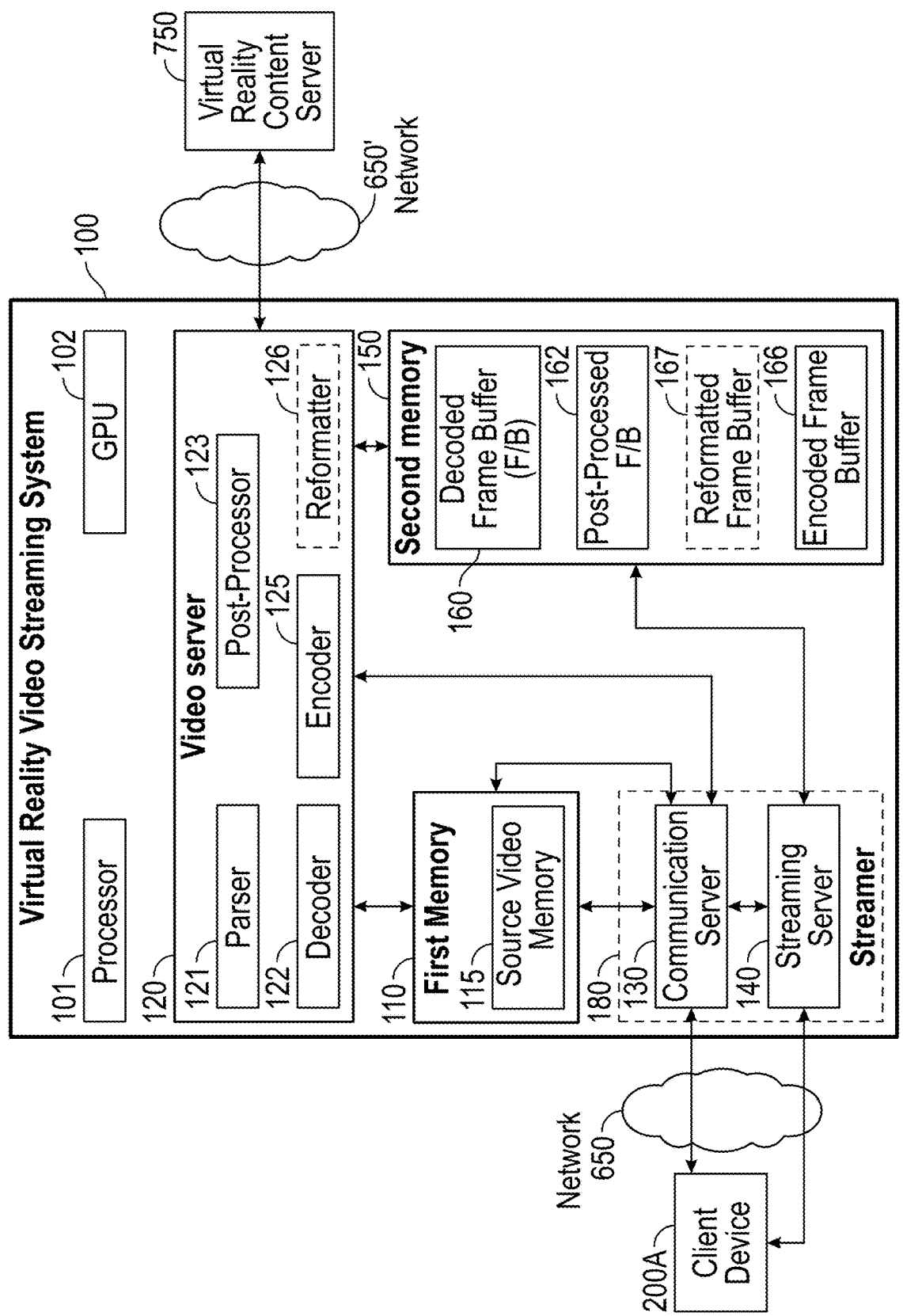
FIG. 3 is a block diagram of an example VR video streaming system.

FIG. 3 is a block diagram of an example VR video streaming system. Referring to FIG. 3, in some implementations, the VR video streaming system 100 includes a first processor 101, a first memory 110, a GPU 102, a second memory 150 including a plurality of frame buffers (e.g., a decoded frame buffer 160, a post-processed frame buffer 165, an encoded frame buffer 164, a reformatted frame buffer 167). In some implementations, the first processor 101 has similar configuration to the processor 310 in FIG. 2. In some implementations, the GPU 102 has similar configuration to the GPU 370 in FIG. 2. In some implementations, the first memory 110 has similar configuration to the memory 360 in FIG. 2. In some implementations, the second memory 150 has similar configuration to the video memory 380 in FIG. 2. In some implementations, the system 100 includes source video memory 115, which can reside in the first memory 110 or the second memory 150.

Referring to FIG. 3, in some implementations, the video server 120 can be executable by (or implemented by) either the first processor 101 or the GPU 102. For example, the video server 120 may be configured to read, via the first processor, source video data from a video data source (e.g., video files locally stored in the video server 120, or video data streamed from the VR content server 750). In some implementations, the source video data includes multiple spherical image frame data (e.g., 360 degree UHD 4K frame data). In some implementations, the video server 120 may store the source video data in the source video memory 115.

In some implementations, the video server 120 may include a parser 121, a decoder 122, a post-processor 123, a reformatter 126, and an encoder 125, executable by (or implemented by) the GPU 102. In some implementations, the parser 121 parses, via GPU 102, the source video data stored in the source video memory 115 and identifies different spherical image frames from the source video data. In some implementations, the decoder 122 decodes, via GPU 102, the parsed spherical image frames and stores them in the decoded frame buffer 160. In some implementations, the decoder 122 and encoder 124 may use industry standard compression/decompression technology, such as H.264/HEVC (High Efficiency Video Coding). In some implementations, the decoder 122 decodes first spherical image frame data and store the decoded data in the decoded frame buffer 160. An exemplary decoder is described in a document entitled "NVIDIA VIDEO DECODER (NVCUVID) INTERFACE Programming Guide," November 2015, which is incorporated herein by reference for details as to how to configure a decoder to accomplish the decoding functions as set forth in this patent application. In some implementations, the post-processor 123 performs a color format conversion. For example, the post-processor 123 may convert frame data stored in the decoded frame buffer 160, from a luminance/chrominance format to an Alpha Red Green Blue (ARGB) color format. In some implementations, the post-processor 123 stores color format-converted frame data in the post-processed frame buffer 162. In some implementations, the post-processor 123 performs, via GPU 102, a spherical-equirectangular conversion (e.g., using spherical/equirectangular projection or mapping methods). Exemplary spherical/equirectangular projections are described in a document entitled "Transformations and projections," written by Paul Bourke, which is incorporated herein by reference for details as to the projections, conversions, and mapping methods described in this patent application. In some implementations, in response to storing first spherical image frame data in the decoded frame buffer 160, the post-processor 123 converts, via GPU 102, the first spherical image frame data to first equirectangular image frame data. For example, the post-processor 123 converts, via GPU 102, 360 degree 4K UHD image frame data to corrected or undistorted equirectangular image frame data. In some implementations, the post-processor 123 converts, via GPU 102, the first spherical image frame data (e.g., 360 degree 4K UHD image frame data) to first equirectangular image frame data that correspond to a portion of spherical image represented by the first spherical image frame data (e.g., a portion of 360 degree 4K UHD image frame data that corresponds the current field of view (FOV) of the user in a client device). In some implementations, the post-processor 123 converts, via GPU 102, the first spherical image frame data (e.g., 360 degree 4K UHD image frame data) to first equirectangular image frame data that correspond to the entirety of spherical image represented by the first spherical image frame data (e.g., the entire portion of 360 degree 4K UHD image frame data).

In some implementation, the post-processor 123 also performs, via GPU 102, augmented reality (AR) processing. For example, the post-processor 123 may blend the converted first equirectangular image frame with graphics contents (e.g., blending a road image with a vehicle image) or textual/graphical information (e.g., blending a street image with shop information). In some implementation, in response to completing post-processing operations (e.g., spherical-equirectangular conversion), the post-processor 123 stores post-processed frame data in the post-processed frame buffer 162.

In some implementation, the reformatter 126 performs, via GPU 102 or the processor 101, downscaling and rearrangement (or reformatting) on equirectangular image frames. In some implementation, the reformatter 126 performs, via GPU 102 or the processor 101, determines width and height of downscaled areas of an equirectangular image frame based on complexity analysis. For example, referring to FIG. 7A, for the complexity analysis, the reformatter 126 may include a spatial complexity analyzer 702, a spatial complexity accumulator 704, a temporal complexity analyzer 703, a temporal complexity accumulator 705, and a width and height calculator 710. Details of the complexity analysis will be described in the following sections with reference to FIGS. 7A-7C. In some implementation, the reformatter 126 performs, via GPU 102 or the processor 101, artifacts processing. Details of the artifacts processing will be described in the following sections with reference to FIGS. 8A-8E. In some implementations, the reformatter stores reformatted frame data in the reformatted frame buffer 167.

In some implementations, the encoder 124 encodes, via GPU 102, the post-processed frame data stored in the post-processed frame buffer 165, and stores encoded frame data in the encoded frame buffer 166. In some implementations, the encoder 124 encodes, via GPU 102, the reformatted frame data stored in the reformatted frame buffer 167, and stores encoded frame data in the encoded frame buffer 164. An exemplary encoder is described in a document entitled "NVIDIA VIDEO ENCODER (NVENC) INTERFACE Programming Guide," October 2015, which is incorporated herein by reference for details as to how to configure an encoder to accomplish the encoding functions as set forth in this patent application. In some implementations, the parser 121, the decoder 122, the post-processor 123, the reformatter 126 and the encoder are executed by the GPU 102 of the system 100. In some implementations, some operations of the parser 121, the decoder 122, the post-processor 123, the reformatter 126 and the encoder are executed by the first processor 101 and others operations are executed by the GPU 102.

Referring to FIG. 3, in some implementations, the system 100 includes the communication server 130 executable by (or implemented by) at least one of the first processor 101 or the GPU 102. In some implementations, the communication server 130 establishes, via the first processor 101, a connection to a client device, e.g., the client device 200A. In some implementation, the established connection uses a full-duplex channel protocol, e.g., using a websocket protocol, thereby reducing latency through a few frames (e.g., websocket frames) without communicating large amounts of protocol headers (e.g., http headers). In some implementations, the communication server 130 can transmit to the client device first information relating to a first field of view (FOV) corresponding to the first equirectangular image frame data converted by the post-processor 123 and/or reformatted by the reformatter 126. In some implementations, the communication server 130 can receive, from the client device, second information relating to a second FOV, e.g., the current FOV of the user of the client device. In some implementation, both in the client device 200A and streaming system 100, an initial FOV is by default set to an angle straight towards right at the center of the image frame the user currently watches. In some implementations, information relating to FOVs includes view angles indicating pitch angles and azimuth angles. In some implementations, information relating to FOVs includes an azimuth view angle (see FIG. 6A) representing a line-of-sight of the viewer and an azimuth FOV (see FIG. 6A) representing an azimuth angle range in which the viewer can see. In some implementations, information relating to FOVs includes a vertical or altitude view angle representing a line-of-sight of the viewer and a vertical or altitude FOV representing a vertical or altitude angle range in which the viewer can see (e.g., a range between −45° and +45° in altitude). In some implementations, upon request from a client device (e.g., via websocket protocol), the communication server can update, via the first processor 101, the current FOV of the user (of the client device) during the GPU operations of the video server 120, e.g., during operations by the parser 121, the decoder 122, the post-processor 123, the reformatter 126 and the encoder 124. In some implementations, client devices can update the communication server on the current view angle of a user of the client devices via a stable connection method (e.g., jetty based on websocket protocol) with the communication server, thereby providing a constant connection state and reducing security overhead and latency.

In some implementations, a client device can make request for particular VR image/video data to the communication server 130. For example, a client device can make a VR image request to the communication server via websocket protocol. In some implementations, upon this request from the client device, the communication server can fetch, via the first processor, corresponding source video data (e.g., from a local file or from streaming by the VR content server 750) and provide it to the GPU 102 so that the GPU 102 can perform operations of the above-described decoding/post-processing/reformatting/encoding on the corresponding video data. In some implementations, the communication server can provide a web service for use of managing services of the VR video streaming system 100 (e.g., managing user login and credentials validation to the services, managing user accounts/profiles, and listing VR video contents so that users can choose video content to watch).

Referring to FIG. 3, the system 100 may include the streaming server 140 executable by (or implemented by) at least one of the first processor 101 or the GPU 102. In some implementations, the streaming server 140 establishes, via the first processor 101, a first connection to a client device (e.g., the client device 200A). In some implementations, the streaming server 140 uses a real time streaming protocol (RTSP) to timely deliver video data to the user of the client device. In some implementations, the streaming server reads, from the encoded frame buffer 164, the encoded first equirectangular image frame data, and streams the encoded first equirectangular image frame data to the client device 200A via the first connection. In some implementations, the video server 120 and the streaming server 140 are executed as separate processes. In some implementations, the communication server and the streaming server may be configured to be executed as a single process. In some implementations, the communication server 130 directly interacts, via websocket protocol, with client devices and is executed on the same physical server as the video server 120, thereby reducing feedback and communication latency. In some implementations, the streaming server 140 and the communication server 130 (collectively called "streamer" 180) are executed in the same single process, while the video server 120 being executed as a separate process that can be started and managed by the streamer 180. This dual process configuration can improve network responsiveness (by reducing delay) and system stability. In some implementations, the streaming server 140 and the video server 120 can share the video stream data (as finally served to client devices) via a random access memory (RAM) drive or RAM disk. Such RAM drives or disks can be accessed as files while actual data resides in a system RAM, thereby removing hardware I/O overhead and latency.

Figure 5A:
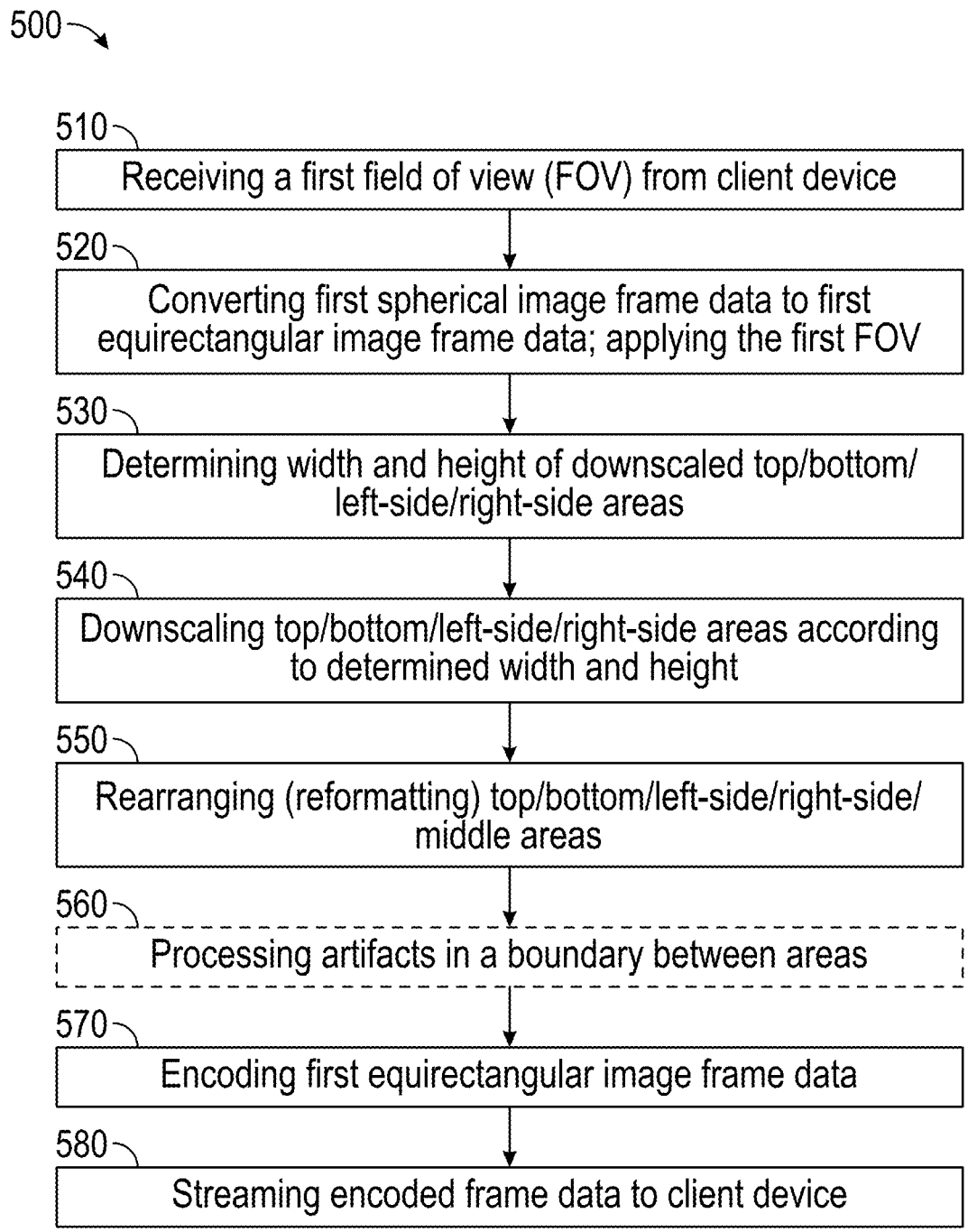
FIGS. 5A, 5B and 5C are flowcharts showing operations of an example downscaling and reformatting method in an example VR video processing system, according to some implementations.

FIG. 5A is a flowchart showing operations of an example downscaling and reformatting method in an example VR video processing system, according to some implementations. In broad overview, the method 500 begins with stage 510, where information relating to a first field of view (FOV) may be received from a client device. At stage 520, first spherical image frame data may be converted to first equirectangular image frame data based on the received first FOV information. At stage 530, width and height of a downscaled top area, a downscaled bottom area, a downscaled left-side area or a downscaled right-side area of the first equirectangular image frame data may be determined. At stage 540, the top area, the bottom area, the left-side area or the right-side area of the first equirectangular image frame data may be downscaled to form downscaled areas with the determined widths and heights. At stage 550, a scaled middle area, the downscaled bottom area, the downscaled left-side area or the downscaled right-side area of the first equirectangular image frame data may be rearranged (or reformatted). At stage 560, artifacts in a boundary between areas (e.g., the middle area, the bottom area, the left-side area or the right-side area) may be processed. At stage 570, the reformatted first equirectangular image frame data may be encoded. At stage 580, the encoded frame data may be streamed to a client device. The flowchart in FIG. 5A will be described below in more detail, referring to FIGS. 6A-6E.

Figure 6A:
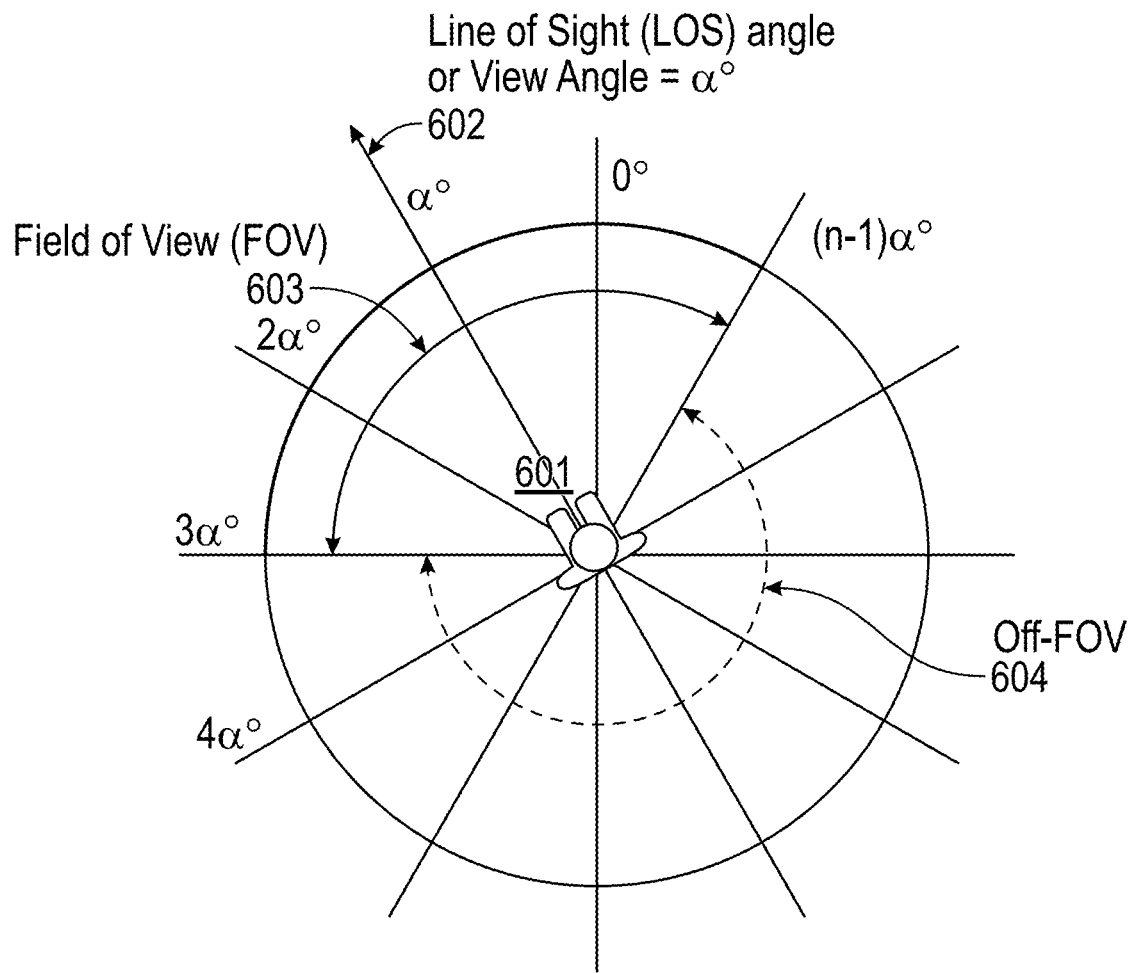
FIGS. 6A, 6B, 6C and 6D are block diagrams of an example method of downscaling and reformatting frame images in an example VR video processing system, according to some implementations.

FIGS. 6A, 6B, 6C and 6D are block diagrams of an example method of downscaling and reformatting frame images in an example VR video processing system, according to some implementations. FIG. 6A shows an example (azimuth) view angle 602 (e.g., α° in FIG. 6A) that can be defined as an azimuth angle from a reference vector or direction (e.g., the direction of 0° in FIG. 6A) representing a line of sight (LOS) direction of the viewer 601. FIG. 6A shows an example (azimuth) field of view (FOV) 603 that can be defined as a range between two azimuth angles (e.g., the range between 3α° and (n−1) α° in FIG. 6A) in which the viewer 601 sees with a client device. An off-field-of-view (off FOV) 604 can be defined as an azimuth angle range in which the viewer cannot see with the client device (e.g., an azimuth angle range other than the FOV range; see FIG. 6A).

Figure 6B:
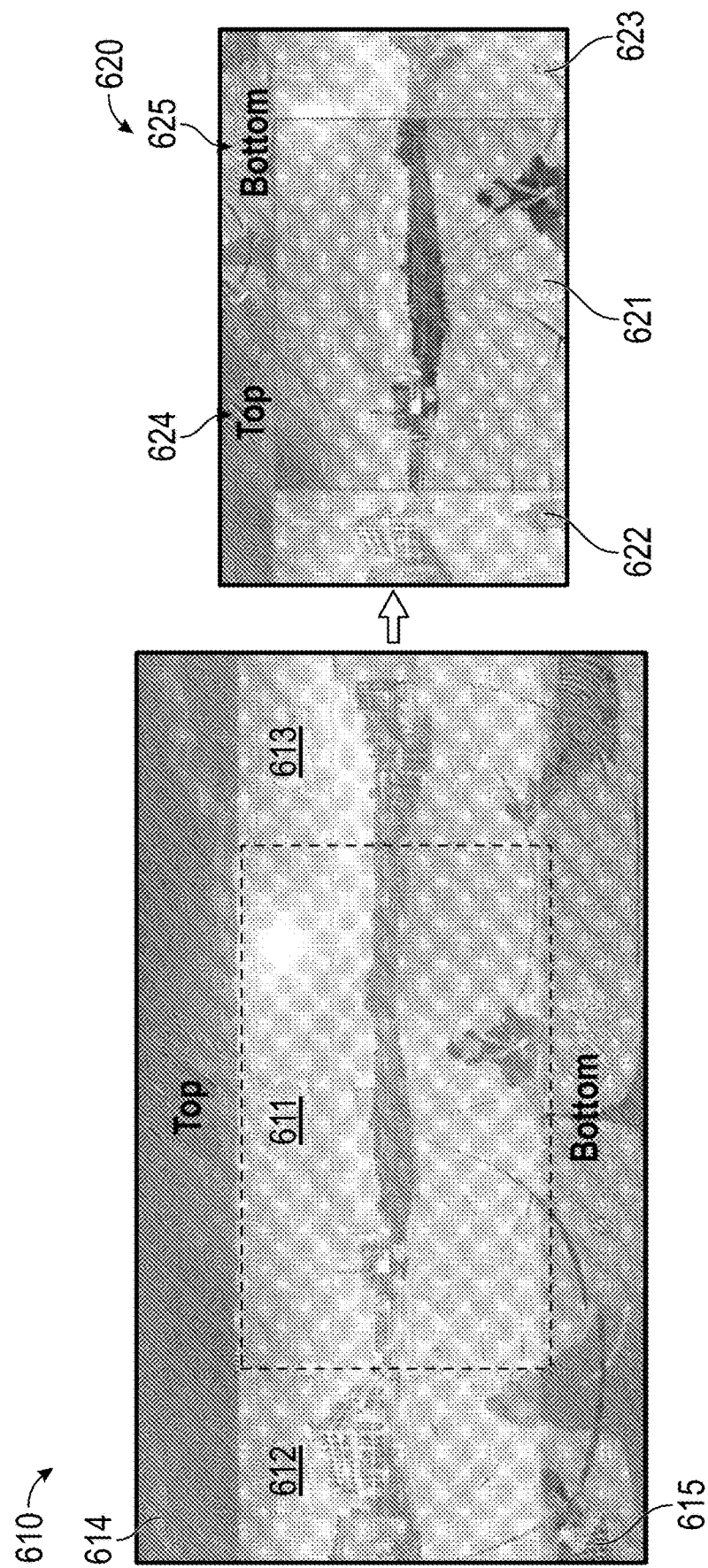

FIG. 6B shows example original equirectangular image frame data 610 (before downscaling and reformatting) and corresponding example reformatted equirectangular image frame data 620 as downscaled and reformatted by the reformatter 126 (see FIG. 3). The original equirectangular image frame data 610 includes a middle portion 611, a left-side portion 612, a right-side portion 613, a top portion 614 and a bottom portion 615. In some implementations, the middle portion 611 corresponds to both an azimuth FOV (e.g., the range between 3α° and (n−1) α° in FIG. 6A) and a vertical or altitude FOV (e.g., the range between −45° and +45° in altitude). In some implementations, a server (e.g., the communication server 130 in FIG. 3) can receive at least one of the azimuth FOV and vertical or altitude FOV from a client device (e.g., the client device 200A in FIG. 3). In some implementations, the reformatter 126 determines the width and height of the middle portion 611 based on at least one of the azimuth FOV and vertical or altitude FOV. In some implementations, the reformatter 126 determines the width and height of each of the left-side portion 614 and the right-side portion 615 based on an off-FOV (see the off-FOV 604 in FIG. 6A) which can be calculated from the received azimuth FOV and altitude FOV. In some implementations, the reformatter 126 determines the height of each of the top portion 612 and the bottom portion 613 on the basis of the determined height of the middle portion 611.

In some implementations, the reformatter 126 may scale the middle portion 611 at a first resolution (e.g., almost identical to the original resolution of the middle portion 611) to form a (scaled) middle area 621. In some implementations, prior to downscaling, width and height of downscaled areas (e.g., downscaled top/bottom/left-side/right-side areas) may be determined. In some implementations, width and height of downscaled areas can be determined on the basis of complexity analysis. Details of complexity analysis and width and height determination of scaled areas will be described in the following sections with reference to FIGS. 7A-7C. In some implementations, after determining width and height of each of downscaled areas (e.g., the left-side area 622, the right-side area 623, the top area 624, the bottom area 625 in FIG. 6B), the reformatter 126 may downscale the left-side portion 612, the right-side portion 613, the top portion 614, the bottom portion 615 at a second resolution, a third resolution, a fourth resolution and a fifth resolution to form the downscaled left-side area 622, right-side area 623, top area 624, and bottom area 625, respectively having the determined widths and heights. In some implementations, the second through fifth resolutions are smaller than the first resolution.

In some implementations, after forming the scaled middle area 621, downscaled left-side area 622, downscaled right-side area 623, downscaled top area 624, and downscaled bottom area 625, the reformatter 126 may rearrange the areas 621-625 to form the reformatted equirectangular image frame data 620. For example, referring to FIG. 6B, in the reformatted equirectangular image frame data 620, the top area 624 and bottom area are adjacent to each other and to atop portion of the middle area 621. In some implementations, referring to FIG. 6C, in the reformatted equirectangular image frame data 630, the top area 624 and bottom area 625 are adjacent to each other and to a bottom portion of the middle area 621.

Figure 6C:
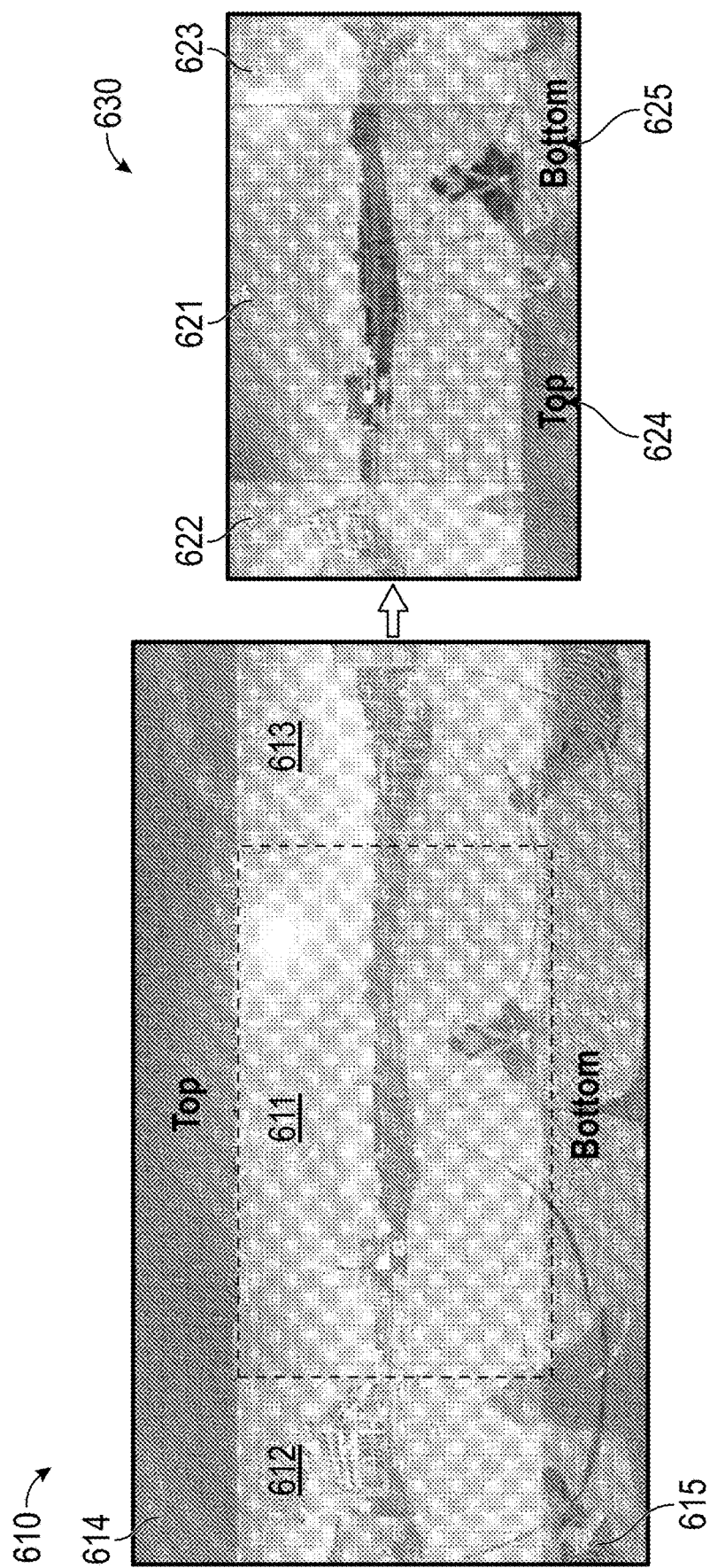
Figure 6D:
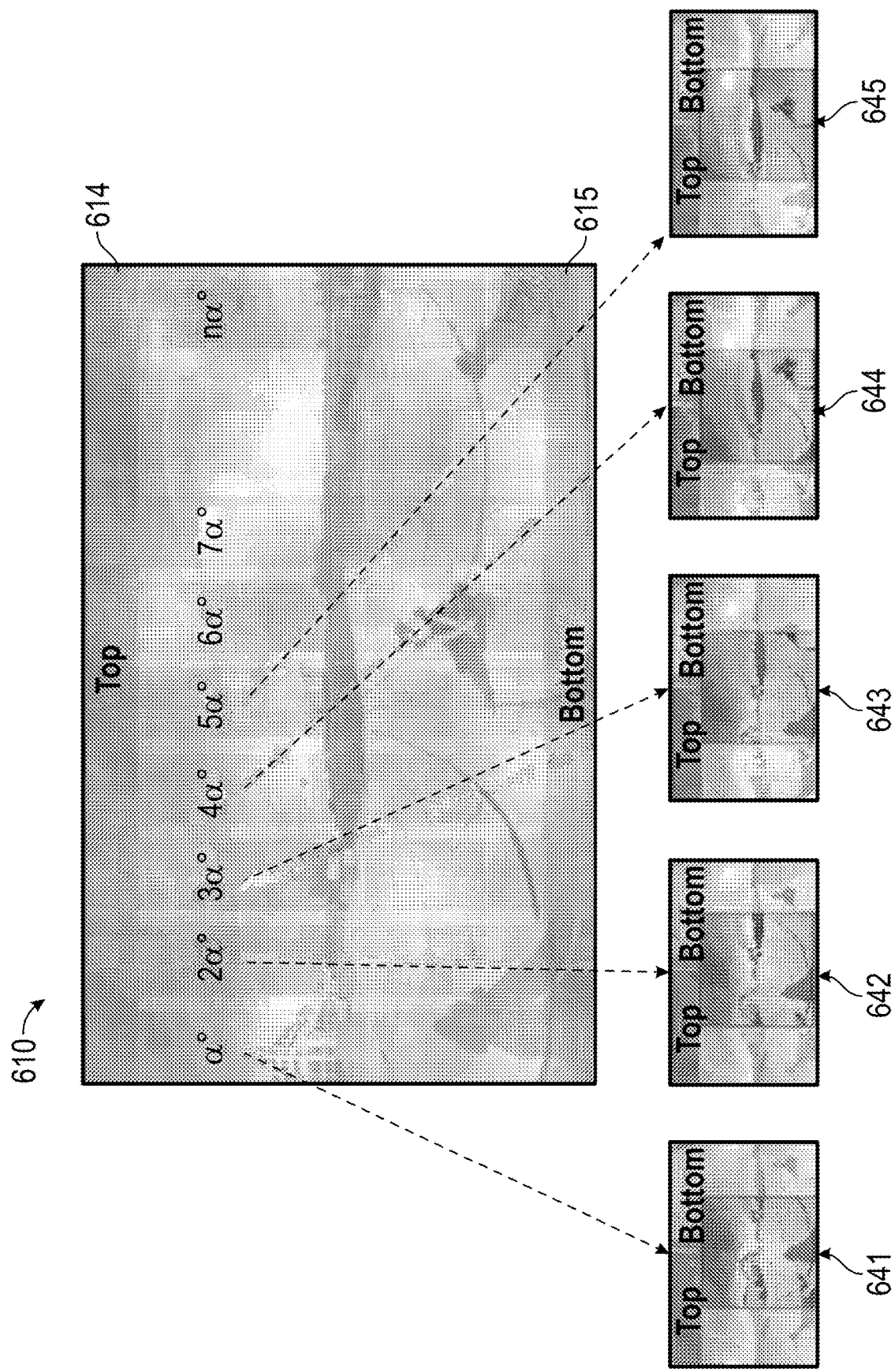

FIG. 6D shows example reformatted images as reformatted with different FOVs. In some implementations, the equirectangular image frame data 610 (in equirectangular format) covers 360 degrees in azimuth (or y axis) horizontally. FIG. 6D shows different view angles $\alpha°$, $2\alpha°$, $3\alpha°$, . . . , $(n-1)\alpha°$ (e.g., $\alpha°=30°$). In some implementations, the reformatter 126 can calculate an FOV corresponding to a given view angle, determine the width and height of the middle portion 611 (and left-side and right-side portions 612 and 613) based on the calculated FOV, determine the height of each of the top portion 614 and bottom portion 615 based on the height of the middle portion 611, determine width and height of each downscaled area, downscale the image to form each downscaled area having the determined width and height, and rearrange (or reformat) the downscaled areas. FIG. 6D shows reformatted images 641-645 as a result of downscaling and reformatting an image based on the view angles $\alpha°$, $2\alpha°$, $3\alpha°$, $4\alpha°$ and $5\alpha°$, respectively.

In some implementations, before constructing a frame in an image format like 620 (see FIG. 6B) or 630 (see FIG. 6C), the frame's content is shifted, based on a requested view angle, to be located in the middle of the image. In this manner, VR video format can be optimized to reduce the data transfer size. In some implementations, based on the observation that most head mount display (HMD) devices provide 75~95 degrees of (azimuth) FOV, the (azimuth) width of FOV is set (e.g., predetermined) to 75~95 degrees. In some implementations, an FOV corresponding to a given view angle can be determined based on a predetermined azimuth FOV width. For example, given a view angle of 0° and a predetermined azimuth FOV width of 90 degrees, the corresponding azimuth FOV is between −0.45° and +45°. In some implementations, off-FOV can be calculated based on an FOV so the off-FOV areas (e.g., left-side and right-side areas) can be downscaled, thereby reducing a large amount of data transfer. In some implementations, the off-FOV region vertically lies in the range of −90~−50, 50~90 degrees, and horizontally lies in the range of −180~−50, 50~180 degree. In some implementations, the top and bottom portions are downscaled both horizontally and vertically, and the downscaled top and bottom areas can be placed side by side at the top of the middle area (see FIG. 6B) or the bottom of the middle area (see FIG. 6C). Because the viewer normally cannot see or does not focus on the off-FOV region, the off-FOV region in the original resolution can be considered as an upscaled region. Therefore, even after downscaling the off-FOV region in the server, the reconstruction of the downscaled off-FOV region at a client device will not lower the video quality of the off-FOV region as perceived to the viewer. As the viewer normally watches the middle portion of an image (e.g., the middle portion 611 in FIG. 6B), in some implementations, the server (e.g., the communication server 130 or the streaming server 140 in FIG. 3) periodically receives the viewer's field of view (FOV) data in real time and uses the middle portion without any downscaling. In some implementations, in a client device, the left-side and right-side portions in the off-FOV region is invisible unless the viewer turns and changes its FOV. In some implementations, these hidden portions are downscaled (e.g., at 2:1~4:1 downscale ratio) and encoded. In some implementations, at a client device, the hidden portions are only temporarily displayed when the viewer turns, and a GPU of the client device will upscale the hidden portions back to its original resolution in rendering when the viewer stops turning. In some implementations, when viewer stops turning, a new video frame (with updated FOV) will be displayed in high quality in a reasonably short time. For example, the latency of a new FOV update to a video frame is about 200~300 ms (in an internal network) and 300 ms~1 sec (in a public network). In some implementations, the latency can be reduced by (1) using a fast and secure feedback channel to deliver an FOV value by web socket, (2) using a minimum possible Group of Picture (GOP) to be able to switch among video files (for example, in some implementations, the switching time is no longer than 500 ms even if an FOV change happens at any moment), and (3) controlling the buffer level of a stream buffer at a client device to minimize the size as well as to prevent play-pause-play hiccups caused by a low buffering. In some implementations, because there is a tradeoff between size minimization and preventing play-pause-play hiccups, the tradeoff can be controlled based on the network condition at that time.

Now, the flowchart in FIG. 5A will be described in more detail, referring to FIGS. 6A-6D. At stage 510, first information relating to a first field of view (FOV) may be received from a client device (e.g., the client device 200A in FIG. 3). In some implementations, the first information relating to the first FOV includes at least one of a view angle of the viewer (e.g., the view angle 602 in FIG. 6A), an azimuth FOV (e.g., the FOV 603 in FIG. 6A), a vertical or altitude FOV, or pitch angles. In some implementations, a communication server (e.g., the communication server 130 in FIG. 3) implemented by a first processor (e.g., the processor 101 in FIG. 3) is configured to cause the first processor to receive, from a client device, the first information relating to a first field of view (FOV). In some implementations, the communication server receives the FOV information from the client device via a first connection established by websocket protocol.

At stage 520, first spherical image frame data may be converted to first equirectangular image frame data based on the received first FOV information. In some implementations, a video server (e.g., the video server 120 in FIG. 3) implemented by the first processor (e.g., the processor 101 in FIG. 3) or GPU (e.g., the GPU 102 in FIG. 3) is configured to cause the first processor or GPU to convert frame data of a first spherical image to frame data of a first equirectangular image such that a first area corresponding to the first FOV (e.g., the FOV 603 in FIG. 6A) is a middle area (e.g., the middle portion 611 in FIGS. 6B and 6C) of the first equirectangular image (e.g., the image 610 in FIGS. 6B and 6C). In some implementations, the width and height of other areas (e.g., the left-side portion 612 and the right-side portion 613) can be determined based on the first FOV information. In some implementations, the height of other areas (e.g., the top portion 614 and the bottom portion 615) can be determined based on the height of the middle portion 611. In some implementations, such conversions to equirectangular image frames are performed by the post-processor 123 of the video server 120 (see FIG. 3).

At stage 530, width and height of downscaled areas (e.g., the top area 624, bottom area 625, left-side area 622 and right-side area 623 in FIG. 6B) of the scaled first equirectangular image frame data 620 may be determined. Details of the determination of width and height of each downscaled area will be described in the following sections with reference to FIGS. 7A-7C.

At stage 540, referring to FIG. 6B, the top portion 614, the bottom portion 615, the left-side portion 612 or the right-side portion 613 of the first equirectangular image frame data 610 may be downscaled to form downscaled top area 624, bottom area 625, left-side area 622 or right-side area 623, respectively having the widths and heights determined at stage 530. The video server may scale the first or middle area (e.g., the middle portion 611) of the first equirectangular image corresponding to the first FOV at a first resolution (e.g., approximately the same as the original resolution of first equirectangular image frame data 610). The video server may scale a second or top area (e.g., the top portion 614) of the first equirectangular image adjacent to the middle area at a second resolution smaller than the first resolution (e.g., at 2:1~4:1 downscale ratio) so that the downscaled top area has the width and height determined at stage 530. The video server may scale a third or bottom area (e.g., the bottom portion 615) of the first equirectangular image that is adjacent to the first or middle area and is not adjacent to the second or top area, at a third resolution smaller than the first resolution (e.g., at 2:1~4:1 downscale ratio) so that the downscaled bottom area has the width and height determined at stage 530. In some implementations, the video server is further configured to cause the first processor to scale a left-side area (e.g., the left-side portion 612) of the first equirectangular image adjacent to a left side of the middle area at a fourth resolution smaller than the first resolution (e.g., at 2:1~4:1 downscale ratio), and scale a right-side area (e.g., the right-side portion 613) of the first equirectangular image adjacent to a right side of the middle area at a fifth resolution smaller than the first resolution (e.g., at 2:1~4:1 downscale ratio) so that the downscaled left-side area and right-side area respectively have the widths and heights determined at stage 530.

At stage 550, referring to FIG. 6B, the scaled middle area (e.g., the middle area 621), the downscaled top area (e.g., the top area 624), the downscaled bottom area (e.g., the bottom area 625), the downscaled left-side area (e.g., the left-side area 622) or the downscaled right-side area (e.g., the right-side area 623) of the first equirectangular image frame data may be rearranged (or reformatted) to form rearranged equirectangular image frame data 620. In some implementations, the video server may rearrange the scaled middle area, downscaled top area and downscaled bottom area such that the downscaled top area and the downscaled bottom area are adjacent to each other side by side, to generate the reformatted first equirectangular image frame data 610. In some implementations, after the rearrangement, the downscaled top area and the downscaled bottom area are adjacent to a top portion of the scaled middle area (see FIG. 6B). In some implementations, after the rearrangement, the downscaled top area and the downscaled bottom area are adjacent to a bottom portion of the scaled middle area (see FIG. 6C).

At stage 560, referring to FIG. 6B, artifacts in a boundary between scaled areas (e.g., the middle area 621, the top area 624, the bottom area 625, the left-side area 622 or the right-side area 625) may be processed. Artifacts in a boundary between scaled areas may occur when encoders using standard formats, such as MPEG-4 AVC (H.264) codec, optimize a block's color by intra frame prediction and inter frame prediction. By such optimizations, colors of neighbors of a block affect the block's color, which causes artifacts in boundaries between scaled areas (e.g., a boundary between the top area 624 and the bottom area 625, a boundary between the top area 624 and the middle area 621, or a boundary between the bottom area 625 and the middle area 621). Details of the artifacts processing will be described in the following sections with reference to FIGS. 8A-8E.

At stage 570, the reformatted first equirectangular image frame data may be encoded. In some implementations, the encoding may be performed after performing artifact process (stage 560). In some implementations, referring to FIG. 6B, the video server may encode the reformatted first equirectangular image frame data (e.g., the image frame data 620 stored in the reformatted frame buffer 167 in FIG. 3) including the scaled middle area, scaled top area, scaled bottom area, scaled left-side area, and scaled right-side area, to generate encoded first equirectangular image frame data. In some implementations, the encoded first equirectangular image frame data is stored in the encoded frame buffer 166 (see FIG. 3).

At stage 580, the encoded frame data may be streamed to a client device. A streaming server (e.g., the streaming server 140 in FIG. 3) implemented by the first processor (e.g., the processor 101) or GPU (e.g., the GPU 102) is configured to cause the first processor to stream the encoded first equirectangular image frame data to the client device. In some implementations, the streaming server uses a real time streaming protocol (RTSP) to the encoded first equirectangular image frame data to the client device.

Figure 5B:
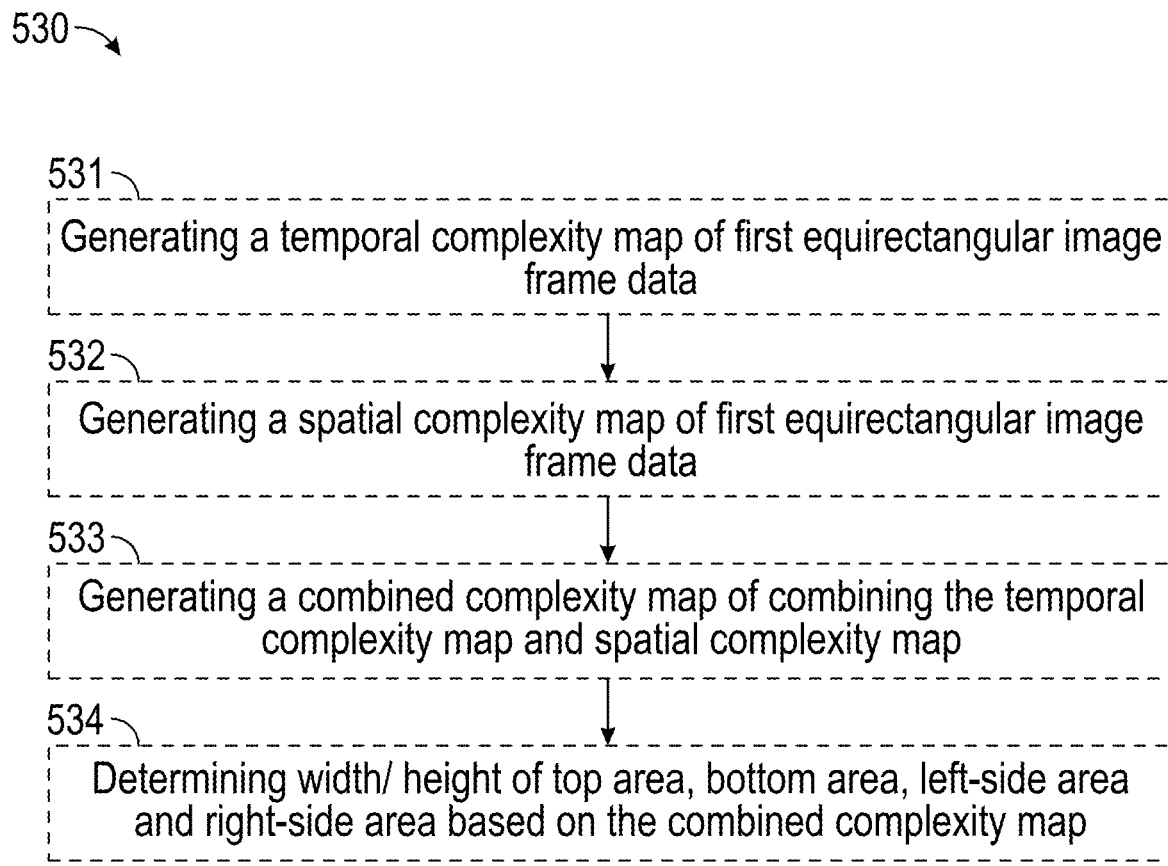

FIG. 5B is a flowchart showing operations of determining width and height of each scaled area (e.g., scaled top/bottom/left-side/right-side areas) of first equirectangular image frame data, according to some implementations. In broad overview, the method 530 begins with stage 531, where a temporal complexity map of the first equirectangular image frame data may be generated. At stage 532, a spatial complexity map of the first equirectangular image frame data may be generated. At stage 533, a combined complexity map may be generated by combining the temporal complexity map and spatial complexity map. At stage 534, width and height of each of the downscaled top area, the downscaled bottom area, the downscaled left-side area or the downscaled right-side area of the first equirectangular image frame data may be determined based on the combined complexity map. The flowchart in FIG. 5B will be described below in more detail, referring to FIGS. 7A-7C.

Figure 7A:
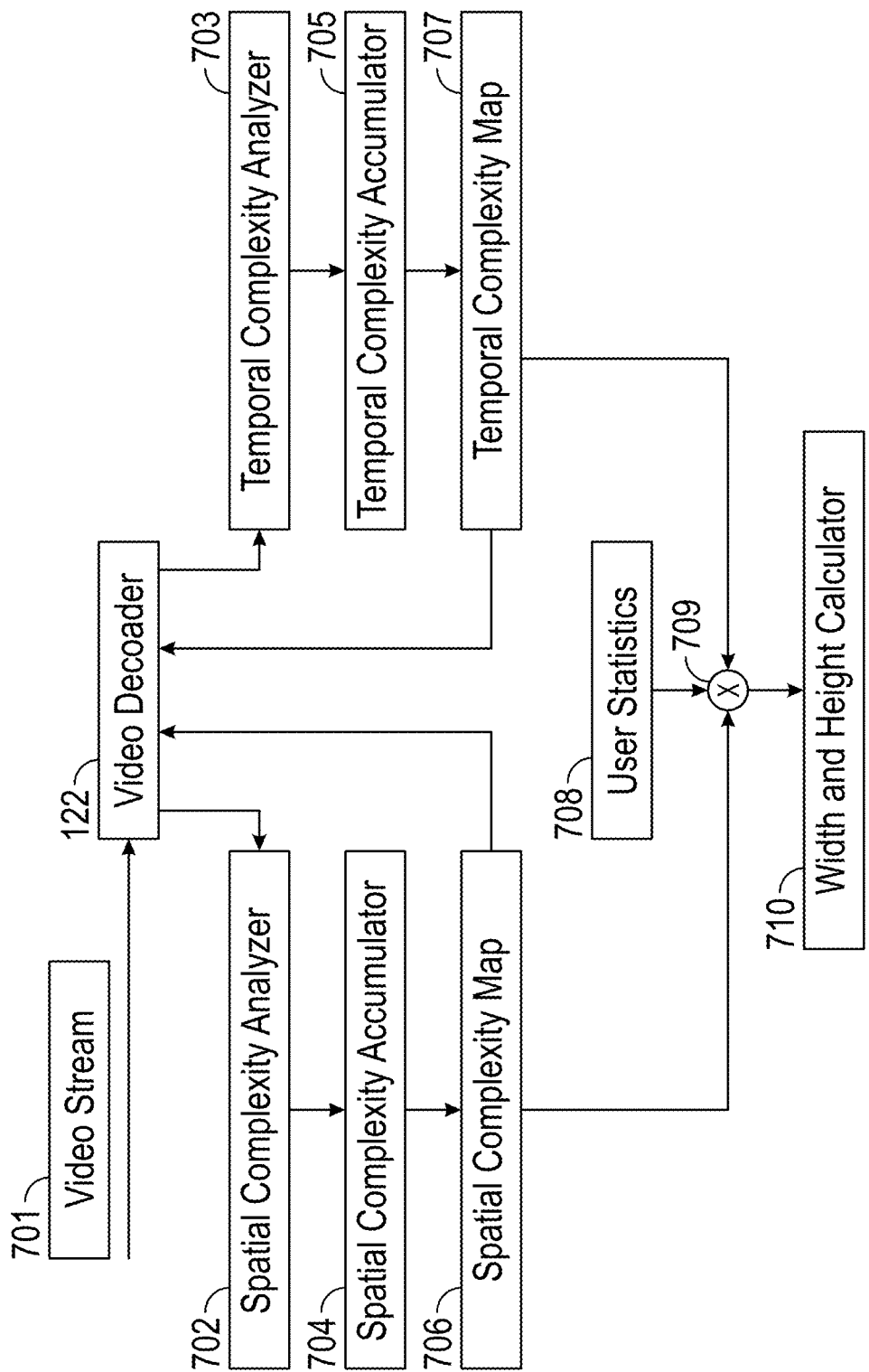
FIGS. 7A, 7B and 7C are block diagrams of an example method of determining width and height of a downscaled area in an example VR video processing system, according to some implementations.
Figure 7B:
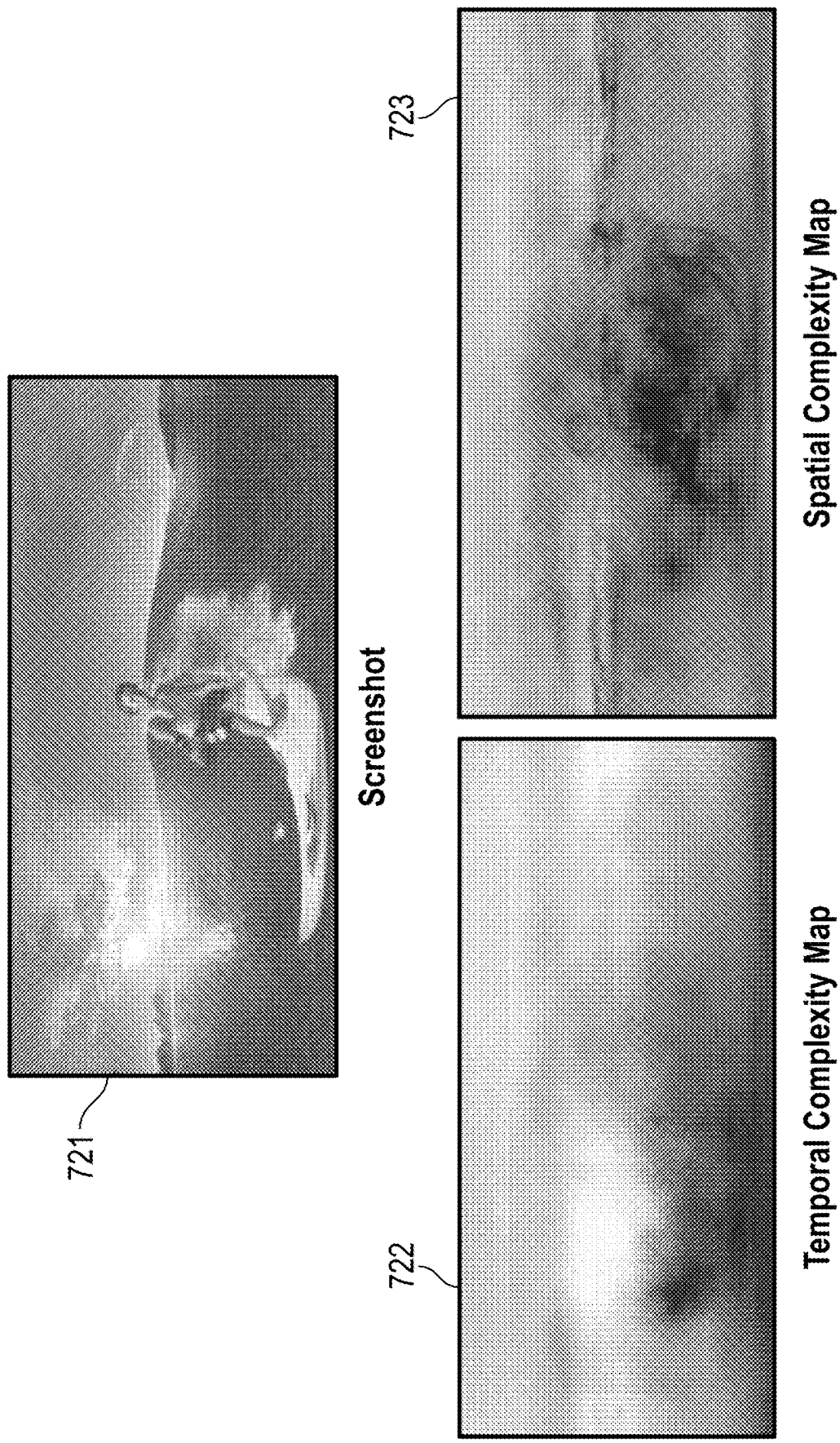
Figure 7C:
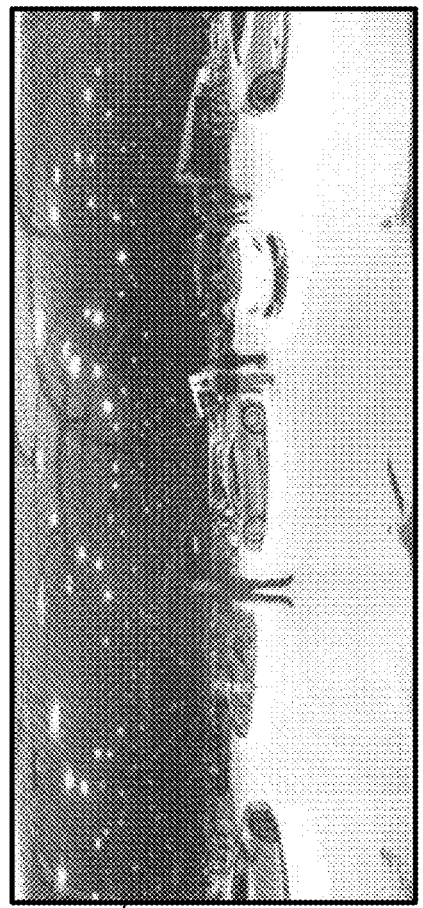
Figure 7C:
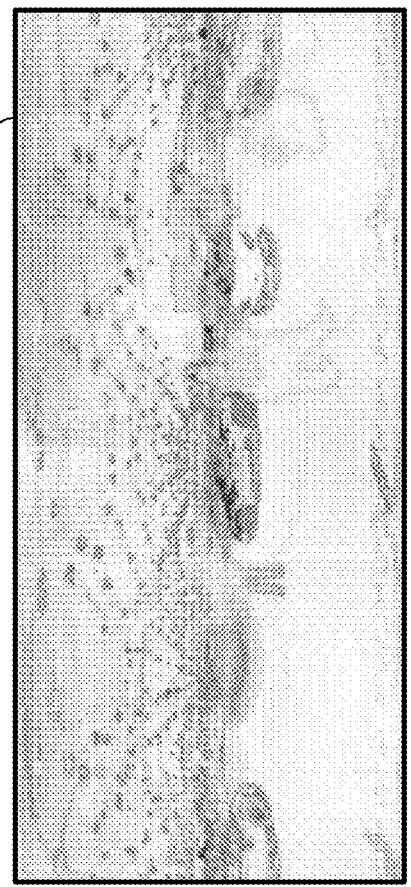
Figure 7C:
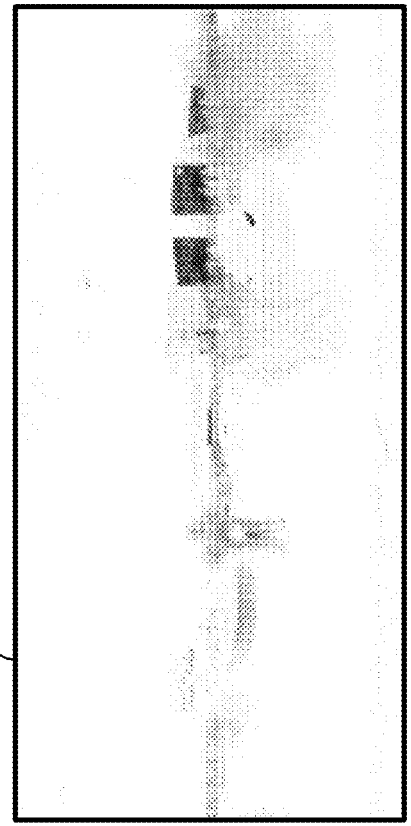

FIGS. 7A, 7B and 7C are block diagrams of an example method of determining width and height of an downscaled area in an example VR video processing system, according to some implementations. FIG. 7A shows example modules or devices implemented by a processor or GPU performing width and height determinations of downscaled areas. In some implementations, the reformatter 126 (see FIG. 3) includes, as the width and height determinations modules or devices, the spatial complexity analyzer 702, the temporal complexity analyzer 703, the spatial complexity accumulator 704, the temporal complexity accumulator 705, the width and height calculator 710. In some implementations, the video decoder 122 (see FIG. 3) decodes a video stream 701 (e.g., spherical image frame data or 360 degree UHD 4K frame data) to generate equirectangular image frame data. In some implementations, the width and height calculator 710 determines width and height of a scaled top area (e.g., the top area 624 in FIG. 6B) or a scaled bottom area (e.g., the bottom area 625) based on pre-defined width and height values. In some implementations, the width and height calculator 710 determines width and height of the scaled top area or the scaled bottom area based on a result of spatial complexity analysis (e.g., analysis performed by the spatial complexity analyzer 702) or a result of temporal complexity analysis (e.g., analysis performed by the temporal complexity analyzer 703). In some implementations, the spatial complexity analyzer 702 and the temporal complexity analyzer 703 (1) determine which regions in an equirectangular frame image provided from the video decoder 122 are complex spatially or temporarily, and (2) assign larger width and/or height to more complex regions.

In some implementations, the spatial complexity analyzer 702 performs spatial complexity analysis by removing noise from the frame image. In some implementations, the spatial complexity analyzer 702 removes noise by applying a palette (i.e., a small set of colors—for example, 24 bit RGB colors consists of 16 million colors) so that each original color can be approximately redirected to a color in the palette. For example, a palette of 8 (Red)×8 (Green)×8 (Blue) colors can be used to redirect each original color to a color among 8 (Red)×8 (Green)×8 (Blue) colors. In some implementations, the spatial complexity analyzer 702 divides one image frame into n×n blocks and counts the number of different colors in each block. In some implementations, the spatial complexity accumulator 704 then sums up or accumulates the count per block (e.g., from multiple image frames) and generates a spatial complexity map 706 showing the accumulated count per block. FIG. 7B shows an example spatial complexity map 723 generated from a set of image frames as shown in a screenshot 721. FIG. 7C shows another example spatial complexity map 733 generated from a set of image frames as shown in a screenshot 731. In some implementations, from such spatial complexity maps, the width and height calculator 710 determines that an object/region having more colors is a more complex object/region that has more visual information, and assigns larger width and/or height to more (spatially) complex objects/regions. In some implementations, the spatial complexity analyzer performs spatial complexity analysis by using graphics API like Opengl or Directx, or by gpgpu API like cuda or OpenCL on GPU.

In some implementations, the temporal complexity analyzer 703 performs temporal complexity analysis by counting the number of pixels in an area such that a value (e.g., a pixel brightness value or an RGB value) of the pixel of one image frame is changed from a value of the same pixel of the previous image frame by an amount (e.g., difference in two pixel brightness values or two RGB values) more than a threshold. For example, between two frames, the number of pixels in a top area whose values changes by an amount more than a threshold can be compared with the number of pixels in a bottom area whose values changes by an amount more than the threshold. In some implementations, the temporal complexity accumulator 705 maintains the count per each pixel (e.g., the number of times the value of each pixel changes by an amount more than a threshold) from a plurality of temporarily sequential image frames and generates a temporal complexity map 707 showing the accumulated count per each pixel. FIG. 7B shows an example temporal complexity map 722 generated from a set of image frames as shown in a screenshot 721. FIG. 7C shows another example temporal complexity map 732 generated from a set of image frames as shown in a screenshot 731. In some implementations, from such temporal complexity maps, the width and height calculator 710 determines that an object/region having more frequently changed pixels is a more complex object/region that has more visual information, and assigns larger width and/or height to more (temporally) complex objects/regions. For example, from a plurality of temporarily sequential image frames, the average count per each pixel (e.g., the average number of times the value of each pixel changes by an amount more than a threshold) in a top area can be compared with the average count per each pixel in a bottom area. In some implementations, the temporal complexity analyzer performs temporal complexity analysis by using graphics API like OpenGL or DirectX, or by gpgpu API like CUDA or OpenCL on GPU.

In some implementations, referring to FIG. 7A, the width and height calculator 710 calculates width and height of a downscaled area by combining, at a combination step 709, spatial complexity calculated from the spatial complexity map 706 and temporal complexity calculated from the temporal complexity map 707. In some implementations, a width ratio W(area) of a given area to a total width of top area and bottom area is defined by Equation 1 and Equation 2.

$$W(\text{area}) = Coeff_{temporal} \times \frac{Ct(\text{area})}{Ct(\text{Top}) + Ct(\text{Bottom})} + \qquad \text{(Equation 1)}$$

$$Coeff_{spatial} \times \frac{Cs(\text{area})}{Cs(\text{Top}) + Cs(\text{Bottom})},$$

$$Coeff_{temporal} + Coeff_{spatial} = 1.0, \qquad \text{(Equation 2)}$$

where W(area) is a width ratio of the given area; Ct(area) is a temporal complexity of the given area; Cs(area) is a spatial complexity of the given area; $Coeff_{temporal}$ is a coefficient value (or weight) for temporal complexity (0.5 as default); $Coeff_{spatial}$ is a coefficient value (or weight) for spatial complexity (0.5 as default). For example, a width ratio of a top area can be calculated as follows:

$$W(\text{top}) = $$
$$\text{Coeff}_{temporal} \times \frac{Ct(\text{top})}{Ct(\text{Top}) + Ct(\text{Bottom})} + \text{Coeff}_{spatial} \times \frac{Cs(\text{top})}{Cs(\text{Top}) + Cs(\text{Bottom})}.$$

A width ratio of a bottom area can be similarly calculated by replacing Ct (top) and Cs (top) with Ct (bottom) and Cs (bottom). In some implementations, width of each of downscaled left-side area and right-side area can be determined relative to the width of scaled middle area in a similar manner to the above method of determining the width ratio of the given area using Equation 1 and Equation 2.

In some implementations, if the width ratio of the given area is more than a predefined threshold (e.g., 0.7), the width and height calculator 710 assigns the whole width (e.g., the original width of the top and bottom areas) to both top and bottom areas because (if one area is assigned with a too large width) the width of the other area would become too small in that case. For example, if the width ratio of the top area is more than a predefined threshold, both top and bottom areas are assigned with their original widths, respectively (therefore no changes in widths) or both assigned with the same width as the width of the middle area.

In some implementations, from the temporal complexity map 722 and the spatial complexity map 723 in FIG. 7B, Ct(Top), Ct(Bottom), Cs(Top) and Cs(Bottom) are calculated as follows:

$$Ct(\text{Top})=156.81, Ct(\text{Middle})=293.68, Ct(\text{Bottom})=711.44$$

$$Cs(\text{Top})=23.01, Cs(\text{Middle})=44.15, Cs(\text{Bottom})=49.34$$

By applying the Equations 1 and 2 with the default coefficient values ($\text{Coeff}_{temporal}=\text{Coeff}_{spatial}=0.5$), W(Top)=0.25, and W(Bottom)=0.75. That is, the width and height calculator 710 can assign three times more width to the bottom are than the top area.

In some implementations, the width and height calculator 710 can determine a height ratio H(area) of a given area to a total height of the given area and middle area using Equation 2 and Equation 3.

$$H(\text{area}) = \text{Coeff}_{temporal} \times \frac{Ct(\text{area})}{Ct(\text{Mid}) + Ct(\text{part})} + \text{Coeff}_{spatial} \times \frac{Cs(\text{area})}{Cs(\text{Mid}) + Cs(\text{part})}, \quad \text{(Equation 3)}$$

where H(area) is a height ratio of the given area to a total height of the given area and middle area; Ct(area) is a temporal complexity of the given area; Cs(area) is a spatial complexity of the given area; $\text{Coeff}_{temporal}$ is a coefficient value (or weight) for temporal complexity (0.5 as default); $\text{Coeff}_{spatial}$ is a coefficient value (or weight) for spatial complexity (0.5 as default). In some implementations, the width and height calculator 710 can assign a predetermined percentage (e.g., 25%) of the height of the (whole) reformatted image to each of the top area and the bottom area, but assign more height to each area if the height ratio of either top or bottom area calculated above using Equations 2 and 3 is more than a predefined threshold.

In some implementations, referring to FIG. 7A, in calculating width and height of a scaled area, user statistics 708 (e.g., data indicating user's behavior with a client device) can be applied. For example, the client device can send FOV information including a view angle of the user whenever the value of the view angle is changed, so that information relating to what the user is looking at per each frame can be gathered (e.g., in a server). For example, if a yaw (or x-axis) angle of the client device (e.g., a yaw angle of the headgear) is larger than 45 degrees or smaller than −45 degrees, upon receiving FOV information of the yaw angle of the client device, the width and height calculator 710 can determine that the user (of the client device) is looking at the top or the bottom of the current frame, respectively. After gathering such users' behavior data sufficiently, the width and height calculator 710 can regenerate per-FOV video files with updated width and height calculated based on the data by adding additional terms to Equation 1.

$$W(\text{area}) = \text{Coeff}_{temporal} \times \frac{Ct(\text{area})}{Ct(\text{Top}) + Ct(\text{Bottom})} + \quad \text{(Equation 4)}$$
$$\text{Coeff}_{spatial} \times \frac{Cs(\text{area})}{Cs(\text{Top}) + Cs(\text{Bottom})} +$$
$$\text{Coeff}_{stat} \times \frac{F(\text{area})}{\text{The number of the whole frames}},$$
$$\text{Coeff}_{temporal} + \text{Coeff}_{spatial} + \text{Coeff}_{stat} = 1.0, \quad \text{(Equation 5)}$$

where F(area) is the number of frames for which the user (or users) looks at the given area, and $\text{Coeff}_{stat}$ is a coefficient (or weight) of the user statistics.

Now, the flowchart in FIG. 5B will be described in more detail, referring to FIGS. 7A-7C. Referring to FIG. 5B, at stage 531, where a temporal complexity map (e.g., the temporal complexity map 707) of the first equirectangular image frame data may be generated. In some implementations, the video server is further configured to cause the first processor to generate the complexity map of the first equirectangular image based on temporal complexity by counting changes in a pixel such that a value of the same pixel changes by an amount more than a threshold between one frame and a frame following the one frame. Referring to FIG. 7A, the temporal complexity analyzer 703 may perform temporal complexity analysis by counting a change in a pixel such that a value of the pixel of one image frame is changed from a value of the same pixel of the previous image frame by an amount more than a threshold. In some implementations, the temporal complexity accumulator 705 maintains the count per each pixel from a plurality of temporarily sequential image frames and generates a temporal complexity map 707 showing the accumulated count per each pixel.

At stage 532, a spatial complexity map (e.g., the spatial complexity map 706) of the first equirectangular image frame data may be generated. In some implementations, the video server is configured to cause the first processor to generate a complexity map of the first equirectangular image based on spatial complexity. In some implementations, the video server is further configured to cause the first processor to generate the complexity map of the first equirectangular image based on spatial complexity by counting the number of different colors in each of a plurality of blocks in the first equirectangular image. For example, referring to FIG. 7A, the spatial complexity analyzer 702 may remove noise by applying a palette (i.e., a small set of colors—for example, 24 bit RGB colors consists of 16 million colors) so that each original color can be approximately redirected to a color in the palette. For example, a palette of 8 (Red)×8 (Green)×8 (Blue) colors can be used to redirect each original color to a color among 8 (Red)×8 (Green)×8 (Blue) colors. In some implementations, the spatial complexity analyzer 702 divides one image frame into n×n blocks and counts the number of different colors in each block. In some implementations, the spatial complexity accumulator 704 then sums up or accumulates the count per block (e.g., from multiple image frames) and generates a spatial complexity map 706 showing the accumulated count per block.

At stage 533, a combined complexity map may be generated by combining the temporal complexity map and spatial complexity map. In some implementations, a combined complexity map can be calculated as a weighted sum of the temporal complexity map and spatial complexity map. For example, a combined complexity map for a particular block can be calculated as $Coeff_{temporal} \times Ct(block) + Coeff_{spatial} \times Cs(block)$, $Coeff_{temporal} + Coeff_{spatial} = 1.0$, where $Coeff_{temporal}$ and $Coeff_{spatial}$ are coefficients (weights) of the temporal complexity map and spatial complexity map, Cs(block) is accumulated sum of different colors in the block, and Ct(block) is accumulated sum of counts of pixel value changes in the pixels in the block between one frame and a frame following the one frame.

At stage 534, width and height of each of downscaled top area, bottom area, left-side area or right-side area of the first equirectangular image frame data may be determined based on the combined complexity map. The video server is configured to determine, prior to the scaling of the second area and the third area, a width and a height of each of the scaled second area and the scaled third area based on the generated complexity map and scale the second area and the third area to form each of the scaled second area and the scaled third area having the determined width and height. For example, in some implementations, width of each of downscaled top area and bottom area can be calculated using the following equations:

$$W(area) = Coeff_{temporal} \times \frac{Ct(area)}{Ct(Top) + Ct(Bottom)} + Coeff_{spatial} \times \frac{Cs(area)}{Cs(Top) + Cs(Bottom)}, \quad \text{(Equation 1)}$$

$$Coeff_{temporal} + Coeff_{spatial} = 1.0, \quad \text{(Equation 2)}$$

where W(area) is a width ratio of the given area; Ct(area) is a temporal complexity of the given area; Cs(area) is a spatial complexity of the given area; $Coeff_{temporal}$ is a coefficient value (or weight) for temporal complexity (0.5 as default); $Coeff_{spatial}$ is a coefficient value (or weight) for spatial complexity (0.5 as default). In some implementations, height of each of downscaled top area and bottom area can be calculated using the following equations:

$$H(area) = Coeff_{temporal} \times \frac{Ct(area)}{Ct(Mid) + Ct(part)} + Coeff_{spatial} \times \frac{Cs(area)}{Cs(Mid) + Cs(part)}, \quad \text{(Equation 3)}$$

where H(area) is a height ratio of the given area to a total height of the given area and middle area; Ct(area) is a temporal complexity of the given area; Cs(area) is a spatial complexity of the given area; $Coeff_{temporal}$ is a coefficient value (or weight) for temporal complexity (0.5 as default); $Coeff_{spatial}$ is a coefficient value (or weight) for spatial complexity (0.5 as default).

Figure 5C:
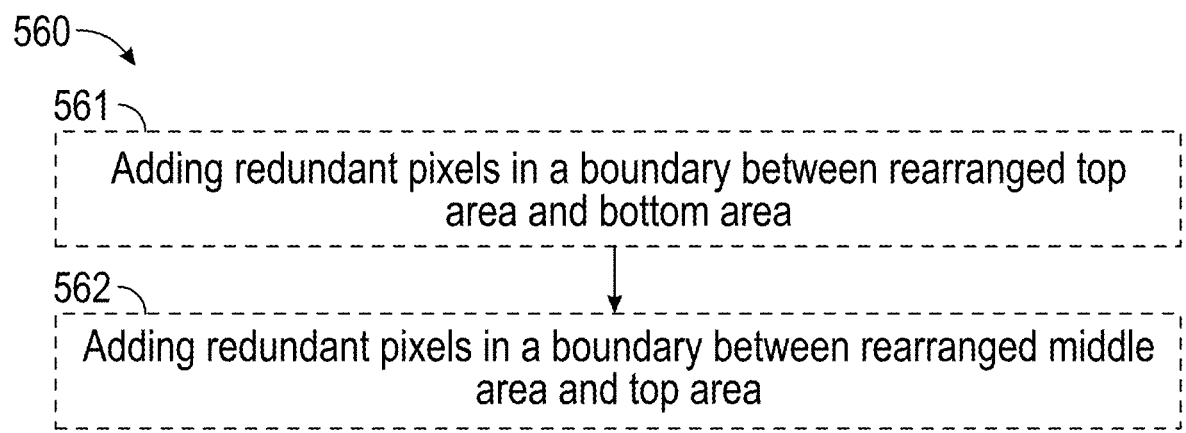

FIG. 5C is a flowchart showing operations of processing artifacts in a boundary between areas of the reformatted first equirectangular image according to some implementations. In broad overview, the method 560 begins with stage 561, where redundant pixels may be added in a boundary between a rearranged (reformatted) top area and a rearranged bottom area. At stage 562, redundant pixels may be added in a boundary between a rearranged middle area and a rearranged top area. The flowchart in FIG. 5C will be described below in more detail, referring to FIGS. 8A-8E.

FIGS. 8A, 8B, 8C and 8E are block diagrams of an example method of reducing artifacts in boundaries between rearranged (or reformatted) areas in an example VR video processing system, according to some implementations. Artifacts in a boundary between scaled areas may occur when encoders using standard formats, such as MPEG-4 AVC (H.264) codec, optimize a block's color by intra frame prediction and inter frame prediction. By such optimizations, referring to FIG. 6B, colors of neighbors of a block affect the block's color, which causes artifacts in boundaries between scaled areas (e.g., a boundary between the top area 624 and the bottom area 625, a boundary between the top area 624 and the middle area 621, or a boundary between the bottom area 625 and the middle area 621). To reduce such artifacts, in some implementations, redundant or repeating pixels are added near boundaries (e.g., 4 to 8 pixels) so that these redundant pixels are not used in reconstruction and do not affect colors of neighbors of those pixels. In some implementations, those redundant pixels added to the last pixels (e.g., left-most pixels) are repeating first pixels (e.g., right-most pixels) so that the last pixels are continuously linked to the first pixels by nature of spherical video. In this case, if the "prediction" modules are working, colors of those linked pixels are nicely blended. For example, redundant pixels added to a right-most portion of the top area are copied from a left-most portion of the top area because pixels in the right-most portion of the top area are linked to pixels in the left-most portion of the top area. Similarly, redundant pixels added to a bottom portion of the top area are copied from a top portion of the middle area because pixels in the bottom portion of the top area are linked to pixels in the top portion of the middle area. Similarly, in some implementations, redundant pixels added to a top portion of the bottom area are copied from a bottom portion of the middle area because pixels in the top portion of the bottom area are linked to pixels in the bottom portion of the middle area.

In some implementations, a "prediction" module is a part of encoder like H.264. In some implementations, prediction behaviors of the "prediction module" on blocks near boundaries can be controlled to remove artifacts by adding a controller logic to handle intra frame prediction or inter frame prediction. Exemplary controls of prediction behaviors in a prediction module are described in a web document entitled "Introduction to H.264 video standard," available at http://slideplayer.com/slide/3819249/, which is incorporated herein by reference for details as to how to control prediction behaviors in a prediction module to accomplish the functions as set forth in this patent application. In some implementations, to avoid or reduce artifacts in boundaries between areas, a prediction module in an encoder can be modified by adding a controller logic so that the prediction module can skip on particular blocks near boundaries.

Figure 8A:
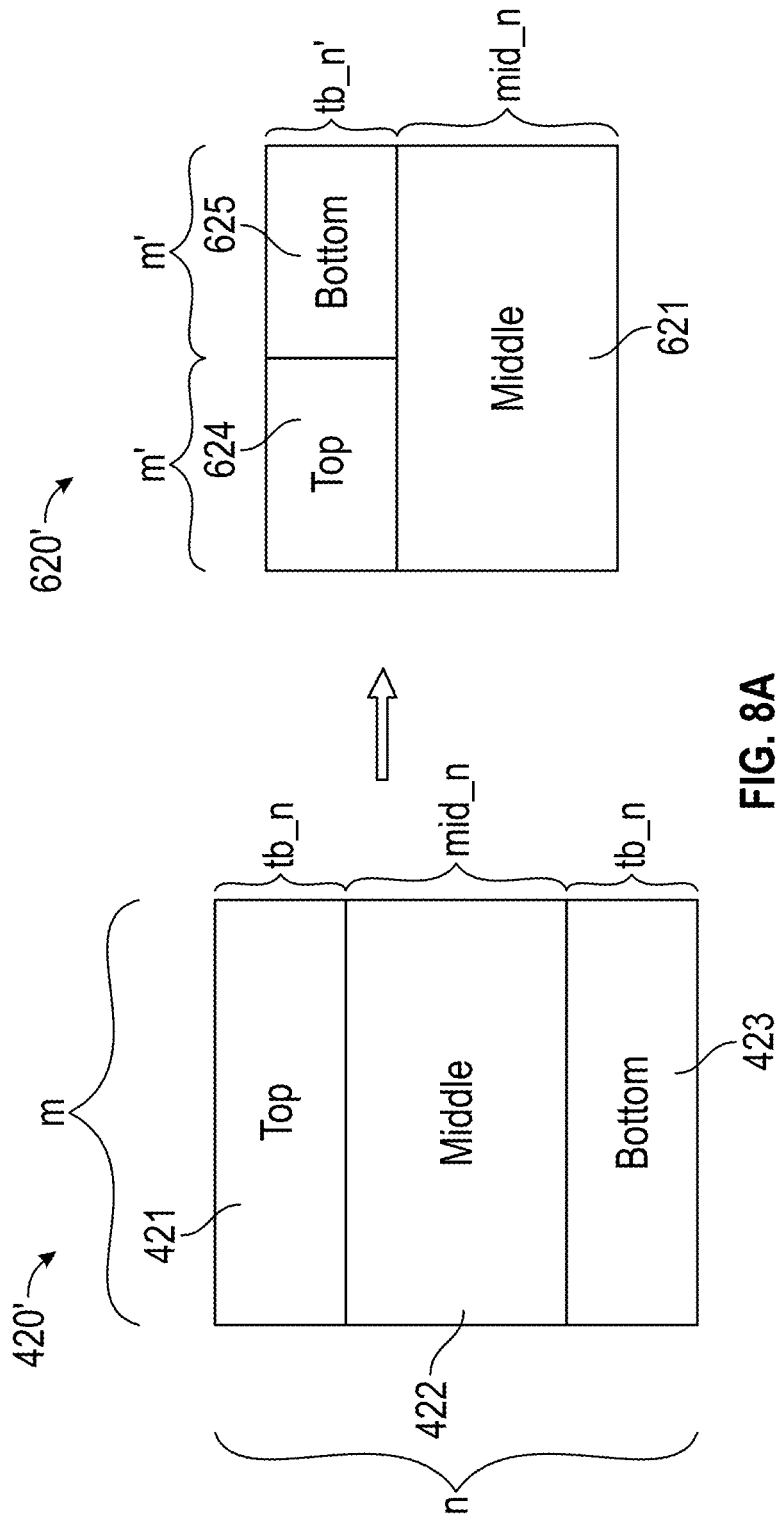
FIGS. 8A, 8B, 8C, 8D and 8E are block diagrams of an example method of reducing artifacts in boundaries between reformatted areas in an example VR video processing system, according to some implementations.

FIG. 8A shows a block diagram of example equirectangular image frame data 420' (left) and corresponding reformatted image frame data 629' (right). The image frame data 420' has a resolution of (m×n) pixels and includes a top portion 421 having an (m×tb_n) resolution, a middle portion 422 having an (m×mid_n) resolution, and a bottom portion 423 having an (m×tb_n) resolution. The reformatted image frame data 620' has a resolution of (2m'×(tb_n'+mid_n)) pixels and includes a top area 624 (downscaled from the top portion 421) and a bottom area 625 (downscaled from the bottom portion 423), adjacent to each other side by side, and a middle area 621 (scaled from the middle portion 422) adjacent to and below the top area 624 and the bottom area 625. The top area 624 and the bottom area 625 each have an m'×tb_n' resolution, and the middle area 621 has an (2m'× mid_n) resolution. The reformatted image frame data as shown in FIGS. 8A-8E do not include a left-side area or a right-side area for convenience of explanation. However, the method of reducing artifacts in area boundaries to be explained with reference to FIGS. 8A-8E in the following sections can be also applicable to a case in which reformatted image frame data includes a left-side area or a right-side area or both. Referring to FIG. 8A, the top portion 421 having (m×tb_n) pixels is downscaled to the top area 624 having (m'×tb_n') pixels, the bottom portion 423 having (m×tb_n) pixels is downscaled to the bottom area 625 having (m'×tb_n') pixels, and the middle portion 422 having (m×mid_n) pixels is downscaled to the middle area 621 having (2m'×mid_n) pixels.

Figure 8B:
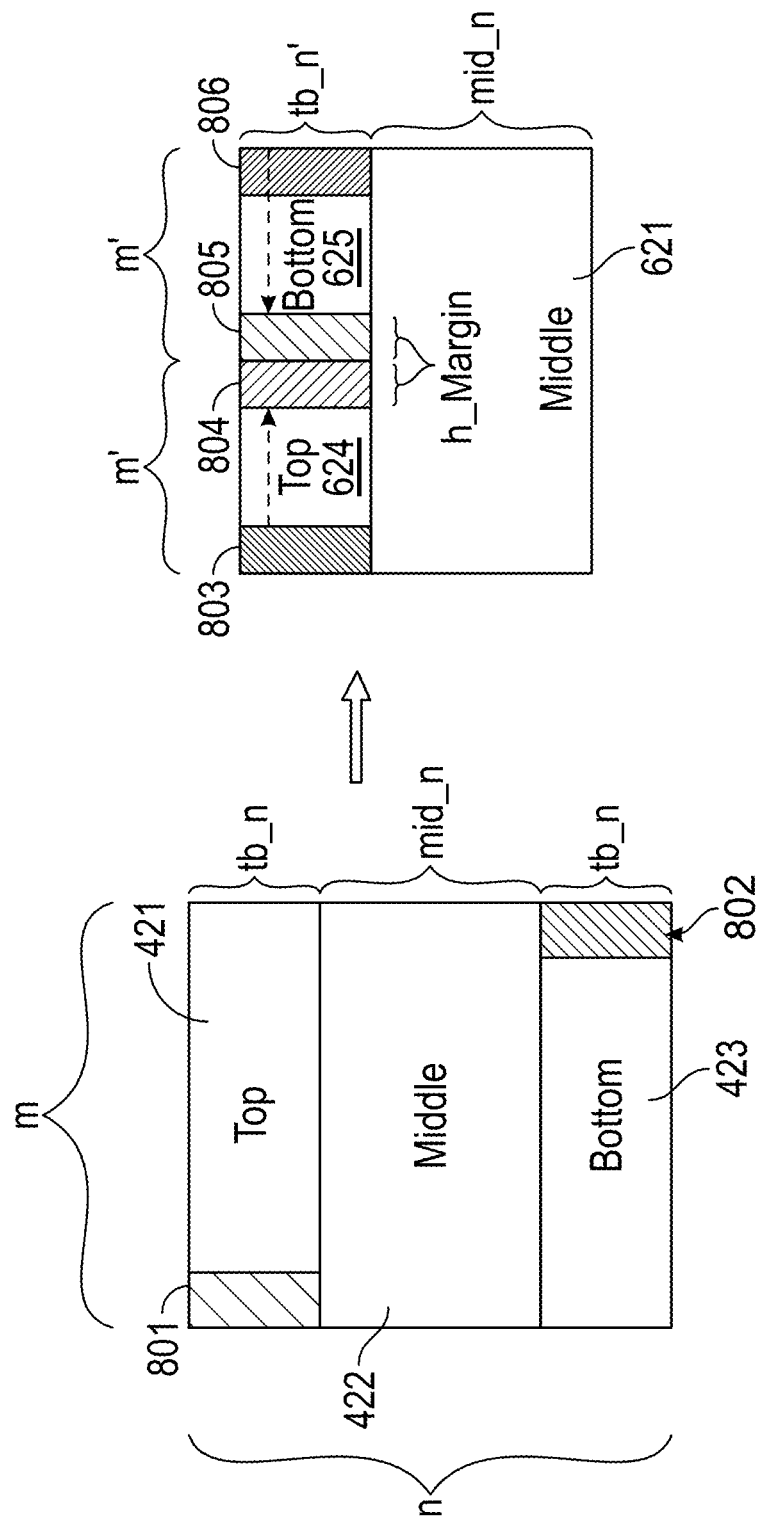
Figure 8C:
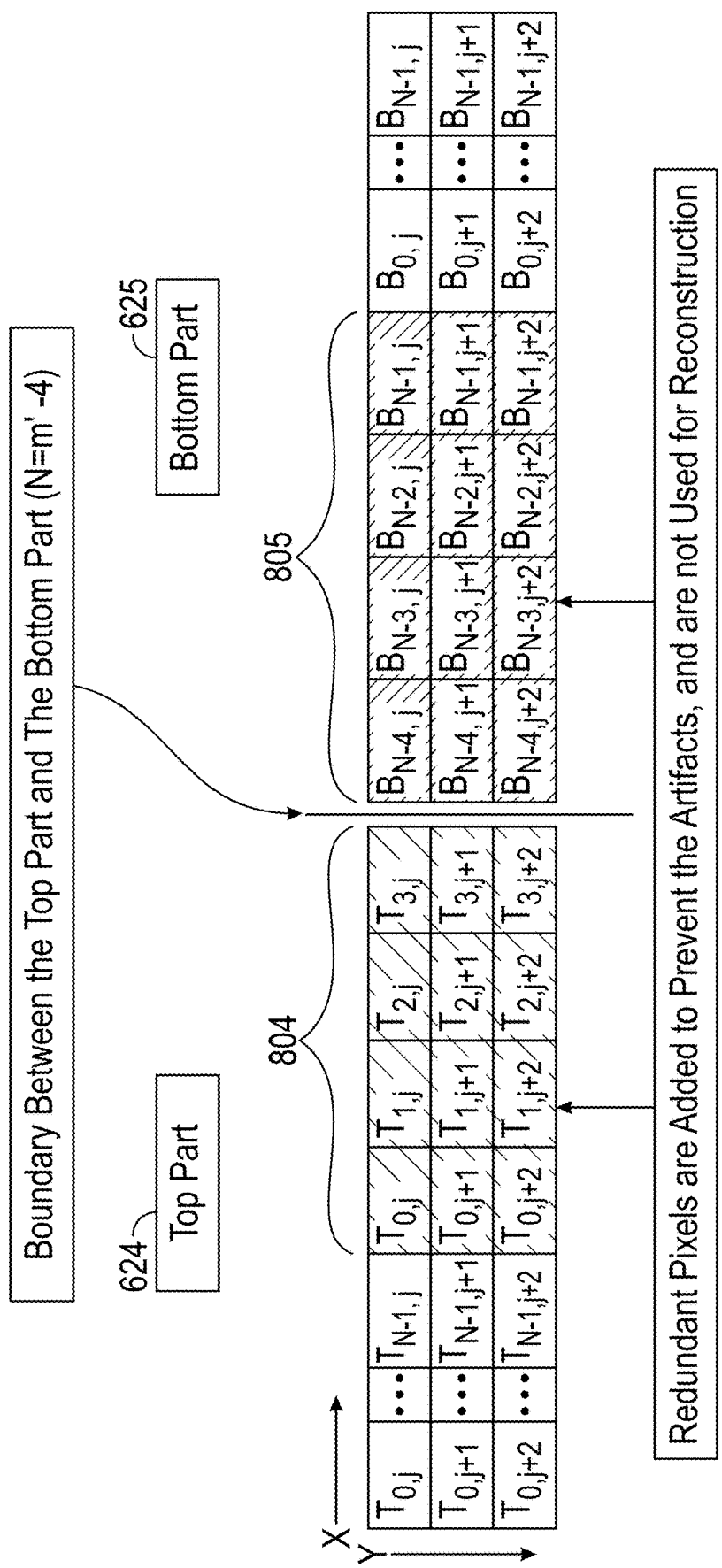

FIG. 8B shows a block diagram of an example method of reducing artifacts in boundaries between rearranged (or reformatted) top area and rearranged bottom area, according to some implementations. In some implementations, the reformatted image frame data use a layout with margins (e.g., a horizontal margin (h_margin) and a vertical margin (v_margin)) to avoid artifacts near boundaries between reformatted areas. For example, referring to 8B, the top portion 421 having (m×tb_n) pixels is downscaled to the top area 624 having ((m'-h_margin)×tb_n') pixels, the bottom portion 423 having (m×tb_n) pixels is downscaled to the bottom area 625 having ((m'-h_margin)×tb_n') pixels, and the middle portion 422 having (m×mid_n) pixels is downscaled to the middle area 621 having (2m'×mid_n) pixels ((2m')×mid_n). In some implementations, the h_margin portion 804 of the top area 624 is copied from a left-most portion 803 of the top area 624, which is downscaled from the portion 801 of the original top portion 421. In some implementations, the h_margin portion 805 of the bottom area 625 is copied from a right-most portion 806 of the bottom area 625, which is downscaled from a right-most portion 802 of the original bottom portion 423. FIG. 8C shows layout details of the top area 624 and the bottom area 625. For example, the h_margin portion 804 of the top area 624 is copied from four columns of pixels ($T_{0,j}$, $T_{1,j}$, $T_{2,j}$, $T_{3,j}$) in the left-most portion 803 of the top area 624. Similarly, the h_margin portion 805 of the bottom area 625 is copied from four columns of pixels ($B_{N-1,j}$, $B_{N-2,j}$, $B_{N-3,j}$, $B_{N-4,j}$) (N=m'-4) in the right-most portion 806 of the bottom area 625.

Figure 8D:
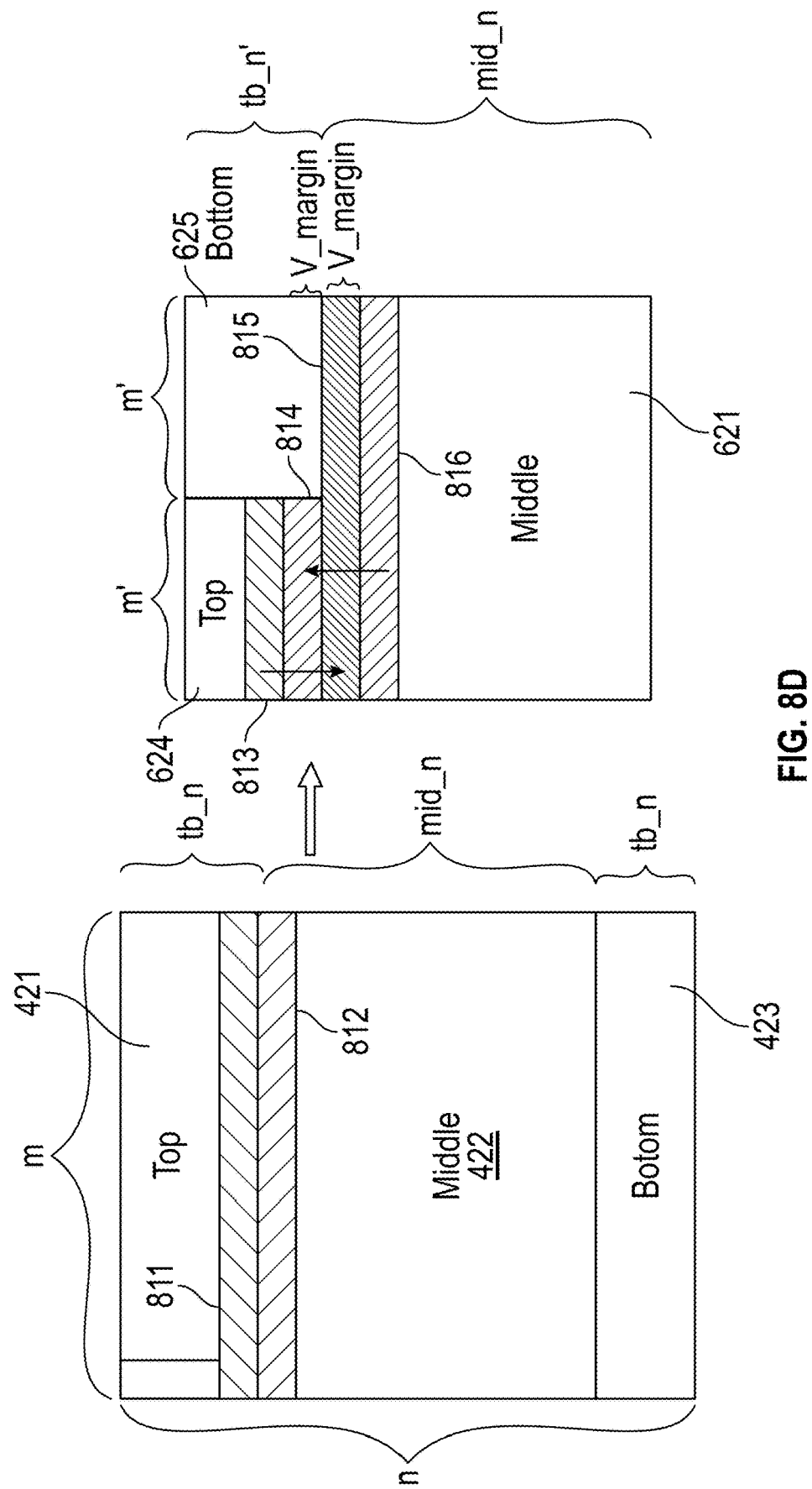

FIG. 8D shows a block diagram of an example method of reducing artifacts in boundaries between rearranged (or reformatted) top area and rearranged middle area, according to some implementations. For example, referring to 8D, the top portion 421 having (m×tb_n) pixels is downscaled to the top area 624 having ((m'×(tb_n'-v_margin)) pixels, and the middle portion 422 having (m×mid_n) pixels is downscaled or scaled to the middle area 621 having ((2m'×(mid_n-v_margin)) pixels. In some implementations, the v_margin portion 814 of the top area 624 is copied from a top-most portion 816 of the middle area 621, which is downscaled or scaled from the portion 812 of the original middle portion 422. In some implementations, the v_margin portion 815 of the middle area 621 is copied from a bottom-most portion 813 of the top area 624, which is downscaled from a bottom-most portion 811 of the original top portion 421.

In some implementations, the layouts with margins illustrated in FIGS. 8B-8D can be combined. That is, with a combined layout with margins, artifacts can be reduced both in in (1) the boundary between a rearranged (or reformatted) top area and a rearranged bottom area, and (2) the boundary between a rearranged top area and a rearranged middle area. For example, a top portion having (m×tb_n) pixels is downscaled to a top area having ((m'-h_margin)×(tb_n'-v_margin)) pixels, a bottom portion having (m×tb_n) pixels is downscaled to a bottom area having ((m'-h_margin)×(tb_n'-v_margin)) pixels, and the middle portion 422 having (m×mid_n) pixels is downscaled or scaled to the middle area 621 having ((2m'×(mid_n-v_margin)) pixels. With this layout, in some implementations, a right-most h_margin portion of the top area is copied from a left-most portion of the top area, and a left-most h_margin portion of the bottom area is copied from a right-most portion of the bottom area. In some implementations, a bottom-most v_margin portion of the top area is copied from a top-most portion of the middle area, and a top-most v_margin portion of the middle area is copied from a bottom-most portion of the top area. In some implementations, because no regions are continuously linked to the top portion of the top area (and the top portion of the top area is the north pole region), no v_margin portion is added to the top portion of the top area, or, in some implementations, a v_margin portion at the top portion of the top area, if any, is filled with "DON'T CARE" contents. In some implementations, because no regions are continuously linked to the bottom portion of the bottom area (and the bottom portion of the bottom area is the south pole region), no v_margin portion is added to the bottom portion of the bottom area, or, in some implementations, a v_margin portion at the bottom portion of the bottom area, if any, is filled with "DON'T CARE" contents.

Figure 8E:
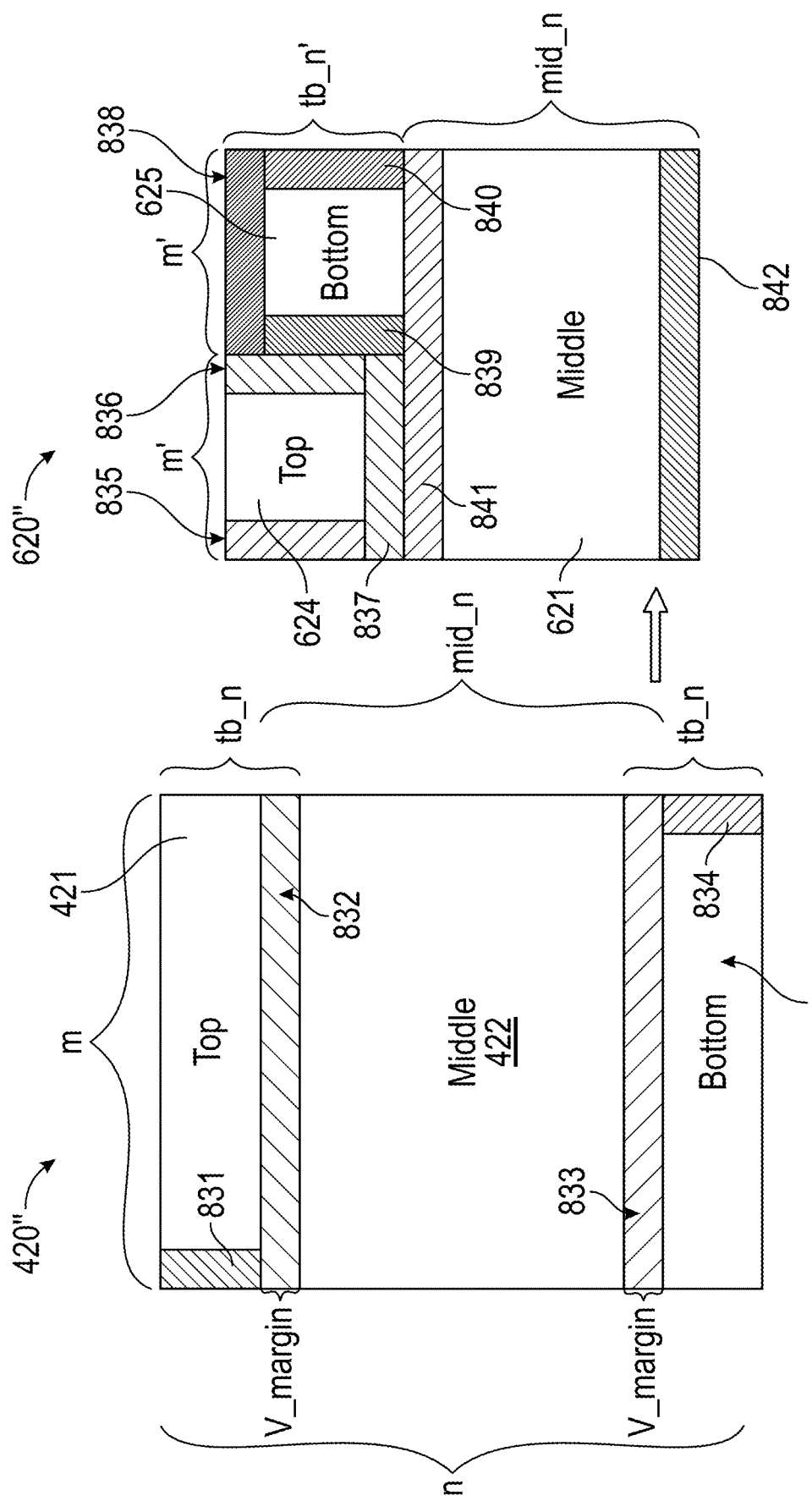

FIG. 8E shows a block diagram of an example method of reducing artifacts in boundaries between rearranged (or reformatted) bottom area and rearranged middle area using the layout with overlapped vertical margins, according to some implementations. In some implementations, referring to FIG. 8E, in original image frame data 420" (which is scaled and reformatted to reformatted image frame 620"), a top portion 421 and a middle portion 422 share an overlapped v_margin portion 832, and a bottom portion 423 and the middle portion 422 share an overlapped v_margin portion 833. With this layout with overlapped vertical margins, referring to FIG. 8E, abrupt changes in the (color) quality can be reduced near a boundary between a rearranged top area 624 and a rearranged middle area 621 and a boundary between the rearranged middle area 621 and a rearranged bottom area 625. With this layout with overlapped vertical margins, in some implementations, the top portion 421 having (m×(tb_n)) pixels is downscaled to the top area 624 having ((m'-h_margin)×tb_n') pixels, a bottom portion having (m×(tb_n)) pixels is downscaled to the bottom area 625 having ((m'-h_margin)×tb_n') pixels, and the middle portion 422 having (m×(mid_n) pixels is downscaled or scaled to the middle area 621 having ((2m'×mid_n) pixels. With this layout, in some implementations, the shared v_margin region 832 is downscaled to a corresponding portion 837 of the top area 624, and is also downscaled or scaled to a corresponding portion 841 of the middle area 621. Similarly, the shared v_margin region 833 is downscaled to a corresponding portion 838 of the bottom area 625, and is also downscaled or scaled to a corresponding portion 842 of the middle area 621. In some implementations, the h_margin portion 836 of the top area 624 is copied from a left-most portion 835 of the top area 624, which is downscaled from the portion 831 of the original top portion 421. In some implementations, the h_margin portion 839 of the bottom area 625 is copied from a right-most portion 840 of the bottom area 625, which is downscaled from a right-most portion 834 of the original bottom portion 423. The layouts and methods illustrated in FIGS. 8A-8E are based on the reformatted layout of FIG. 6C, in which the reformatted top and bottom areas are adjacent to and above the reformatted middle area. In some implementations, similar layouts and methods can be also applied to the reformatted layout of FIG. 6D, in which the reformatted top and bottom areas are adjacent to and below the reformatted middle area.

Now, the flowchart in FIG. 5C will be described in more detail, referring to FIGS. 8A-8E. Referring to FIG. 5C, at stage 561, in some implementations, redundant pixels (e.g., pixels in the h_margin portions 804 and 805 in FIGS. 8B and 8C) may be added in a boundary between a downscaled top area (e.g., the top area 624 in FIG. 8B) and a downscaled bottom area (e.g., the bottom area 625 in FIG. 8B). In some implementations, the video server is further configured to cause the first processor to add, prior to the encoding (e.g., the stage 570 in FIG. 5A) and after the rearrangement (e.g., the stage 550 in FIG. 5A), redundant pixels (e.g., pixels in the h_margin portions 804 and 805 in FIGS. 8B and 8C) in a boundary between the scaled top area (e.g., the top area 624 in FIG. 8B) and the scaled bottom area (e.g., the bottom area 625 in FIG. 8B). Referring to FIG. 8B, in some implementations, the h_margin portion 804 of the top area 624 is copied from a left-most portion 803 of the top area 624, which is downscaled from the portion 801 of the original top portion 421. Referring to FIG. 8B, in some implementations, the h_margin portion 805 of the bottom area 625 is copied from a right-most portion 806 of the bottom area 625, which is downscaled from a right-most portion 802 of the original bottom portion 423.

At stage 562, referring to FIG. 8), in some implementations, redundant pixels (e.g., pixels in the v_margin portions 814 and 815) may be added in a boundary between a scaled middle area (e.g., the middle area 621) and downscaled top area (e.g., the top area 624). Referring to FIG. 8D, in some implementations, the video server is further configured to cause the first processor to add, prior to the encoding (e.g., the stage 570 in FIG. 5A) and after the rearrangement (e.g., the stage 550 in FIG. 5A), redundant pixels to a first portion (e.g., the v_margin portions 815) of the scaled middle area and a second portion (e.g., the v_margin portions 814) of the scaled top area, the first portion and the second portion being adjacent to each other (e.g., the v_margin portions 815 and the v_margin portions 814 are adjacent to each other). Referring to FIG. 8D, in some implementations, the v_margin portion 814 of the top area 624 is copied from a top-most portion 816 of the middle area 621, which is downscaled or scaled from the portion 812 of the original middle portion 422. Referring to FIG. 8D, in some implementations, the v_margin portion 815 of the middle area 621 is copied from a bottom-most portion 813 of the top area 624, which is downscaled from a bottom-most portion 811 of the original top portion 421.

Figure 9A:
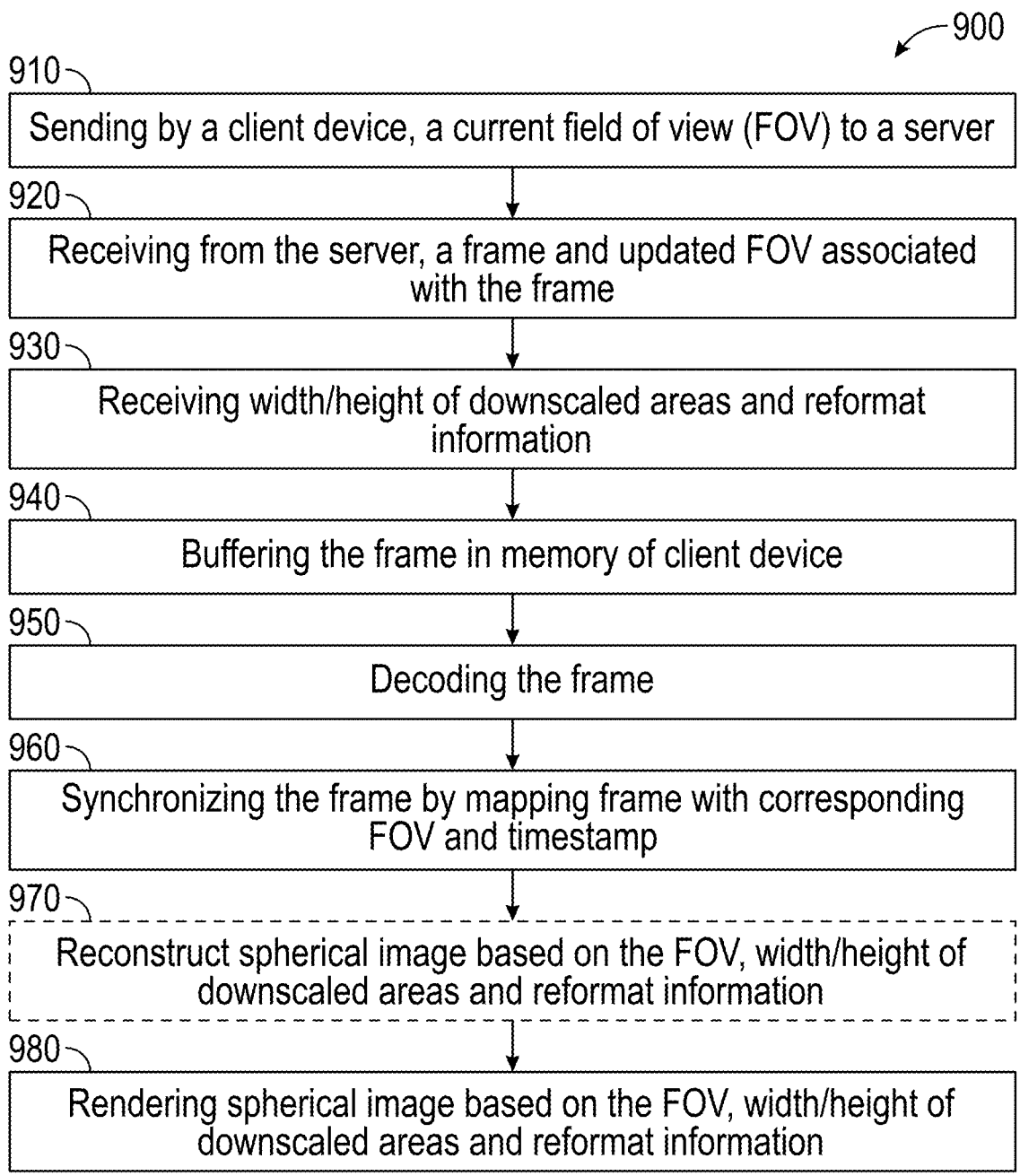
FIGS. 9A, 9B and 9C are flowcharts showing operations of an example video processing and rendering method in an example VR client device, according to some implementations.

FIG. 9A is a flowchart showing operations of an example video processing and rendering method in an example VR client device, according to some implementations. In broad overview, the method 900 begins with stage 910 in which a client device may send information relating to a current field of view (FOV) to a server. At stage 920, the client device may receive from the server, a frame and information relating to an updated FOV associated with the frame. At stage 930, the client device may receive width and height of downscaled areas as determined by the server and reformat information. At stage 940, the received frame may be buffered in a memory of the client device. At stage 950, the received frame may be decoded based on the FOV, width and height of downscaled areas and reformat information. At stage 960, the frame may be synchronized by mapping the frame with corresponding FOV and timestamp. At stage 970, a spherical image of the frame may be reconstructed. At stage 980, a spherical image of the frame may be rendered.

Figure 10A:
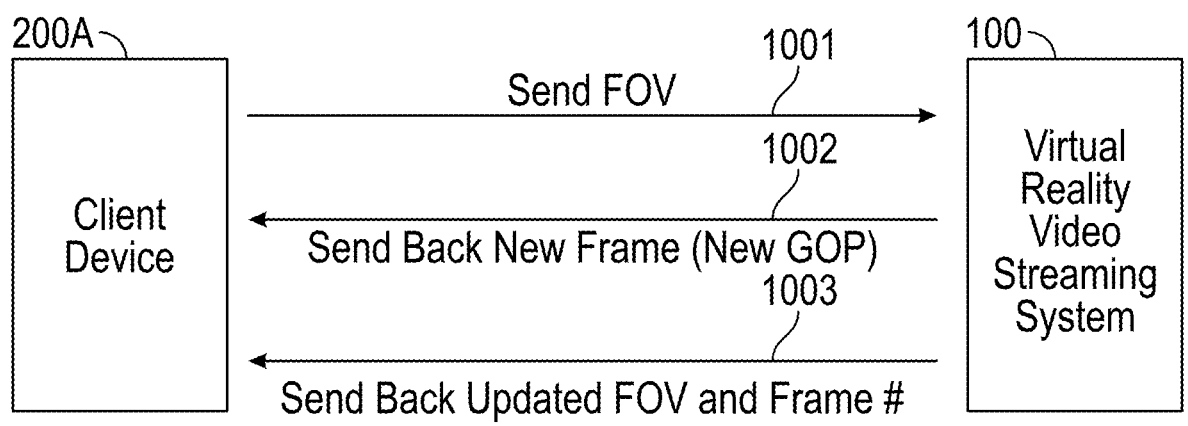
Figure 10B:
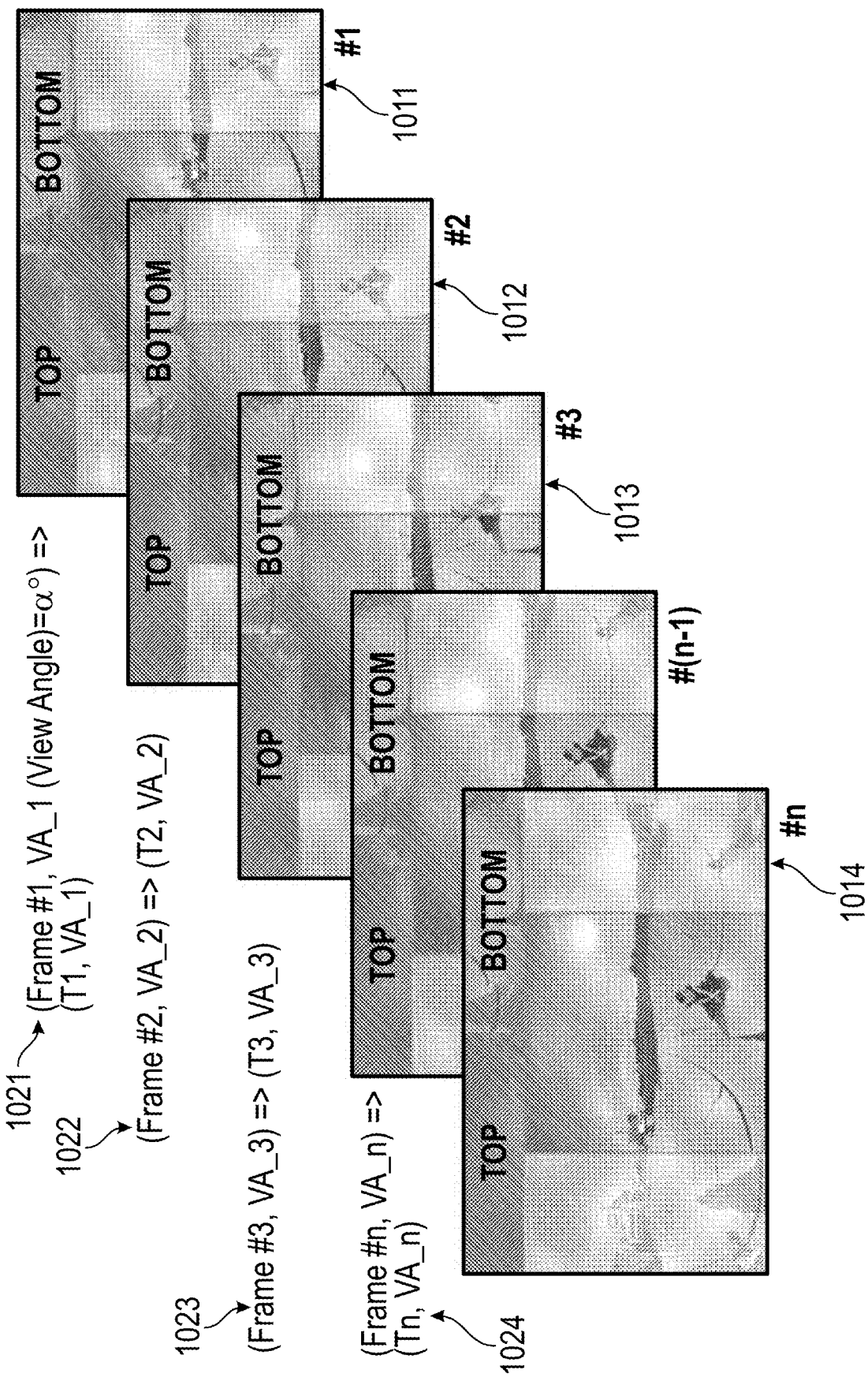

Now, the flowchart in FIG. 9A will be described in more detail, by referring to FIGS. 10A-10C. FIGS. 10A, 10B and 10C are block diagrams of an example video processing and rendering method in an example VR client device, according to some implementations. FIG. 10A shows a block diagram of an example data communication method between an example VR client device 200A and an example VR video streaming system 100. In some embodiments, the client device 200A may send a current view angle (e.g., the view angle 602 in FIG. 6A) to the server 100 (or the communication server 130 of the server 100 in FIG. 3). In some implementations, referring to FIG. 10A, the client device 200A may send to the server 100 information relating to a current FOV (e.g., an azimuth angle FOV, a vertical angle FOV, or pitch angles) (Step 1001). In some implementations, in response to the client device 200A sending the current view angle, the server 100 (or the streaming server 140 in FIG. 3) may send to the client device 200A, a new video frame or a new Group of Pictures (GOP) corresponding to the current view angle sent by the client device 200A (Step 1002). In some implementations, the server 100 also may send to the client 200A a frame sequence number corresponding to the new vide frame or GOP. In some implementations, the server 100 (or the communication server 130 in FIG. 3) may update the view angle or FOV and send back to the client device 200A, the updated view angle or FOV (see Step 1003). In some implementations, the server 100 may send back, to the client device, the view angle in real time by sending the view angle along with the frame sequence number through a WebSocket protocol. In some implementation, the server 100 may send back the view angle by sending it as the video stream's metadata using, for example, a subtitle of the video stream. In some implementations, all video frames each carry their view angles in azimuth values via (1) WebSocket (2) metadata (e.g., subtitle). In either case, in some implementations, the view angle sent by the server may be computed and applied against (or relative to) the current viewer's FOV. In some implementations, each frame, or frames of a GOP, has its corresponding view angle or FOV in order to be rendered properly in the client device 200A. In some implementations, the server may send back reformat information (e.g., widths and heights of top/bottom/middle/left-side/right-side areas calculated using the methods illustrated in FIGS. 7A-7C, relative locations of top/bottom/middle/left-side/right-side areas in reformatted frame data as shown in FIGS. 6B and 6C, and information on layout with margins or overlapped margins as shown in FIGS. 8A-8E) to the client device 200A. In some implementations, in response to receiving the video frame, the corresponding view angle or FOV, and other reformat information, the client device 200A buffers and decodes the video frame, and synchronizes the decoded video frame with a timestamp for rendering a spherical frame correctly.

FIG. 10B shows a block diagram of an example frame synchronization method in an example VR client device, according to some implementations. In some implementations, to ensure matching a frame with its view angle, the server 100 (or the communication server 130 in FIG. 3) sends a (key, value) pair of data back to the client device 200, such that the key is set to a frame sequence number and the value is set to the corresponding view angle. For example, referring to FIG. 10B, the client device 200 receives N number of frames including frame #1 (1011), frame #2 (1012), frame #3 (1013) . . . and frame #N (1014). In some implementations, the client device 200 also receives from the server 100, N number of (key, value) pairs including (Frame #1, VA_1), (Frame #2, VA_2), (Frame #3, VA_3), . . . , (Frame #N, VA_N). In some implementations, after buffering the N number of frames, the client device 200 decodes the frames and acquires a display timestamp corresponding each of the frames. In some implementations, after decoding the frames, the client device 200 uses the display timestamp as a new frame ID and maps the (key=frame number, value=view angle) pairs to (key=new frame ID (or display timestamp), value-view angle) pairs in order to synchronize the video frames for rendering (or displaying) a spherical frame correctly. FIG. 10B shows such mappings between the (key=frame number, value=view angle) pairs and (key=new frame ID (or display timestamp), value-view angle) pairs including (TS_1 (timestamp), VA_1) 1021, (TS_2, VA_2) 1022, (TS_3, VA_3) 1023, . . . , (TS_N, VA_N) 1024.

In some implementations, after synchronizing the frames with display timestamps (and corresponding view angles), the client device 200 renders spherical frames via a processor (e.g., the processor 310 in FIG. 2) or GPU (e.g., the GPU 370 in FIG. 2) using the timestamps and other formatting or rendering information received from the server 100 (e.g., widths and heights of top/bottom/middle/left-side/right-side areas calculated using the methods illustrated in FIGS. 7A-7C, relative locations of top/bottom/middle/left-side/right-side areas in reformatted frame data as shown in FIGS. 6B and 6C, and information on layout with margins or overlapped margins as shown in FIGS. 8A-8E).

In some implementations, the client device 200 can reconstruct original spherical image frame data (e.g., data for a spherical image frame 430 in FIG. 10C) from a reformatted image frame (e.g., a reformatted image frame 620 in FIG. 10C) and render the spherical image frame based on the reconstructed image frame data. In other words, in some implementations, a VR 360 video is rendered by mapping or texture mapping the reconstructed image frame on a sphere. Exemplary texture mapping is described in a web document titled "Texture Mapping," available at http://cse.csusb.edu/tongyu/courses/cs520/notes/texture.php, which is incorporated herein by reference for details as to how to texture map reconstructed frames as set forth in this patent application.

In some implementations, referring to FIG. 10C, the client device can render a spherical image frame 430 based on a reformatted image frame 620 without reconstructing spherical image frame data. In some implementations, without reconstructing or saving the original spherical image, the client device recalculates texture coordinates for mapping the reformatted image frame on a sphere. In some implementations, after obtaining the new texture coordinates, the client device can render a spherical image by applying the new texture coordinates. In some implementations, the client device recalculates the texture coordinates based on the formatting or rendering information received from the server 100, and then render the spherical image frame 430, and maps each reformatted area of the reformatted image frame 620 on a sphere. For example, the client device 200 may render a spherical middle area 432 by mapping the reformatted middle area 621 on the spherical middle area 432 (Step 1050). Similarly, the client device 200 may render spherical bottom area 433 based on the reformatted bottom area 625 (Step 1052), a spherical top area 431 based on the reformatted top area 624 (Step 1054), a portion of the spherical middle area 432 based on the reformatted left-side area 622 (Step 1056), and a portion of spherical middle area 432 based on the reformatted right-side area 623 (Step 1058), in that order or in any other orders. In the reconstruction-based rendering method, the original spherical image is considered as identical m×n quads and each quad is transformed to be one piece of a sphere, thereby allowing for a straightforward calculation of texture coordinates, for example, $(i, j)^{th}$ quad's texture coordinate is (i/m, j/n). On the other hand, in the reformatted image-based rendering method, the client device can identify to what portion each area of the reformatted image is mapping. For example, for a top area (e.g., 45 degrees-90 degrees) of a sphere, the client device can use 0 to 0.5 for "u" texture coordinates and 0 to 0.2 for "v" texture coordinates. Because the new texture coordinates are constant, they can be pre-computed offline. Therefore, compared with the reconstruction-based method, the reformatted image-based method can save GPU time for reconstruction and additional GPU memory usage, while its implementation may become more complicated in case building a sphere object is a part of an SDK that an application is relying on.

Now, the flowchart in FIG. 9A will be described in more detail, referring to FIGS. 10A, 10B and 10C. Referring to FIG. 9A, at stage 910 a client device may send a current field of view (FOV) to a server. For example, referring to FIG. 10A, the client device 200 may send a current view angle (e.g., the view angle 602 in FIG. 6A) to the server 100 (or the communication server 130 of the server 100 in FIG. 3). In some implementations, referring to FIG. 10A, the client device 200 may send to the server 100 information relating to a current FOV (e.g., an azimuth angle FOV, a vertical angle FOV, or pitch angles) (Step 1001 in FIG. 10A).

At stage 920, the client device may receive from the server, a frame and an updated FOV associated with the frame. For example, referring to FIG. 10A, in response to the client device 200 sending the current view angle, the server 100 (or the streaming server 140 in FIG. 3) may send to the client device 200, a new video frame or a new Group of Pictures (GOP) corresponding to the current view angle sent by the client device 200 (Step 1002 in FIG. 10A). In some implementations, the server 100 also may send to the client 200 a frame sequence number corresponding to the new vide frame or GOP. In some implementations, the server 100 (or the communication server 130 in FIG. 3) may update the view angle or FOV and send back to the client device 200, the updated view angle or FOV (see Step 1003 in FIG. 10A).

At stage 930, the client device may receive width and height of downscaled areas as determined by the server and reformat information. For example, In some implementations, the server may send back reformat information (e.g., widths and heights of top/bottom/middle/left-side/right-side areas calculated using the methods illustrated in FIGS. 7A-7C, relative locations of top/bottom/middle/left-side/right-side areas in reformatted frame data as shown in FIGS. 6B and 6C, and information on layout with margins or overlapped margins as shown in FIGS. 8A-8E) to the client device 200.

At stage 940, the client device may buffer the frame received from the server (e.g., the streaming server 140 in FIG. 3) in a memory (e.g., the memory 360 in FIG. 2) of the client device (e.g., the client device 200A in FIG. 3).

At stage 950, the client device may decode the frame received from the server at stage 920. In some implementations, a decoder of the client device decodes the buffered frame and store the decoded frame (e.g., in a format of a reformatted image 620 as shown in FIG. 10C) in a memory of the client device.

Figure 9B:
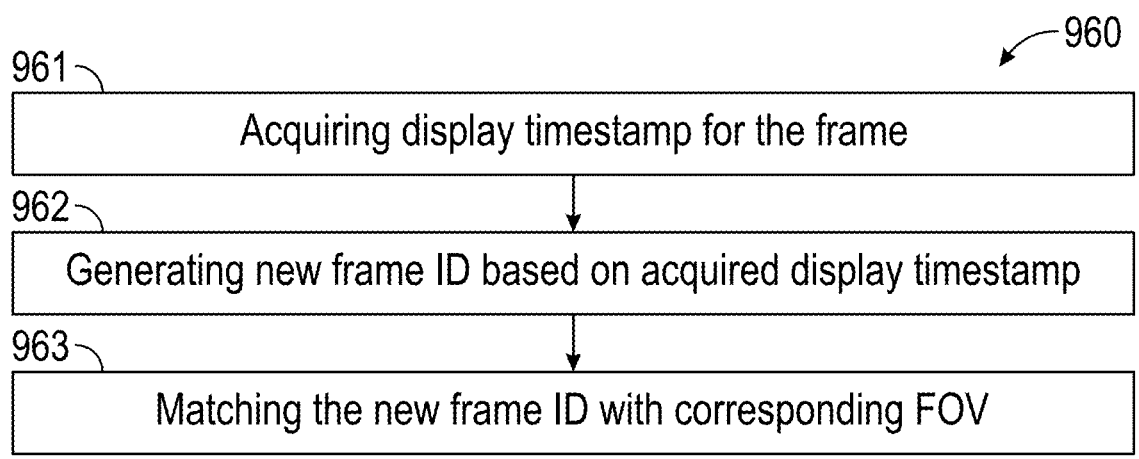

At stage 960, the frame may be synchronized by mapping the frame with corresponding FOV and timestamp. FIG. 9B is a flowchart showing detailed operations of synchronizing the frame by mapping frame with corresponding FOV and timestamp according to some implementations.

Referring to FIG. 9B, at stage 961, after buffering frames, the client device may acquire a display timestamp may for each of the frames. For example, after buffering frames, the client device 200 decodes the frames and acquires a display timestamp corresponding each of the frames.

At stage 962, the client device may generate a new frame ID based on the acquired display timestamp. For example, referring to FIG. 10B, the client device may generate new frame IDs (e.g., T1, T2, . . . , Tn) based on the acquired display timestamps corresponding n frames (e.g., the frames with the frame numbers Frame_#1, Frame_#2, . . . , Frame_#n).

At stage 963, the client may match the new frame ID with a corresponding FOV. For example, to ensure matching a frame with its view angle, the server 100 (or the communication server 130 in FIG. 3) sends a (key, value) pair of data back to the client device 200, such that the key is set to a frame sequence number and the value is set to the corresponding view angle. Referring to FIG. 10B, the client device 200 receives N number of frames including frame #1 (1011), frame #2 (1012), frame #3 (1013) . . . and frame #N (1014). In some implementations, the client device 200 also receives from the server 100, N number of (key, value) pairs including (Frame #1, VA_1), (Frame #2, VA_2), (Frame #3, VA_3), . . . , (Frame #N, VA_N). In some implementations, after decoding the frames, the client device 200 uses the display timestamp as a new frame ID and maps the (key=frame number, value=view angle) pairs to (key=new frame ID (or display timestamp), value=view angle) pairs in order to synchronize the video frames for rendering (or displaying) a spherical frame correctly. FIG. 10B shows such mappings between the (key=frame number, value=view angle) pairs and (key=new frame ID (or display timestamp), value=view angle) pairs including (TS_1 (timestamp), VA_1) 1021, (TS_2, VA_2) 1022, (TS_3, VA_3) 1023, . . . , (TS_N, VA_N) 1024.

Referring back to FIG. 9A, at stage 970, the client device may reconstruct a spherical image of the frame based on the FOV, width/height of downscaled areas and reformat information, as received in stage 930. For example, referring to FIG. 10C, the client device 200 can reconstruct original spherical image frame data (e.g., data for a spherical image frame 430) from a reformatted image frame (e.g., a reformatted image frame 620). In some implementations, the reconstruction may include upscaling the downscaled areas in the reformatted image (e.g., a reformatted image frame 620) back to the original resolutions of the areas. In some implementations, the reconstruction may include and rearranging the reformatted areas (e.g., the top/bottom/middle/left-side/right-side areas in the reformatted image frame 620) back to the original arrangement of those areas (e.g., the top/bottom/middle areas of the original image frame 610 in FIG. 6B). In some implementations, the reconstruction step at stage 970 may be omitted.

Figure 9C:
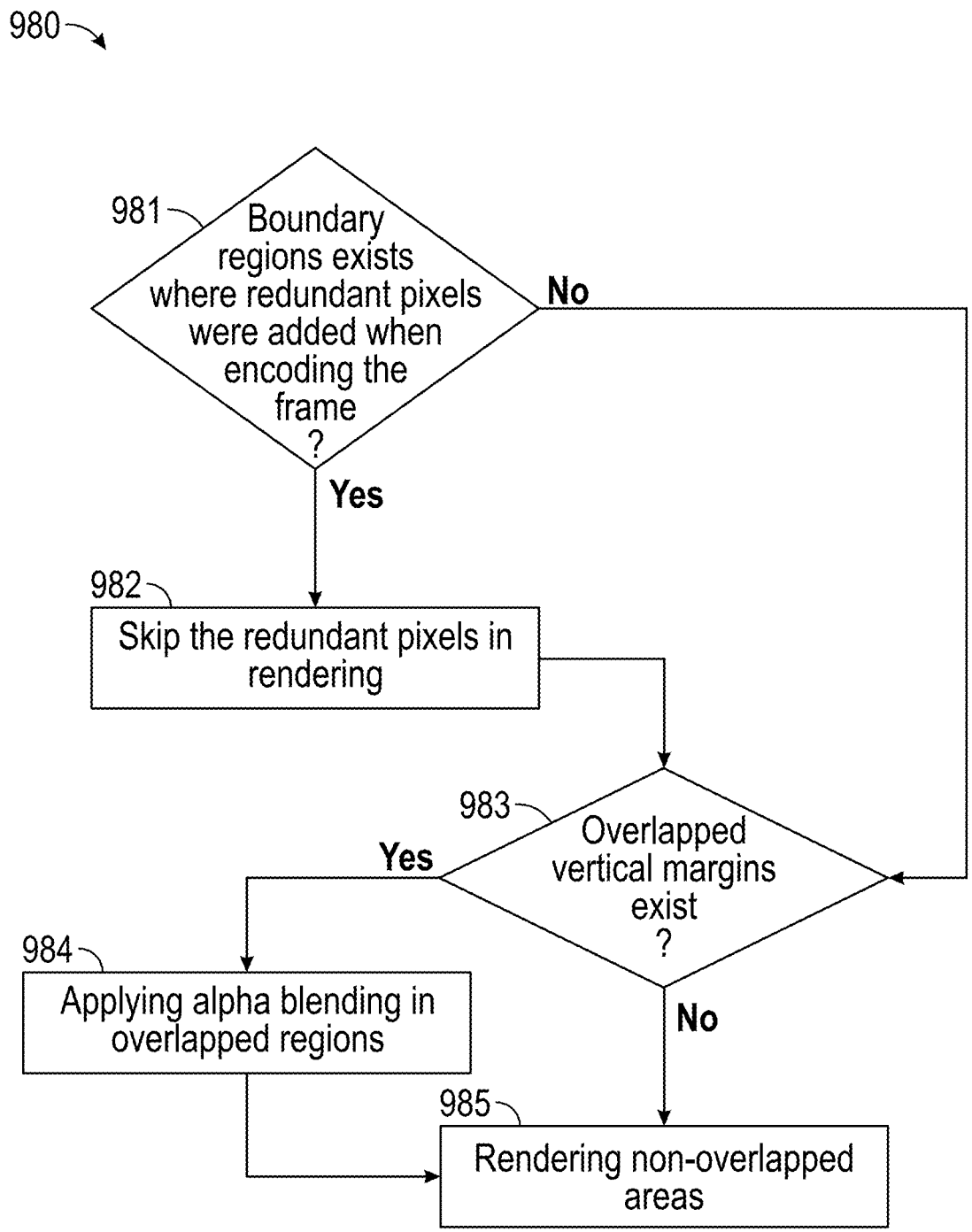

At stage 980, the client device may render the spherical image of the frame. FIG. 9C is a flowchart showing detailed operations of rendering the spherical image of the frame. Details of the rendering method will be described with reference to FIG. 9C as follows:

Referring to FIG. 9C, at stage 981, the client device may determine whether boundary regions exists where redundant pixels were added when encoding the frame in the server. In some implementations, the client device may determine whether boundary regions exists where redundant pixels were added, based on the reformat information received from the server at stage 930 (e.g., widths and heights of top/bottom/middle/left-side/right-side areas calculated using the methods illustrated in FIGS. 7A-7C, relative locations of top/bottom/middle/left-side/right-side areas in reformatted frame data as shown in FIGS. 6B and 6C, and information on layout with margins or overlapped margins as shown in FIGS. 8A-8E).

At stage 982, if it is determined that such boundary regions exists in the frame where redundant pixels were added when encoding the frame, the client device skips (or omits) the redundant pixels in rendering the frame.

At stage 983, if it is determined that such boundary regions do not exists, the client device may determine whether overlapped vertical margins exist in boundary regions. In some implementations, the client device may determine whether overlapped vertical margins exist in boundary regions, based on the reformat information received from the server at stage 930.

At stage 984, if it is determined that overlapped vertical margins exist in boundary regions, alpha blending may be applied in the overlapped vertical margins (or overlapped vertical regions). In some implementations, after reconstruction, alpha blending may be applied in overlapped regions. For example, the client device may blend, from the reconstructed frame, a bottom portion of the top area with a top portion of the middle area. Similarly, the client device may blend, from the reconstructed frame, a top portion of the bottom area with a bottom portion of the middle area. In some implementations, in case reconstruction is not performed, the client device extracts overlapped regions from a reformatted image frame (e.g., the frame 620 in FIG. 10C) and then apply alpha blending to the extracted overlapped regions. For example, the client device may blend a bottom portion of the top area (e.g., the portion 837 in FIG. 8E) with a top portion of the middle area (e.g., the portion 841 in FIG. 8E). Similarly, the client device may blend a top portion of the bottom area (e.g., the portion 838 in FIG. 8E) with a bottom portion of the middle area (e.g., the portion 842 in FIG. 8E).

At stage 985, the client device may render the spherical image of the frame from non-boundary regions of frames. In some implementations, a VR 360 video (e.g., the spherical image frame 430 in FIG. 10C) is rendered by mapping or texture mapping the image frame reconstructed at stage 970 on a sphere. Alternatively, referring to FIG. 10C, the client device can render a spherical image frame 430 based on a reformatted image frame 610 without reconstructing spherical image frame data. For example, without reconstructing or saving the original spherical image, the client device recalculates texture coordinates for mapping the reformatted image frame on a sphere. In some implementations, after obtaining the new texture coordinates, the client device can render a spherical image by applying the new texture coordinates. In some implementations, the client device recalculates the texture coordinates based on the formatting or rendering information received from the server 100, and then render the spherical image frame 430, and maps each reformatted area of the reformatted image frame 610 on a sphere. For example, referring to FIG. 10C, the client device 200 may render a spherical middle area 432 by mapping the reformatted middle area 621 on the spherical middle area 432 (Step 1050). Similarly, referring to FIG. 10C, the client device 200 may render spherical bottom area 433 based on the reformatted bottom area 625 (Step 1052), a spherical top area 431 based on the reformatted top area 624 (Step 1054), a portion of the spherical middle area 432 based on the reformatted left-side area 622 (Step 1056), and a portion of spherical middle area 432 based on the reformatted right-side area 623 (Step 1058), in that order or in any other orders. In some implementations, the rendering may include upscaling the downscaled areas in the reformatted image (e.g., a reformatted image frame 620) back to the original resolutions of the areas.

Figure 11A:
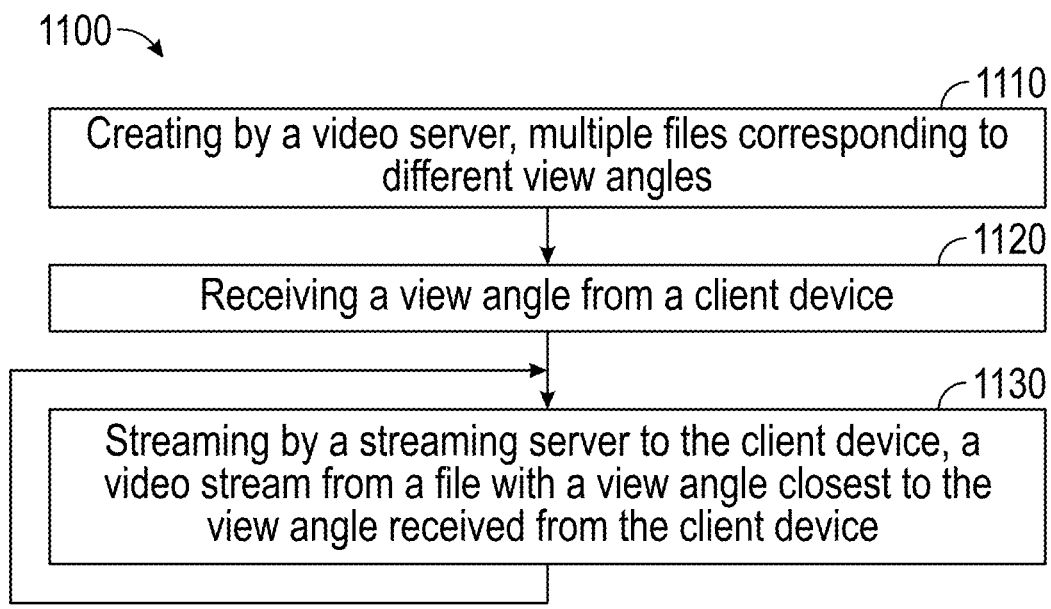
FIGS. 11A, 11B and 11C are flowcharts showing operations of an example streaming method in an example VR video processing system, according to some implementations.

FIG. 11A is a flowchart showing operations of an example streaming method in an example VR video processing system, according to some implementations. In broad overview, the method 1100 begins with stage 1110 in which a video server may create multiple files corresponding to different view angles. At stage 1120, a view angle may be received from a client device. At stage 1130, a streaming server may stream, to the client device, a video stream from a file with a view angle closest to the view angle received from the client device.

Figure 12A:
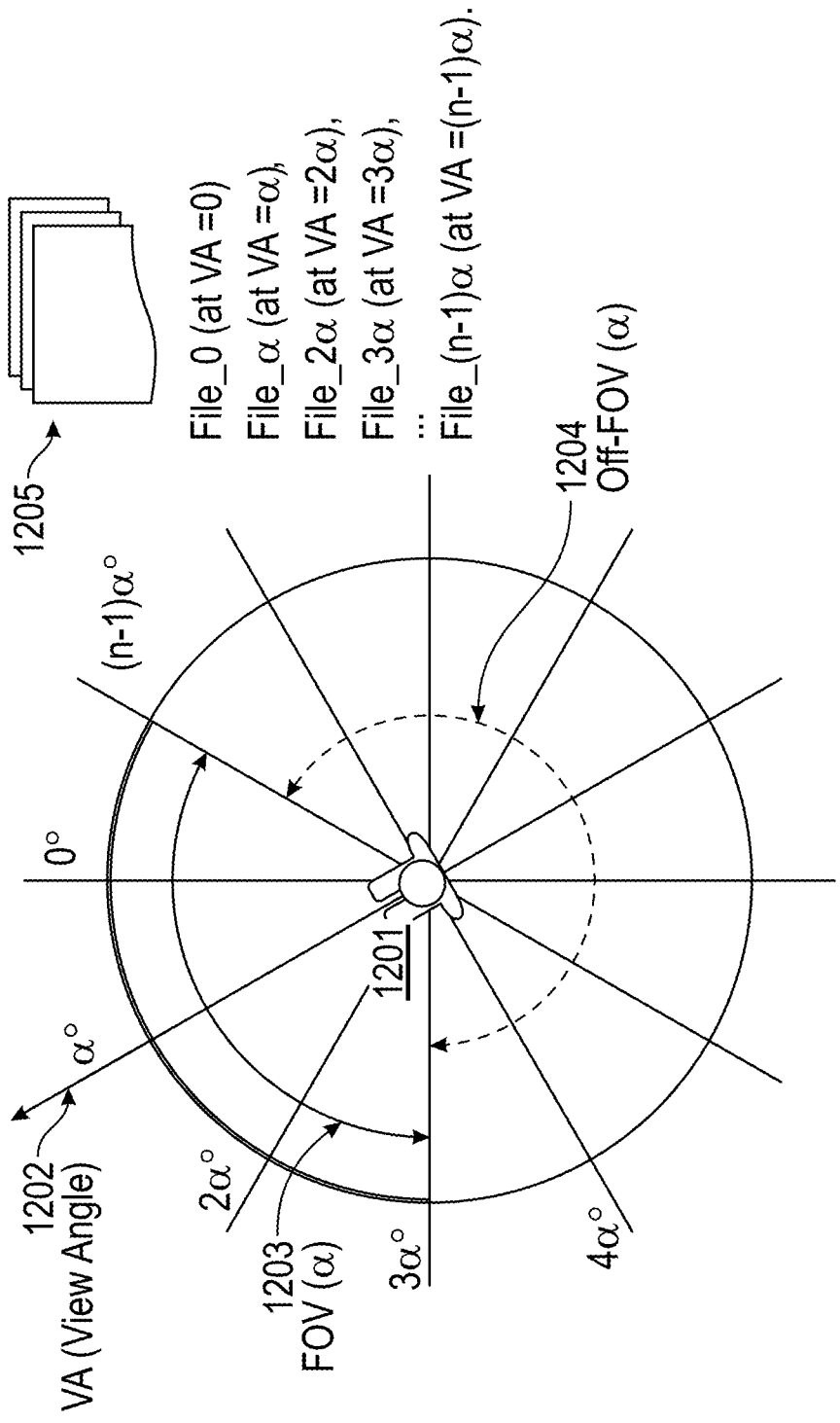
FIGS. 12A and 12B are block diagrams of an example streaming method in an example VR video processing system, according to some implementations.
Figure 12B:
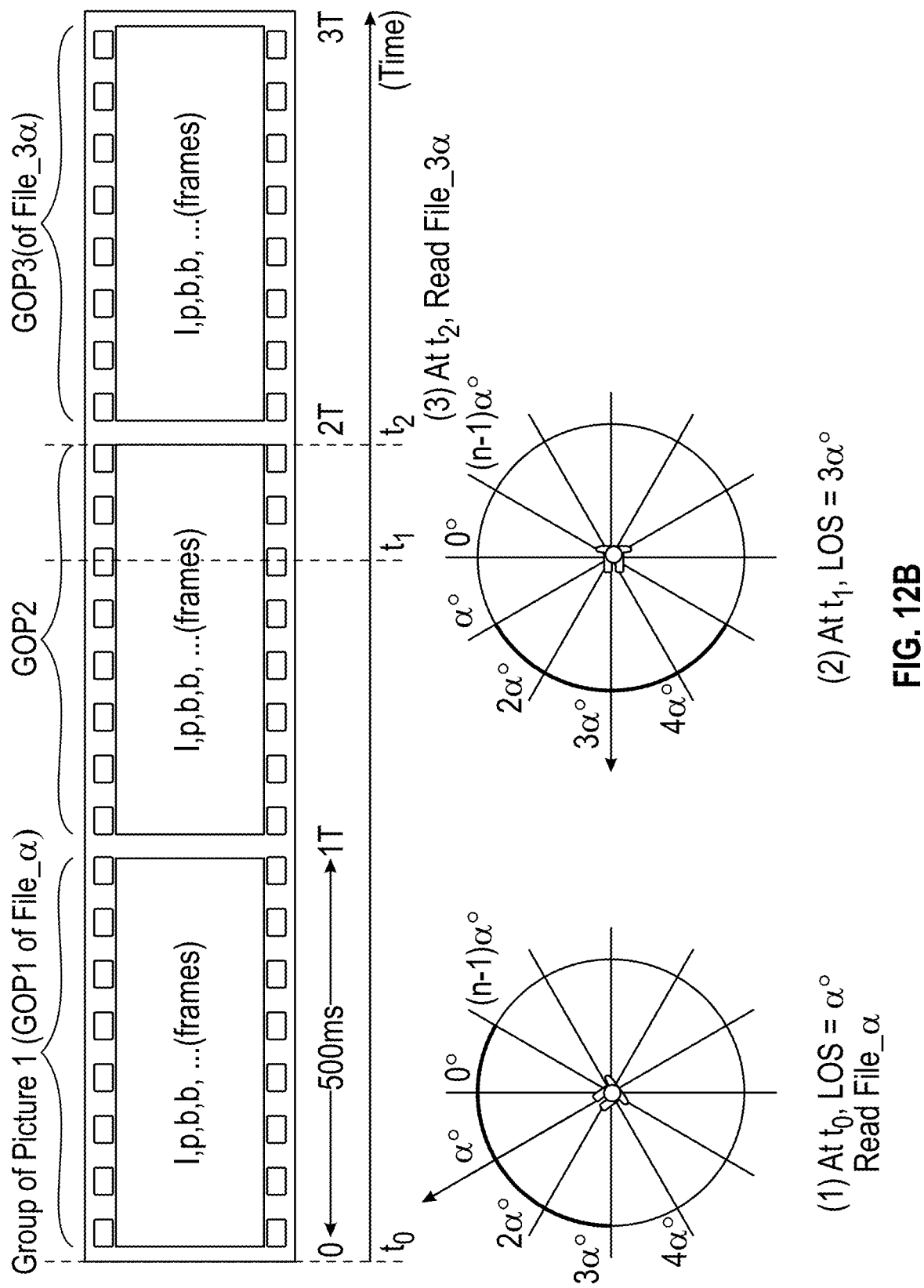

Now, the flowchart in FIG. 11A will be described in more detail, by referring to FIGS. 12A and 12B. FIGS. 12A and 12B are example streaming method in an example VR video processing system, according to some implementations. FIG. 12A shows an example video processing in an example VR video processing system. In some implementations, a VR video processing system (e.g., the system server 100 in FIG. 3) performs streaming with off-line created and pre-encoded video files. In some implementations, an encoder of the video processing system (e.g., the encoder 125) does not perform live, real-time encoding on video frames. Referring to FIG. 12A, in some implementations, the video processing system can create multiple files 1205 (e.g., File_0, File_α, File_2α, . . . , File_(n−1)α) with different view angles 1202 (e.g., 0°, α°, 2α°, . . . , (n−1)α°). Referring back to FIG. 12A, in some implementations, the multiple files 1205 can be associated with different FOVs 1203 (e.g., FOV(0°), FOV (α°), FOV(2α°), . . . , FOV((n−1)α°)) corresponding to respective view angles 1202 (e.g., 0°, α°, 2α°, . . . , (n−1)α°). In some implementations, referring to FIG. 12A, a view angle 1202 (e.g., α°) can be defined as an azimuth angle from a reference vector or direction (e.g., the direction of 0°), representing a direction of line of sight (LOS) of the viewer 1201. In some implementations, a field of view (FOV) can be defined as a range between two azimuth angles (e.g., the range between 3α° and (n−1) α° in FIG. 12A) in which the viewer sees with a client device. An off-field-of-view (off-FOV) can be defined as an azimuth angle range in which the viewer cannot see with the client device (e.g., an azimuth angle range other than the FOV range; see FIG. 12A). In some implementations, video frames or files in a reformatted image format (e.g., frames 641, 642, 643, 644, 645 in FIG. 6D) with corresponding different view angles (e.g., α°, 2α°, 3α°, 4α°, 5α° in FIG. 6D) can be created. In some implementations, the format of video frames or files can be reformatted formats as shown in FIGS. 6B and 6C, or a format showing an FOV area only. In some implementations, the number of files depends on a unit view angle covered by a single file (e.g., 30° in FIG. 12A). For example, if the unit view angle is 30°, twelve video files (360/30=12) are can be created.

FIG. 12B shows a block diagram of an example video streaming in an example VR video processing system. In some implementations, as viewer's view angle keeps updating, a streaming server of the video processing system (e.g., the streaming server 140 in FIG. 3) selects a video file (e.g., File_α) with a view angle closest to the viewer's current view angle (e.g., α°), and streams the file to a client device. In some implementations, referring to FIGS. 12A and 12B, when the viewer's angle changes from α° to 3α°, the streaming server switches from File_α to File_3α as a streaming source. In some implementations, when the client device sends a new view angle 3α° (as updated from the previous view angle α°) to the VR video system (e.g., the communication server 130 in FIG. 3), the streaming server switches from File_α to File_3α and streams File_3α to the client device.

Referring to FIG. 12B, in some implementations, by the nature of video compression, switch from one file with a first view angle to another file with a second view angle can be done at the beginning of the next Group of Picture (GOP) (e.g., the next group of successive pictures within a coded video stream). In some implementations, each Group of Pictures is headed by a key frame. For example, referring to FIG. 12B, when the viewer's view angle is α° (or when the client device sends a view angle α° to the VR video system), the streaming server reads File_α (or a file that has a view angle closest to α°) and starts to stream a first GOP (e.g., GOP1) from File_α to the client device at time 0. In some implementations, the duration of time to stream each GOP is set to T (e.g., 500 ms as shown in FIG. 12B) so that, for example, if the streaming server starts to stream the first GOP at time t0=0, streaming of the second GOP and third GOP will start at time T and 2T, respectively. For example, referring to FIG. 12B, the viewer's angle changes from α° to 3α° (or when the client device sends a new view angle 3α° (as updated from the previous view angle α°) to the VR video system) at t1 (T<t1<2T), at which the streaming server is streaming the second GOP (e.g., GOP2) from File_α. In some implementations, in response to the view angle change, the streaming server determines whether the frame currently being streamed (at time t1) is the last frame of the current GOP (e.g., GOP2). In some implementations, in response to determination that the video frame currently being streamed is not the last frame of the current GOP (e.g., GOP2) of the current video stream (e.g., from File_α), the streaming server continues to stream the video frames of the current GOP (e.g., GOP2) (and does not switch from File_α to File_3α) until the streaming server completes streaming of the current GOP (e.g., GOP2) at time t2 (=2T). In some implementations, referring to FIG. 12B, when the streaming server determines that the frame currently being streamed is the last frame of the current GOP (e.g., GOP2), the streaming server selects File_3α (or a file that has a view angle closest to 3α°), and switches from File_α to File_3α as a streaming source. In some implementations, referring to FIG. 12B, in response to the streaming server determining that it completes streaming of the current GOP, for example, at time t2, the streaming server starts to read data from File_3α and stream a first GOP (e.g., GOP3) of the second video stream (from File_3α) to the client device. In some implementations, before starting to read data from File_3α, at time t2, the streaming server can determine whether the view angle still remain at 3α°, and stream GOP3 if it is determined that the view angle still remain at 3α°.

Now, the flowchart in FIG. 11A will be described in more detail, referring to FIGS. 12A and 12B. Referring to FIG. 11A, at stage 1110, a video server may create multiple files corresponding to different view angles. In some implementations, the video server implemented by the processor and configured to cause the processor to create a plurality of files corresponding to a plurality of view angles and store the plurality of files in the memory. For example, referring to FIG. 12A, in some implementations, the video processing system can create multiple files 1205 (e.g., File_0, File_α, File_2α, . . . , File_(n–1)α) with different view angles 1202 (e.g., 0°, α°, 2α°, . . . , (n–1)α°). Referring back to FIG. 12A, the multiple files 1205 can be associated with different FOVs 1203 (e.g., FOV(0°), FOV(α°), FOV(2α°), . . . , FOV((n–1)α°)) corresponding to respective view angles 1202 (e.g., 0°, α°, 2α°, . . . , (n–1)α°). In some implementations, each of the plurality of files may include a plurality of group of pictures (GOPs) forming a video stream with an identical field of view (FOV) from an identical view angle.

At stage 1120, a view angle may be received from a client device. For example, a communication server (e.g., 140 in FIG. 3) implemented by the processor and configured to cause the processor to receive, from a client device via a first connection, first information relating to a first view angle (e.g., α°).

At stage 1130, a streaming server may stream, to the client device, a video stream from a file with a view angle closest to the view angle received from the client device. In response to the communication server receiving the first information, the streaming server is configured to cause the processor to read, among the plurality of files, a first file including a first video stream corresponding to a view angle closest to the received first view angle, and stream, from the first file, the first video stream to the client device via a second connection. For example, referring to FIG. 12B, the streaming server 140 (see FIG. 3) selects a video file (e.g., File a) with a view angle closest to the viewer's current view angle (e.g., α°), and streams the file to a client device.

The communication server is further configured to cause the processor to receive, from the client device, second information relating to a second view angle while the streaming server streams the first video stream. For example, referring to FIG. 12B, the communication server 130 (see FIG. 3) receives from the client device, second information relating to the second view angle (e.g., 3α°). In response to the communication server receiving the second information, the streaming server is configured to cause the processor to switch from the first file to a second file including a second video stream corresponding to a view angle closest to the second view angle, read the second file, and stream, from the second file, the second video stream to the client device via the second connection. For example, referring to FIGS. 12A and 12B, when the viewer's angle changes from α° to 3α°, the streaming server switches from File_α to File_3α as a streaming source. In some implementations, when the client device sends a new view angle 3α° (as updated from the previous view angle α°) to the VR video system (e.g., the communication server 130 in FIG. 3), the streaming server switches from File_α to File_3α and streams File_3α to the client device.

Figure 11B:
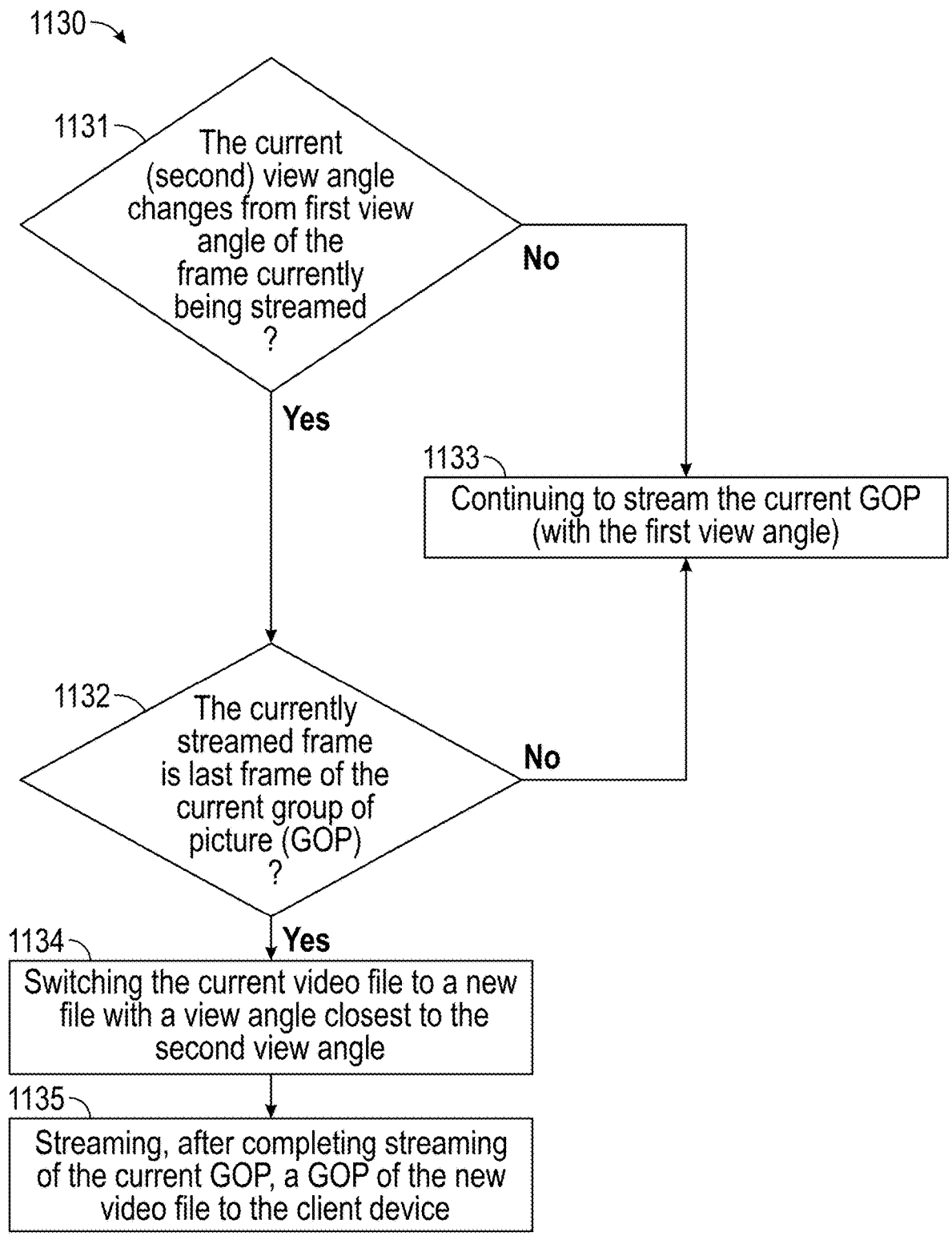

FIG. 11B is a flowchart showing detailed operations of streaming a video stream from a file with a view angle closest to the view angle received from the client device. Referring to FIG. 11B, at stage 1131, the server determines whether the current (second) view angle changes from the previous first view angle of the frame currently being streamed. For example, referring to FIG. 12B, at time t1, the server determines whether the current view angle 3α° changes from the previous view angle α°.

At stage 1132, if it is determined that the current (second) view angle changes from the previous first view angle of the frame currently being streamed, the server determines whether the frame currently being streamed is the last frame of the current Group of Picture (GOP). For example, referring to FIG. 12B, at time t1, the server determines that the current view angle 3α° changes from the previous view angle α°, and determines whether the frame currently being streamed (at time t1) is the last frame of the current GOP (e.g., GOP2).

At stage 1133, if it is determined that the current view angle does not change from the previous first view angle of the frame currently being streamed, the server continues to stream the current GOP (with the first view angle).

At stage 1134, if it is determined that the frame currently being streamed is the last frame of the current GOP, the server switch the current video file to a new file with a view angle closest to the view angle received from the client device. In response to determination that a video frame currently being streamed is a last frame of the first GOP of the first video stream, the streaming server may be configured to switch from the first file to the second file. For example, referring to FIG. 12B, when the streaming server determines that the frame currently being streamed is the last frame of the current GOP (e.g., GOP2), the streaming server selects File_3α (or a file that has a view angle closest to 3α°), and switches from File_α to File_3α as a streaming source. If it is determined that the frame currently being streamed is not last frame of the current GOP, the server performs the operation at stage 1133, e.g., continuing to stream the current GOP with the first view angle. For example, referring to FIG. 12B, in response to determination that the video frame currently being streamed is not the last frame of the current GOP (e.g., GOP2) of the current video stream (e.g., from File_α), the streaming server continues to stream the video frames of the current GOP (e.g., GOP2) (and does not switch from File_α to File_3α) until the streaming server completes streaming of the current GOP (e.g., GOP2) at time t2 (=2T).

At stage 1135, the server determines whether it completes streaming of the current GOP, and streams, in response to determination of completion, a GOP of the new video file to the client device. In some implementations, the streaming server may stream, after determining completion of streaming of the first GOP of the first video stream, a GOP of the second video stream to the client device via the second connection. For example, referring to FIG. 12B, in response to the streaming server determining that it completes streaming of the current GOP, for example, at time t2, the streaming server starts to read data from File_3α and stream a first GOP (e.g., GOP3) of the second video stream (from File_3α) to the client device. In some implementations, before starting to read data from File_3α, at time t2, the streaming server can determine whether the view angle still remain at 3α°, and stream GOP3 if it is determined that the view angle still remain at 3α°.

Figure 11C:
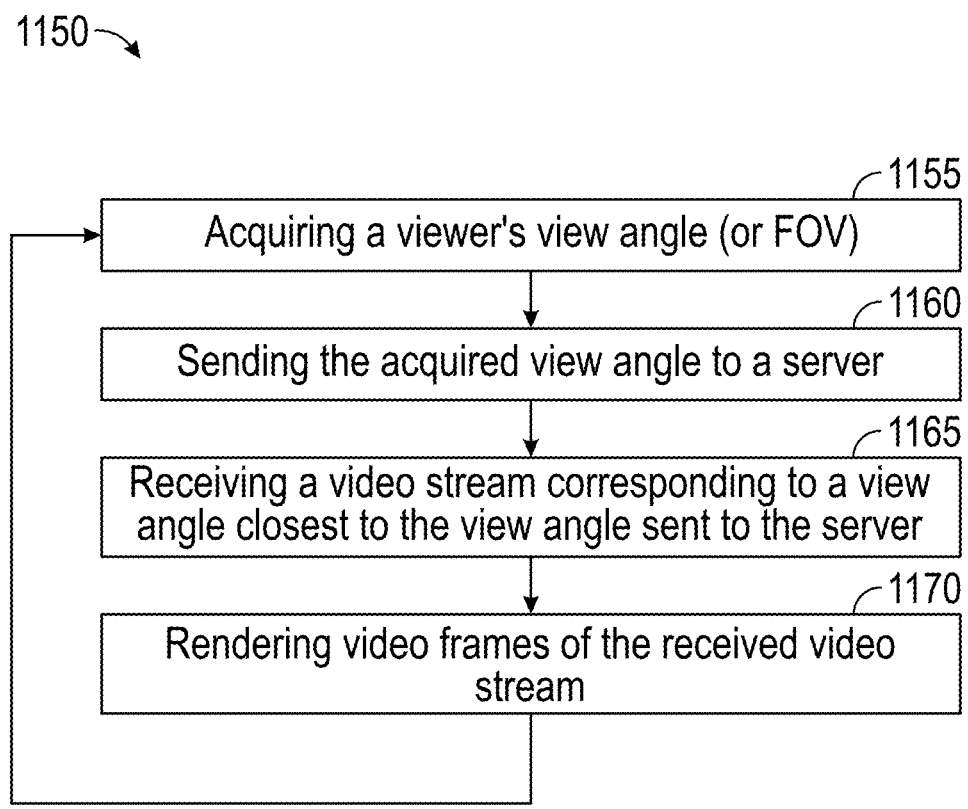

FIG. 11C is a flowchart showing operations of an example streaming method in an example VR client device, according to some implementations. At stage 1155, the client device may acquire a viewer's view angle (or FOV). For example, referring to FIG. 12A, the client device may acquire a view angle 1202 (e.g., α°) as defined as an azimuth angle from a reference vector or direction (e.g., the direction of 0°), representing a direction of line of sight (LOS) of the viewer 1201. In some implementations, the client device may acquire a field of view (FOV) as defined to be a range between two azimuth angles (e.g., the range between 3α° and (n−1) α° in FIG. 12A) in which the viewer sees with a client device. At stage 1160, the client device may send the acquired view angle (or FOV) to a server (e.g., the communication server 130 in FIG. 3). Referring to FIG. 12A, the client device sends the acquired view angle (e.g., α°) to the server, and the server receives the view angle α° at or before time t0. At stage 1165, the client device may receive a video stream corresponding to a view angle closest to the view angle sent to the server. At stage 1170, the client device may render video frames of the received video stream. For example, referring to FIG. 12B, when the streaming server 140 (see FIG. 3) streams a video file (e.g., File_α) with a view angle closest to the viewer's current view angle (e.g., α°), the client receives the video stream and render video frames of the received stream from the video file (e.g., File_α).

It should be noted that the term "example" or "exemplary" as used herein to describe various implementations is intended to indicate that such implementations are possible examples, representations, and/or illustrations of possible implementations (and such term is not intended to connote that such implementations are necessarily extraordinary or superlative examples).

The terms "coupled," "connected," and the like, as used herein, mean the joining of two members or components directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

The present disclosure contemplates methods, systems, and program products on any machine-readable media for accomplishing various operations. The examples of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other non-transitory medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the elements of the systems and methods as shown in the exemplary implementations are illustrative only. Although only a few implementations of the present disclosure have been described in detail, those skilled in the art who review this disclosure will readily appreciate that many modifications are possible without materially departing from the novel teachings and advantages of the subject matter recited. For example, elements shown as integrally formed may be constructed of multiple parts or elements. Accordingly, all such modifications are intended to be included within the scope of the present inventions. Other substitutions, modifications, changes, and omissions may be made in the design, operating conditions, and arrangement of the preferred and other exemplary implementations without departing from scope of the present disclosure or from the spirit of the appended claims.

What is claimed is:

1. A system comprising:
one or more processors; and
a memory storing instructions that, when executed by the one or more processors, cause the system to perform operations comprising:
accessing an image with areas of differing complexity and in which a first region adjoins both a second region and a third region that does not adjoin the second region;
scaling the second and third regions differently from each other based on the areas of differing complexity in the image; and
modifying the image by repositioning the scaled second region relative to the scaled third region.

2. The system of claim 1, wherein:
the areas of differing complexity in the image differ in spatial complexity within the image; and
the scaling of the second and third regions of the image independently of each other is based on the areas of differing spatial complexity.

3. The system of claim 1, wherein:
the areas of differing complexity in the image differ in temporal complexity within a sequence of images that includes the image; and
the scaling of the second and third regions of the image independently of each other is based on the areas of differing temporal complexity.

4. The system of claim 1, wherein:
the scaling of the second and third regions of the image independently of each other is based on a complexity map that indicates the areas of differing complexity in the image, the complexity map being generated based on the image.

5. The system of claim 1, wherein:
the scaling of the second and third regions of the image independently of each other includes generating a complexity map that indicates the areas of differing complexity in the image.

6. The system of claim 5, wherein:
the generating of the complexity map that indicates the areas of differing complexity in the image includes identifying pixels of the image that change more than a threshold amount between the image and a temporally adjoining further image in a sequence of images.

7. The system of claim 1, wherein:
the modified image includes the first region scaled to a highest resolution among the scaled first region, the scaled second region, and the scaled third region.

8. A method comprising:
accessing, by one or more processors, an image with areas of differing complexity and in which a first region adjoins both a second region and a third region that does not adjoin the second region;
scaling, by the one or more processors, the second and third regions differently from each other based on the areas of differing complexity in the image; and
modifying, by the one or more processors, the image by repositioning the scaled second region relative to the scaled third region.

9. The method of claim 8, wherein:
the areas of differing complexity in the image differ in spatial complexity within the image; and
the scaling of the second and third regions of the image independently of each other is based on the areas of differing spatial complexity.

10. The method of claim 8, wherein:
the areas of differing complexity in the image differ in temporal complexity within a sequence of images that includes the image; and
the scaling of the second and third regions of the image independently of each other is based on the areas of differing temporal complexity.

11. The method of claim 8, wherein:
the scaling of the second and third regions of the image independently of each other is based on a complexity map that indicates the areas of differing complexity in the image, the complexity map being generated based on the image.

12. The method of claim 8, wherein:
the scaling of the second and third regions of the image independently of each other includes generating a complexity map that indicates the areas of differing complexity in the image.

13. The method of claim 12, wherein:
the generating of the complexity map that indicates the areas of differing complexity in the image includes identifying pixels of the image that change more than a threshold amount between the image and a temporally adjoining further image in a sequence of images.

14. The method of claim 8, wherein:
the modified image includes the first region scaled to a highest resolution among the scaled first region, the scaled second region, and the scaled third region.

15. A non-transitory machine-readable storage medium comprising instructions that, when executed by one or more processors of a machine, cause the machine to perform operations comprising:
accessing an image with areas of differing complexity and in which a first region adjoins both a second region and a third region that does not adjoin the second region;
scaling the second and third regions differently from each other based on the areas of differing complexity in the image; and
modifying the image by repositioning the scaled second region relative to the scaled third region.

16. The non-transitory machine-readable storage medium of claim 15, wherein:
the areas of differing complexity in the image differ in spatial complexity within the image; and
the scaling of the second and third regions of the image independently of each other is based on the areas of differing spatial complexity.

17. The non-transitory machine-readable storage medium of claim 15, wherein:
the areas of differing complexity in the image differ in temporal complexity within a sequence of images that includes the image; and
the scaling of the second and third regions of the image independently of each other is based on the areas of differing temporal complexity.

18. The non-transitory machine-readable storage medium of claim 15, wherein:
the scaling of the second and third regions of the image independently of each other is based on a complexity map that indicates the areas of differing complexity in the image, the complexity map being generated based on the image.

19. The non-transitory machine-readable storage medium of claim 15, wherein:
the scaling of the second and third regions of the image independently of each other includes generating a complexity map that indicates the areas of differing complexity in the image.

20. The non-transitory machine-readable storage medium of claim 15, wherein:
the modified image includes the first region scaled to a highest resolution among the scaled first region, the scaled second region, and the scaled third region.

* * * * *

UNITED STATES PATENT AND TRADEMARK OFFICE
CERTIFICATE OF CORRECTION

PATENT NO. : 11,843,759 B2
APPLICATION NO. : 17/899756
DATED : December 12, 2023
INVENTOR(S) : Ha et al.

It is certified that error appears in the above-identified patent and that said Letters Patent is hereby corrected as shown below:

On the Title Page

In "Related U.S. Application Data", in Column 1, Line 1, delete "(60)" and insert --(63)-- therefor In the Specification In Column 1, Line 33, delete "30-60" and insert --30~60-- therefor In Column 4, Line 41, delete "(n–1) α°" and insert --(n–1)α°-- therefor In Column 5, Line 31, delete "V R" and insert --VR-- therefor In Column 8, Line 48, delete "165," and insert --162,-- therefor In Column 8, Line 48, delete "164," and insert --166,-- therefor In Column 9, Line 13, delete "124" and insert --125-- therefor In Column 10, Line 24, delete "124" and insert --125-- therefor In Column 10, Line 26, delete "165," and insert --162,-- therefor In Column 10, Line 28, delete "124" and insert --125-- therefor In Column 10, Line 31, delete "164." and insert --166.-- therefor In Column 11, Line 17, delete "124." and insert --125.-- therefor In Column 11, Line 49, delete "164," and insert --166,-- therefor Signed and Sealed this
Nineteenth Day of March, 2024

*Katherine Kelly Vidal*
Katherine Kelly Vidal
*Director of the United States Patent and Trademark Office*

In Column 12, Line 43, delete "(n–1) α°" and insert --(n–1)α°-- therefor

In Column 12, Line 58, delete "(n–1) α°" and insert --(n–1)α°-- therefor

In Column 13, Line 1, delete "614" and insert --612-- therefor

In Column 13, Line 2, delete "615" and insert --613-- therefor

In Column 13, Line 6, delete "612" and insert --614-- therefor

In Column 13, Line 6, delete "613" and insert --615-- therefor

In Column 13, Line 39, delete "atop" and insert --a top-- therefor

In Column 13, Line 49, delete "(n–1) α°" and insert --(n–1)α°-- therefor

In Column 14, Line 8, delete "–0.45°" and insert -- –45°-- therefor

In Column 16, Line 27, delete "625)" and insert --623)-- therefor

In Column 19, Lines 8-9, delete "Ct (top) and Cs (top) with Ct (bottom) and Cs (bottom)." and insert --Ct(top) and Cs(top) with Ct(bottom) and Cs(bottom).-- therefor In Column 22, Line 66, delete "629'" and insert --620'-- therefor In Column 25, Line 40, delete "8)," and insert --8D,-- therefor In Column 31, Line 55, delete "(n–1) α°" and insert --(n–1)α°-- therefor In Column 32, Line 35, delete "t0=0," and insert --$t_0$=0,-- therefor In Column 32, Line 40, delete "t1 (T<t1<2T)," and insert --$t_1$ (T<$t_1$<2T),-- therefor In Column 32, Line 44, delete "t1)" and insert --$t_1$)-- therefor In Column 32, Line 52, delete "t2" and insert --$t_2$-- therefor In Column 32, Line 61, delete "t2," and insert --$t_2$,-- therefor In Column 32, Line 65, delete "t2," and insert --$t_2$,-- therefor In Column 33, Line 21, delete "140" and insert --130-- therefor In Column 33, Line 37, delete "File a)" and insert --File_α)-- therefor In Column 33, Line 38, after "device.", delete a linebreak

CERTIFICATE OF CORRECTION (continued)
U.S. Pat. No. 11,843,759 B2

In Column 33, Line 67, delete "t1 and insert --$t_1$,-- therefor

In Column 34, Line 4, delete "t1 and insert --$t_1$,-- therefor

In Column 34, Line 11, delete "t1)" and insert --$t_1$)-- therefor

In Column 34, Line 41, delete "t2" and insert --$t_2$-- therefor

In Column 34, Line 51, delete "t2," and insert --$t_2$,-- therefor

In Column 34, Line 55, delete "t2," and insert --$t_2$,-- therefor

In Column 35, Line 3, delete "(n–1) α°" and insert --(n–1)α°-- therefor

In Column 35, Line 9, delete "t0." and insert --$t_0$.-- therefor